United States Patent
Oguri et al.

(10) Patent No.: US 11,002,322 B2
(45) Date of Patent: May 11, 2021

(54) CLUTCH AND MOTOR

(71) Applicant: DENSO CORPORATION, Kariya (JP)

(72) Inventors: Ryousuke Oguri, Kariya (JP); Nakatsune Shirai, Kariya (JP); Tomoaki Ozaki, Kariya (JP); Shusuke Kijima, Kariya (JP); Kenta Suzuki, Kariya (JP); Daisuke Sawamoto, Kariya (JP); Akiyoshi Ohara, Kariya (JP); Hiroyuki Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 16/320,871

(22) PCT Filed: Sep. 14, 2017

(86) PCT No.: PCT/JP2017/033317
§ 371 (c)(1),
(2) Date: Jan. 25, 2019

(87) PCT Pub. No.: WO2018/061802
PCT Pub. Date: Apr. 5, 2018

(65) Prior Publication Data
US 2019/0162248 A1    May 30, 2019

(30) Foreign Application Priority Data

Sep. 30, 2016 (JP) ............................ JP2016-195010
Sep. 30, 2016 (JP) ............................ JP2016-195011
Jul. 25, 2017 (JP) ............................ JP2017-143753

(51) Int. Cl.
*F16D 41/069* (2006.01)
*F16D 41/10* (2006.01)

(52) U.S. Cl.
CPC ......... *F16D 41/069* (2013.01); *F16D 41/105* (2013.01); *E05Y 2201/216* (2013.01); *E05Y 2201/234* (2013.01)

(58) Field of Classification Search
CPC ................. F16D 41/06–105; F16D 2041/0603
See application file for complete search history.

(56) References Cited

U.S. PATENT DOCUMENTS 2,342,227 A * 2/1944 Swenson ................. F16C 33/54
                                                      192/45.1
2,407,772 A * 9/1946 Dodge .................... F16D 41/07
                                                      192/45.1

(Continued)

FOREIGN PATENT DOCUMENTS

| JP | 2007-016878 A | 1/2007 |
| JP | 2009-299864 A | 12/2009 |
| JP | 2016-040488 A | 3/2016 |

OTHER PUBLICATIONS

Dec. 12, 2017 International Search Report issued in International Patent Application PCT/JP2017/033317.

*Primary Examiner* — Ernesto A Suarez
*Assistant Examiner* — James J Taylor, II
(74) *Attorney, Agent, or Firm* — Oliff PLC

(57) ABSTRACT

A clutch includes a roller arranged between a clutch housing and a driven side rotating body. The roller is rotated about a rotation axis of a drive side rotating body together with the drive side rotating body when the drive side rotating body is rotationally driven. The roller hinders rotation of the driven side rotating body by being sandwiched between the clutch housing and the driven side rotating body when the drive side rotating body is not rotationally driven. The support member sandwiches the roller between the clutch housing and the driven side rotating body. The support member rotates about the rotation axis of the drive side rotating body (Continued)

together with the drive side rotating body. The grease is arranged between the clutch housing and the roller. The support member restricts rotation of the roller about a central axis of the roller.

18 Claims, 29 Drawing Sheets

(56) References Cited

U.S. PATENT DOCUMENTS

| | | | | |
|---|---|---|---|---|
| 3,978,949 | A * | 9/1976 | Timtner | F16D 41/07 192/41 A |
| 5,069,079 | A * | 12/1991 | Vandervoort | F16D 23/0606 192/48.6 |
| 6,662,921 | B2 * | 12/2003 | Yoshida | F16D 41/067 192/37 |
| 7,163,097 | B2 * | 1/2007 | Acosta | E05F 11/505 192/223 |
| 8,151,960 | B2 * | 4/2012 | Jonsson | F16D 1/08 192/107 T |
| 2012/0061200 | A1 | 3/2012 | Yamashita et al. | |

* cited by examiner

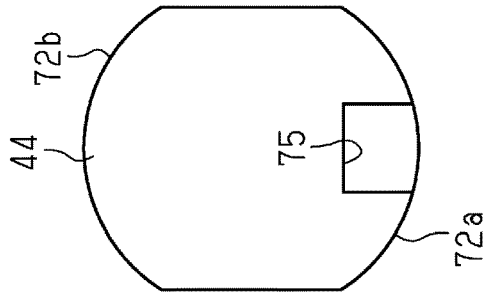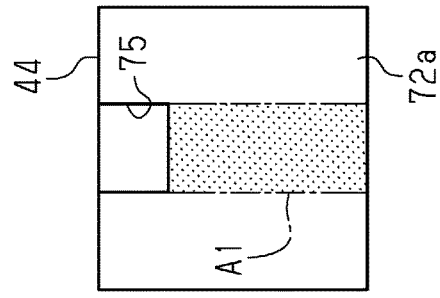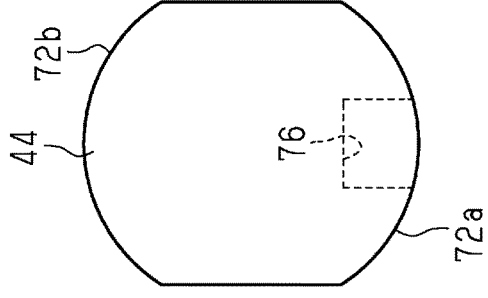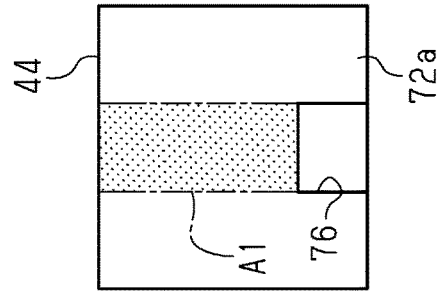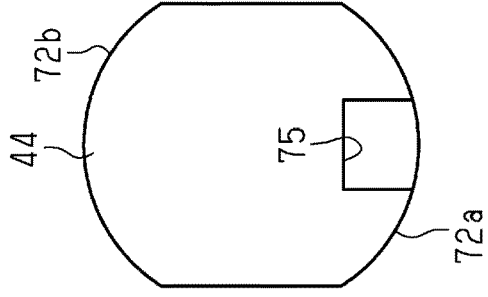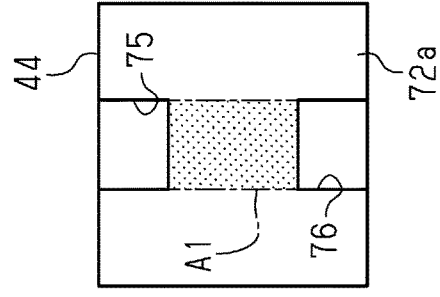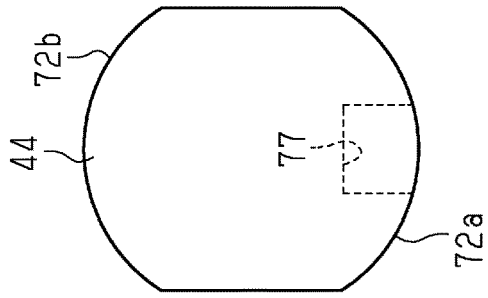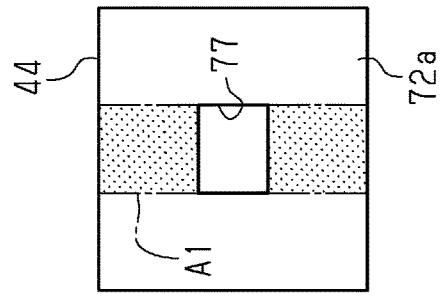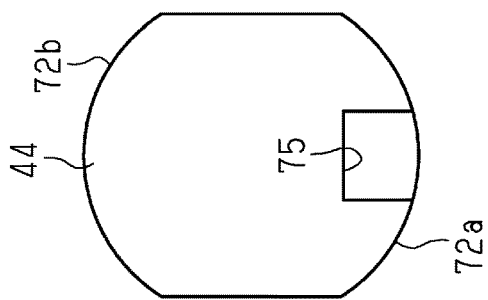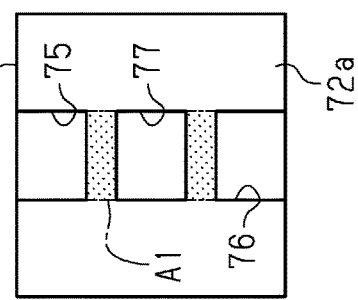

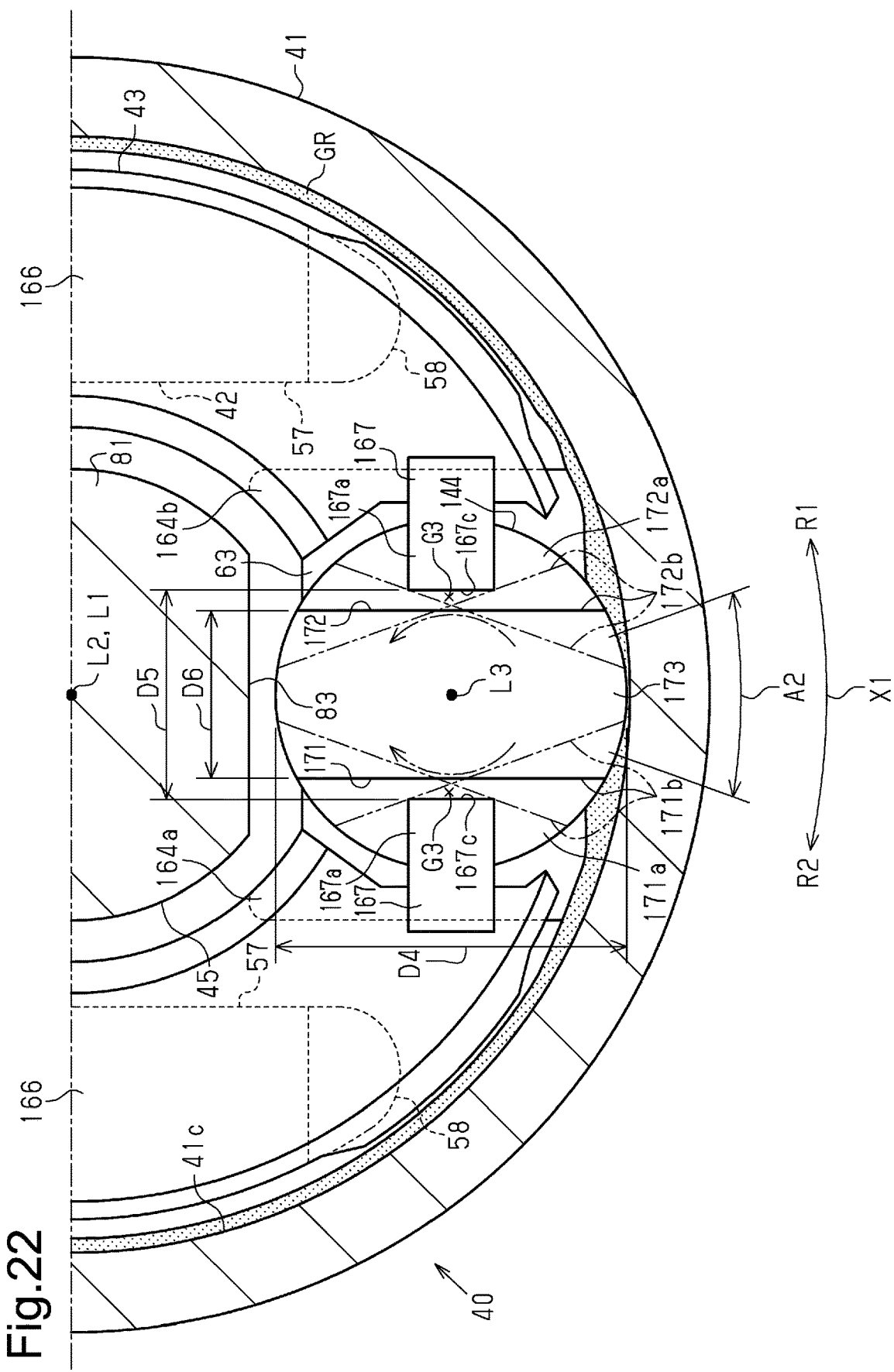

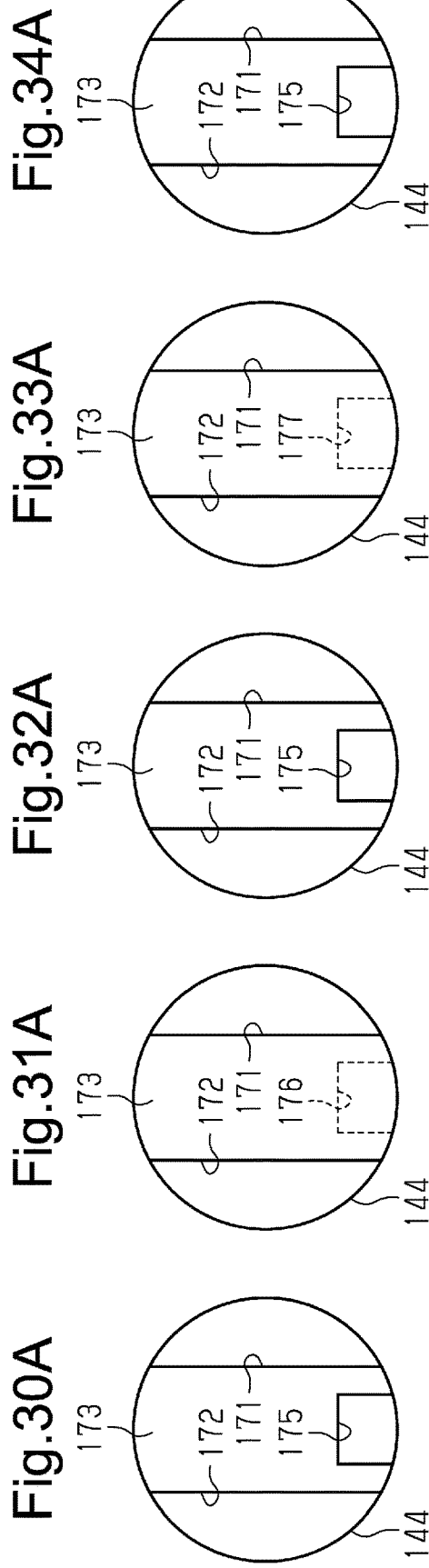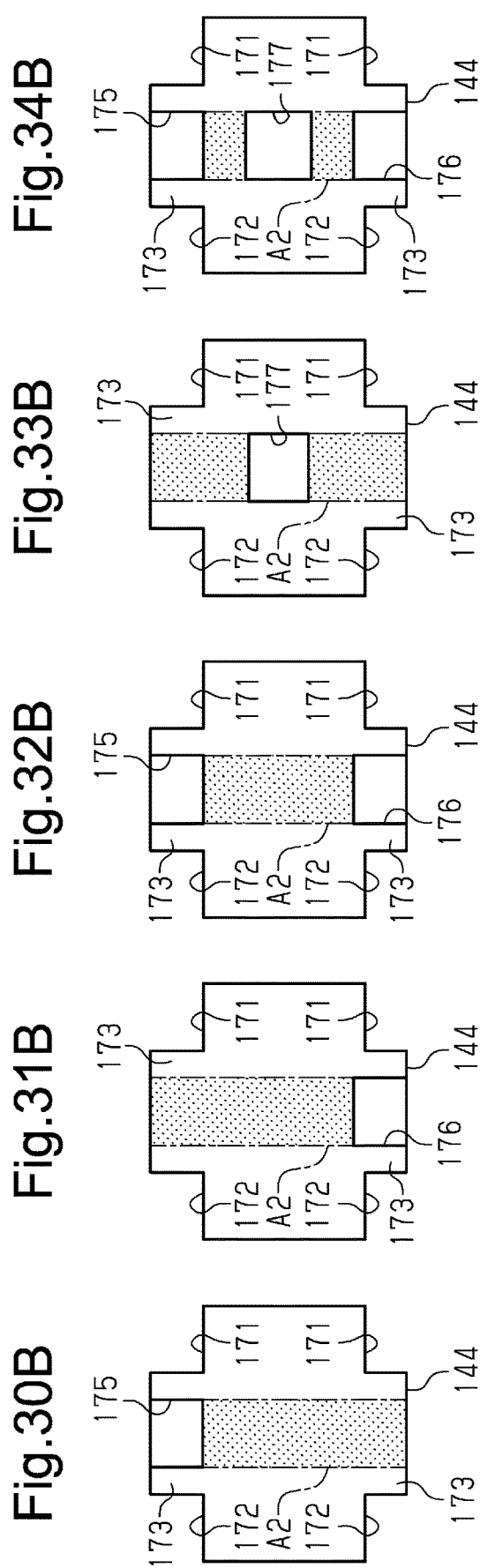

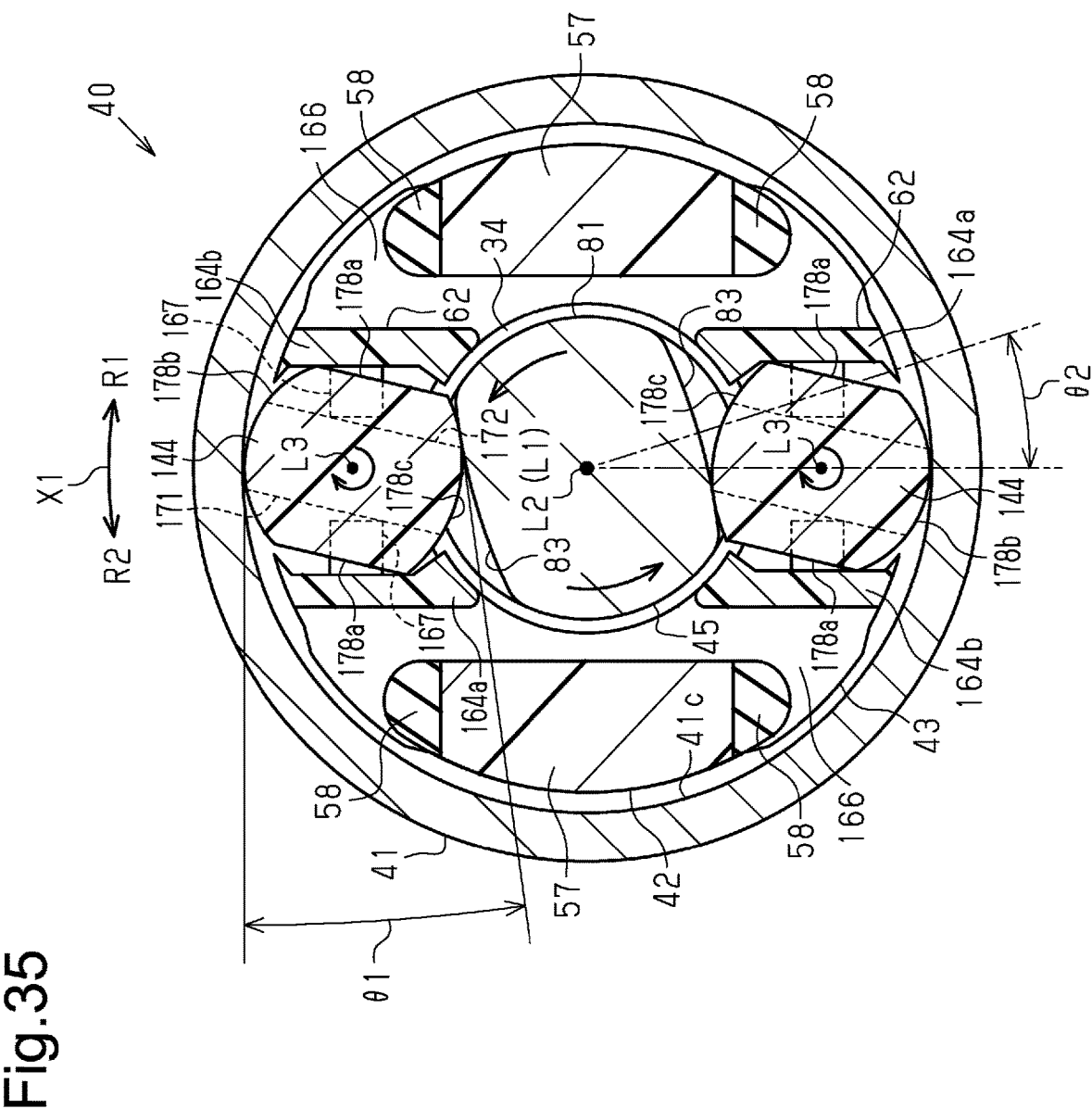

CLUTCH AND MOTOR

TECHNICAL FIELD

The present invention relates to a clutch and a motor including the clutch.

BACKGROUND ART

A conventional motor used as a drive source of a power window device or the like installed in a vehicle includes a motor unit having a rotation shaft that is rotationally driven and an output unit having a driven shaft to which the rotational driving force of the rotation shaft is transmitted to output the rotational driving force transmitted to the driven shaft. Patent document 1 describes an example of the rotation shaft and the driven shaft that are connected by a clutch functioning to transmit the rotational driving force of the rotation shaft to the driven shaft and not transmit rotational force from the driven shaft side to the rotation shaft.

The clutch described in patent document 1 includes a drive side rotating body rotated integrally with the rotation shaft, a driven side rotating body rotated integrally with the driven shaft and configured to be engaged with the drive side rotating body in a rotational direction, and a cylindrical clutch housing (sandwiching member) into which the drive side rotating body and driven side rotating body are inserted. Further, cylindrical rollers are arranged between the inner circumferential surface of the clutch housing and the driven side rotating body to hinder rotation of the driven side rotating body (i.e., rotation of driven shaft) when sandwiched (as wedges) between the inner circumferential surface of the clutch housing and the driven side rotating body in a state in which the rotation shaft is not rotationally driven. The rollers are held by a support member inserted in the clutch housing so that their central axes are parallel to the rotation axis of the drive side rotating body. When the rotation shaft is rotationally driven, the support member rotates together with the drive side rotating body about the rotation axis of the drive side rotating body. Thus, when the rotation shaft is rotationally driven, the rollers rotate together with the drive side rotating body and the driven side rotating body about the rotation axis of the drive side rotating body along the inner circumferential surface of the clutch housing while being held by the support member.

PRIOR ART DOCUMENT

Patent Document

Patent Document 1: Japanese Laid-Open Patent Publication No. 2016-40488

SUMMARY OF THE INVENTION

Problems that are to be Solved by the Invention

Grease is applied between the inner circumferential surface of the clutch housing and the rollers to restrict slipping of the rollers on the inner circumferential surface of the clutch housing when the inner circumferential surface of the clutch housing and the driven side rotating body sandwich the rollers so that the rotation shaft is not rotated from the driven-shaft side when the rotation shaft (drive side rotating body) is not rotationally driven. However, when the rotation shaft is rotationally driven, the rollers rotate about their axes while rotating along the inner circumferential surface of the clutch housing about the rotation axis of the drive side rotating body. Thus, the grease between the inner circumferential surface of the clutch housing and the rollers is scattered as the rollers rotate about their central axes. This results in the amount of grease between the inner circumferential surface of the clutch housing and the rollers being insufficient. If there is not enough grease between the inner circumferential surface of the clutch housing and the rollers, it may become difficult to sandwich the rollers with the inner circumferential surface of the clutch housing and the driven side rotating body when the rotation shaft is not rotationally driven (difficult to serve as wedges).

It is an object of the present invention to provide a clutch and a motor capable of preventing grease between the inner circumferential surface of a clutch housing and rollers from becoming insufficient.

Means for Solving the Problem

To achieve the above object, a clutch includes an annular clutch housing, a drive side rotating body that is rotationally driven, a driven side rotating body, a roller, a support member, and grease. Rotational driving force is transmitted to the driven side rotating body from the drive side rotating body. The driven side rotating body includes a portion arranged inside the clutch housing. The roller is arranged between an inner circumferential surface of the clutch housing and the driven side rotating body. The roller is rotated about a rotation axis of the drive side rotating body together with the drive side rotating body when the drive side rotating body is rotationally driven. The roller hinders rotation of the driven side rotating body by being sandwiched between the inner circumferential surface of the clutch housing and the driven side rotating body when the drive side rotating body is not rotationally driven. The support member sandwiches the roller between the inner circumferential surface of the clutch housing and the driven side rotating body. The support member rotates about the rotation axis of the drive side rotating body together with the drive side rotating body. The grease is arranged at least between the inner circumferential surface of the clutch housing and the roller. The support member restricts rotation of the roller about a central axis of the roller.

BRIEF DESCRIPTION OF DRAWINGS

FIG. 10A is a plan view of a roller in a different form, and FIG. 10B is a front view of the roller.

FIG. 11A is a plan view of a roller in a different form, and FIG. 11B is a front view of the roller.

FIG. 12A is a plan view of a roller in a different form, and FIG. 12B is a front view of the roller.

FIG. 13A is a plan view of a roller in a different form, and FIG. 13B is a front view of the roller.

FIG. 14A is a plan view of a roller in a different form, and FIG. 14B is a front view of the roller.

FIG. 22 is a partially enlarged cross-sectional view of the clutch in the second embodiment.

FIG. 30A is a plan view of a roller in a different form, and FIG. 30B is a front view of the roller.

FIG. 31A is a plan view of a roller in a different form, and FIG. 31B is a front view of the roller.

FIG. 32A is a plan view of a roller in a different form, and FIG. 32B is a front view of the roller.

FIG. 33A is a plan view of a roller in a different form, and FIG. 33B is a front view of the roller.

FIG. 34A is a plan view of a roller in a different form, and FIG. 34B is a front view of the roller.

FIG. 35 is a cross-sectional view of a clutch in a different form.

EMBODIMENTS OF THE INVENTION

First Embodiment

A first embodiment of a motor including a clutch will now be described.

Figure 1:
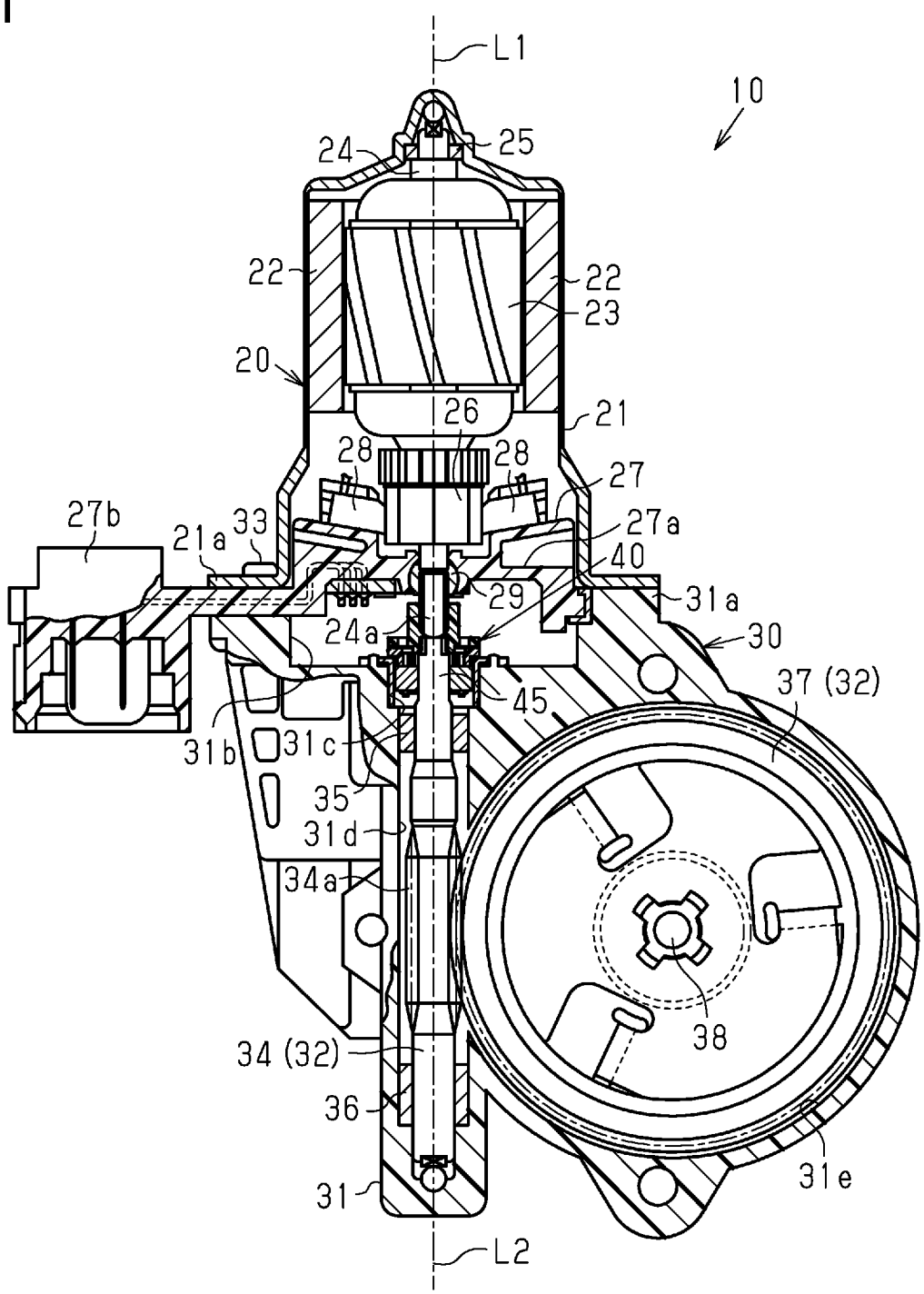
FIG. 1 is a cross-sectional view of a motor of a first embodiment.

A motor 10 of the first embodiment shown in FIG. 1 is provided in a power window device for electrically raising and lowering a vehicle window glass. The motor 10 includes a motor unit 20 for producing torque and an output unit 30 for decelerating and outputting rotation outputted by the motor unit 20, which are assembled into one body. Further, the motor 10 includes a clutch 40 at a drive connecting portion between the motor unit 20 and the output unit 30.

The motor unit 20 of the first embodiment is formed by a DC motor. Magnets 22 are fixed to the inner circumferential surface of a bottomed tubular yoke housing (hereinafter referred to as the yoke 21) forming the motor unit 20, and an armature 23 is arranged inside the magnets 22. The armature 23 has a rotation shaft 24 arranged in a central portion of the yoke 21. A proximal end portion (upper end portion in FIG. 1) of the rotation shaft 24 is rotatably supported by a bearing 25 provided at the bottom center of the yoke 21, and a cylindrical commutator 26 is fixed on a portion of the rotation shaft 24 near the distal end. Further, a connecting portion 24a in a shape between two planes in widthwise direction formed by chamfering a cylindrical shape in parallel is provided at a distal end portion (lower end portion in FIG. 1) of the rotation shaft 24.

A flange 21a extended outward is formed at an opening of the yoke 21, and a brush holder 27 is fitted to the opening of the yoke 21. The brush holder 27 has a holder body 27a in a shape to close the opening of the yoke 21, and a connector 27b that protrudes from the holder body 27a radially outward of the yoke 21 and is connected to an external connector (not shown). The holder body 27a holds a plurality of brushes 28 for supplying power that are electrically connected to the connector 27b by wiring (not shown), and slide on the commutator 26. The holder body 27a holds a bearing 29 in a substantially central portion thereof. The bearing 29 rotatably supports a portion of the rotation shaft 24 between the commutator 26 and the connecting portion 24a. When external power supplied to the brushes 28 by the connector 27b is supplied to the armature 23 by the commutator 26, the armature 23 (rotation shaft 24) is rotationally driven, that is, the motor unit 20 is rotationally driven.

The output unit 30 is formed with a speed reduction mechanism 32 and others accommodated in a resin gear housing 31. The gear housing 31 has a fixing portion 31a for fixing the gear housing 31 to the motor unit 20 at a portion axially facing the motor unit 20 (upper end portion in FIG. 1). The fixing portion 31a has an outer shape similar to the outer shape of the flange 21a of the yoke 21. A housing recess 31b open to the inside of the yoke 21 is formed in the fixing portion 31a. With a part of the holder body 27a of the brush holder 27 inserted in the housing recess 31b, the flange 21a abutting on the fixing portion 31a is fixed to the fixing portion 31a by a screw 33 so that the yoke 21 is fixed to the gear housing 31, and the motor unit 20 and the output unit 30 are integrated. The brush holder 27 is held between the yoke 21 and the fixing portion 31a.

In the gear housing 31, a clutch housing recess 31c is axially provided in the bottom center of the housing recess 31b, and also a worm shaft housing 31d extending from the bottom center of the clutch housing recess 31c in a central axis L1 direction of the rotation shaft 24 is recessed. Further, in the gear housing 31, a wheel housing 31e is recessed on the side of the worm shaft housing 31d (right side in FIG. 1). The wheel housing 31e and the worm shaft housing 31d are connected at a substantially central portion of the worm shaft housing 31d in the axial direction (longitudinal direction).

A substantially columnar worm shaft 34 (driven shaft) is accommodated in the worm shaft housing 31d. The worm shaft 34 is made of a metal material, and has a worm 34a in the form of screw teeth formed on an axially central portion thereof. The worm shaft 34 is rotatably supported at both axial end portions thereof by two bearings 35 and 36 arranged in both axial end portions of the worm shaft housing 31d. The worm shaft 34 arranged in the worm shaft housing 31d is rotatably supported by the bearings 35 and 36 to be arranged coaxially with the rotation shaft 24, that is, so that the central axis L1 of the rotation shaft 24 and the central axis L2 of the worm shaft 34 are in the same straight line.

A disc-shaped worm wheel 37 meshing with the worm 34a of the worm shaft 34 is rotatably accommodated in the wheel housing 31e. The worm wheel 37 forms the speed reduction mechanism 32 together with the worm shaft 34. That is, the speed reduction mechanism 32 of the first embodiment is a worm speed reduction mechanism (worm gear). An output shaft 38 that extends in the axial direction of the worm wheel 37 (direction perpendicular to plane FIG. 1) and rotates integrally with the worm wheel 37 is provided in a radially central portion of the worm wheel 37. A vehicle window glass is connected to the output shaft 38 by a window regulator (not shown).

The clutch 40 that connects the rotation shaft 24 of the motor unit 20 and the worm shaft 34 of the output unit 30 is accommodated in the clutch housing recess 31c.

Figure 2:
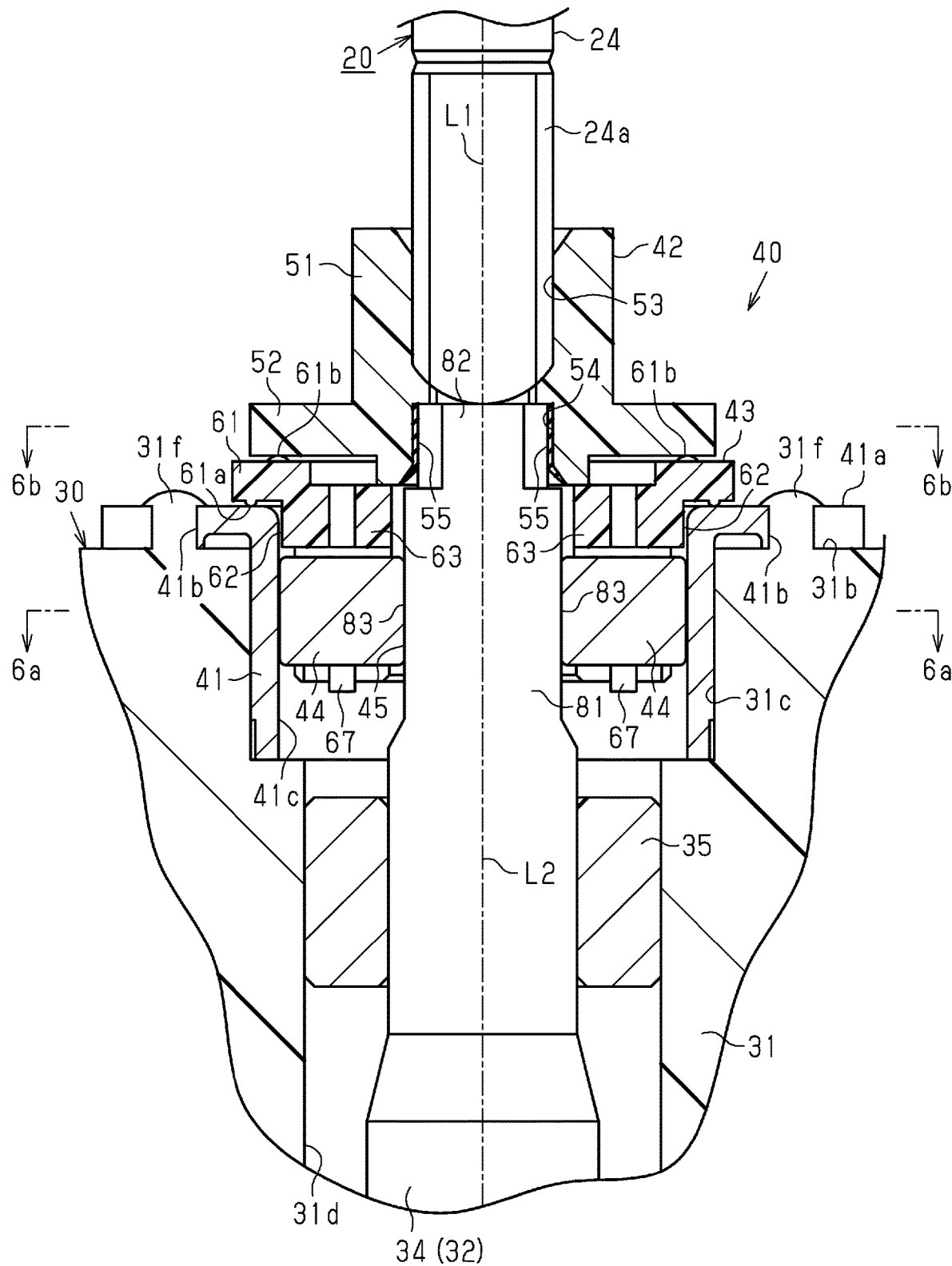
FIG. 2 is a partially enlarged cross-sectional view of the motor of the first embodiment.
Figure 3:
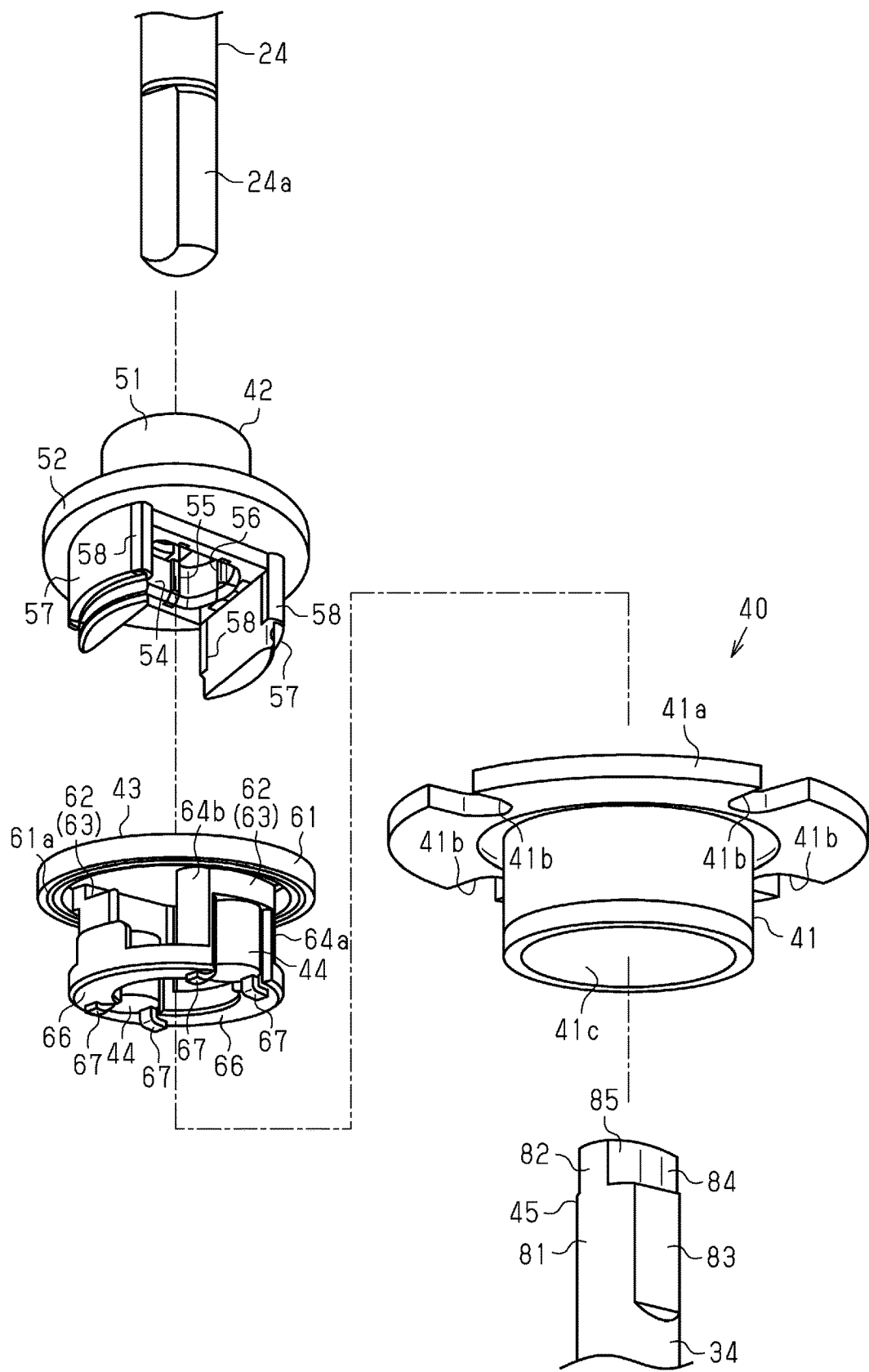
FIG. 3 is an exploded perspective view of a clutch in the first embodiment.

As shown in FIGS. 2 and 3, the clutch 40 includes a clutch housing 41 serving as a sandwiching member, a drive side rotating body 42, a support member 43, rollers 44, and a driven side rotating body 45.

The clutch housing 41 is in a cylindrical shape. A collar-shaped fixing flange 41a extending radially outward is formed at one axial end portion of the clutch housing 41. The outer diameter of a cylindrical portion of the clutch housing 41 is made substantially equal to the inner diameter of the clutch housing recess 31c, and the outer diameter of the fixing flange 41a is made larger than the inner diameter of the clutch housing recess 31c. Further, in the fixing flange 41a, fixing recesses 41b are formed in four places circumferentially at equal angular intervals. The fixing recesses 41b axially extend through the fixing flange 41a, and are open radially outward.

As shown in FIG. 2, the clutch housing 41 is inserted into the clutch housing recess 31c until the fixing flange 41a abuts on the bottom of the housing recess 31b, and is fixed to the gear housing 31 at the fixing flange 41a. More specifically, fixing projections 31f protruding axially are formed on the outer periphery of the opening of the clutch housing recess 31c forming the bottom of the housing recess 31b, in four places circumferentially at equal angular intervals. The four fixing projections 31f are axially inserted into the four fixing recesses 41b of the fixing flange 41a. Further, distal end portions of the fixing projections 31f are worked on by thermal caulking. Thus, the clutch housing 41 is fixed to the gear housing 31 in a manner immovable in the axial direction and non-rotatable in the circumferential direction. The clutch housing 41 fixed to the gear housing 31 is arranged coaxially with the rotation shaft 24 and the worm shaft 34.

The drive side rotating body 42 has a substantially cylindrical shaft connecting portion 51. A disc-shaped collar 52 extending radially outward is integrally formed on the outer circumferential surface of the shaft connecting portion 51.

In the shaft connecting portion 51, a drive shaft insertion hole 53 extending along the axial direction is formed in the axial center of an axial end portion near the motor unit 20 (upper end portion in FIG. 2). The drive shaft insertion hole 53 is in a shape between two planes in widthwise direction corresponding to the outer shape of the connecting portion 24a of the rotation shaft 24. By the connecting portion 24a being press-fitted into the drive shaft insertion hole 53, the drive side rotating body 42 is connected to the rotation shaft 24 in an integrally rotatable manner. The rotation shaft 24 and the drive side rotating body 42 connected to the rotation shaft 24 are coaxial (that is, their central axes are located along the same straight line).

Also, in the shaft connecting portion 51, a driven shaft insertion hole 54 extending along the axial direction is formed in the axial center of an axial end portion near the output unit 30 (lower end portion in FIG. 2). The central axis of the driven shaft insertion hole 54 coincides with the central axis of the drive shaft insertion hole 53. In the first embodiment, the drive shaft insertion hole 53 and the driven shaft insertion hole 54 communicate with each other.

Figure 6A:
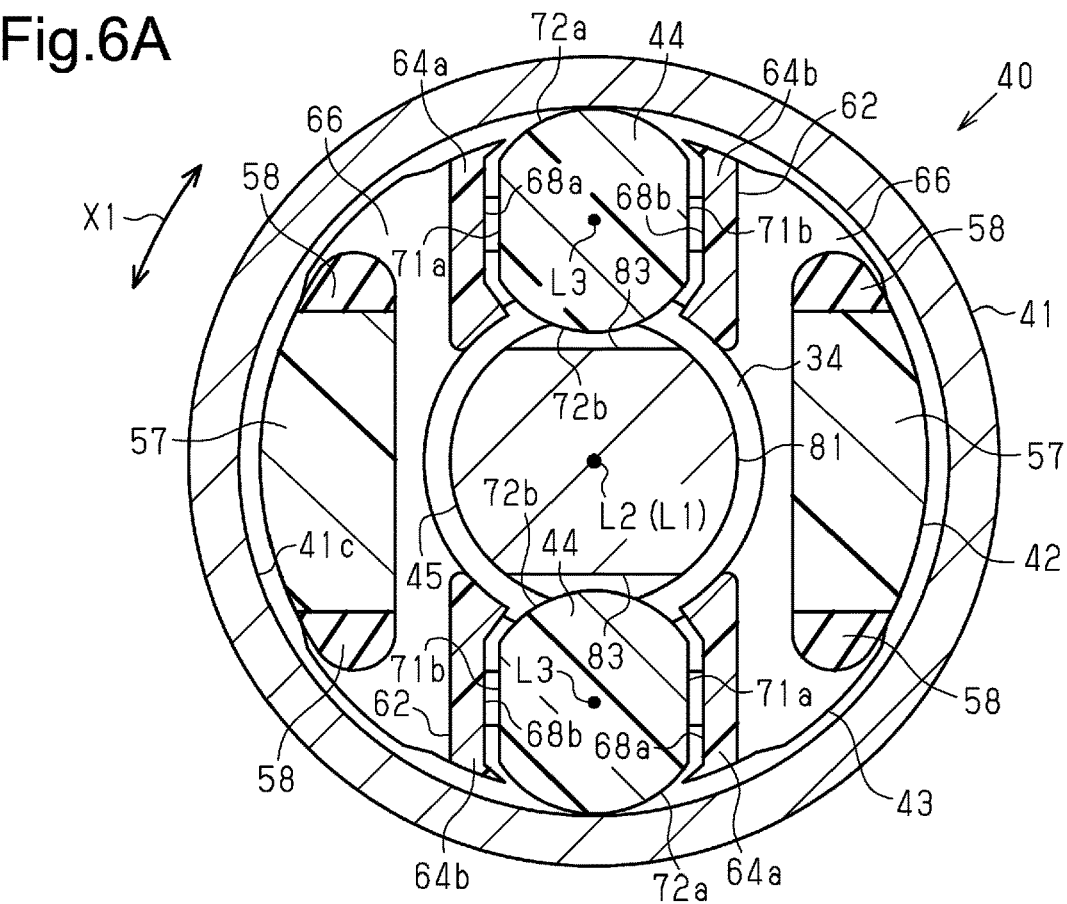
FIG. 6A is a cross-sectional view of the clutch in the first embodiment (cross-sectional view taken along line 6a-6a in FIG. 2)
Figure 6B:
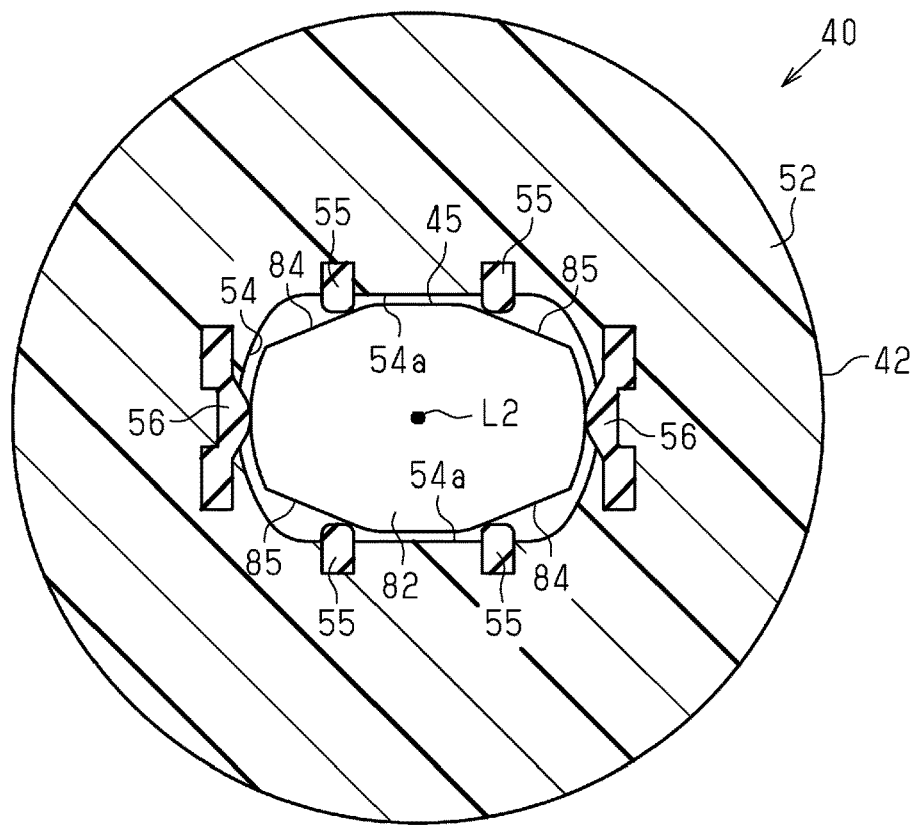
FIG. 6B is a cross-sectional view of the clutch in the first embodiment (cross-sectional view taken along line 6b-6b in FIG. 2).

As shown in FIG. 6B, the inner circumferential surface of the driven shaft insertion hole 54 has two drive side transmission surfaces 54a that are in a planar shape parallel to the axial direction and are parallel to each other. The shape of the driven shaft insertion hole 54 viewed from the axial direction is a substantially oval (shape between two planes in widthwise direction) in which a direction parallel to the drive side transmission surfaces 54a is the longitudinal direction, and a direction orthogonal to the drive side transmission surfaces 54a is the transverse direction. Two first elastic members 55, which are made of a material having elasticity such as a rubber material, are provided at each drive side transmission surface 54a. Second elastic members 56 made of a material having elasticity such as a rubber material are provided at both ends of the driven shaft insertion hole 54 in the longitudinal direction in an axial view. The first and second elastic members 55 and 56 protrude slightly inward from the inner circumferential surface of the driven shaft insertion hole 54.

As shown in FIGS. 3 and 6A, the drive side rotating body 42 has two roller release portions 57 axially extended from the collar 52 toward the output unit 30 (that is, downward in FIG. 3). The roller release portions 57 are provided on both sides of the driven shaft insertion hole 54 in the longitudinal direction in an axial view. The two roller release portions 57 are provided in positions spaced at 180° in the rotational direction and radially opposed to each other. Both end portions of each roller release portion 57 in the circumferential direction are formed by elastic portions 58 made of a material having elasticity such as a rubber material. The roller release portions 57 are arranged inside the clutch housing 41.

As shown in FIGS. 2 and 3, the support member 43 holds the rollers 44 between the clutch housing 41 and the driven side rotating body 45 radially facing each other. The support member 43 in the first embodiment is made of resin.

The support member 43 has a ring 61 in an annular shape centered around the central axis L2 of the worm shaft 34. The outer diameter of the ring 61 is larger than the inner diameter of the clutch housing 41. The ring 61 is arranged near the motor unit 20 (that is, on the upper side in FIG. 2) with respect to the fixing flange 41a of the clutch housing 41, and axially faces the fixing flange 41a. A lower protruding stripe 61a forming an annular protruding stripe along the circumferential direction of the ring 61 and abutting on the fixing flange 41a from the axial direction is formed on a lower surface of the ring 61 (axial end face facing fixing flange 41a). Also, an upper protruding portion 61b axially protruding and abutting on the collar 52 of the drive side rotating body 42 from the axial direction is formed on an upper surface of the ring 61 (end surface on side of drive side rotating body 42).

Roller holding portions 62 in an axially extending columnar shape for holding the rollers 44 are formed in two circumferentially spaced locations on the inner peripheral side of the ring 61 (that is, two locations spaced apart by 180° in first embodiment).

The rollers 44 held by the roller holding portions 62 will now be described in detail.

Figure 4A:
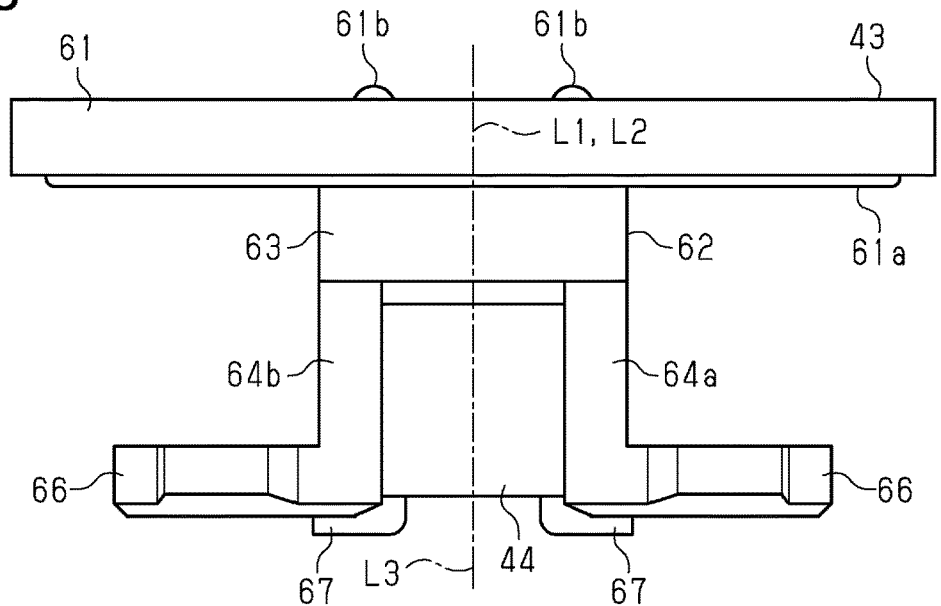
FIG. 4A is a side view of a support member holding rollers in the clutch of the first embodiment.
Figure 4B:
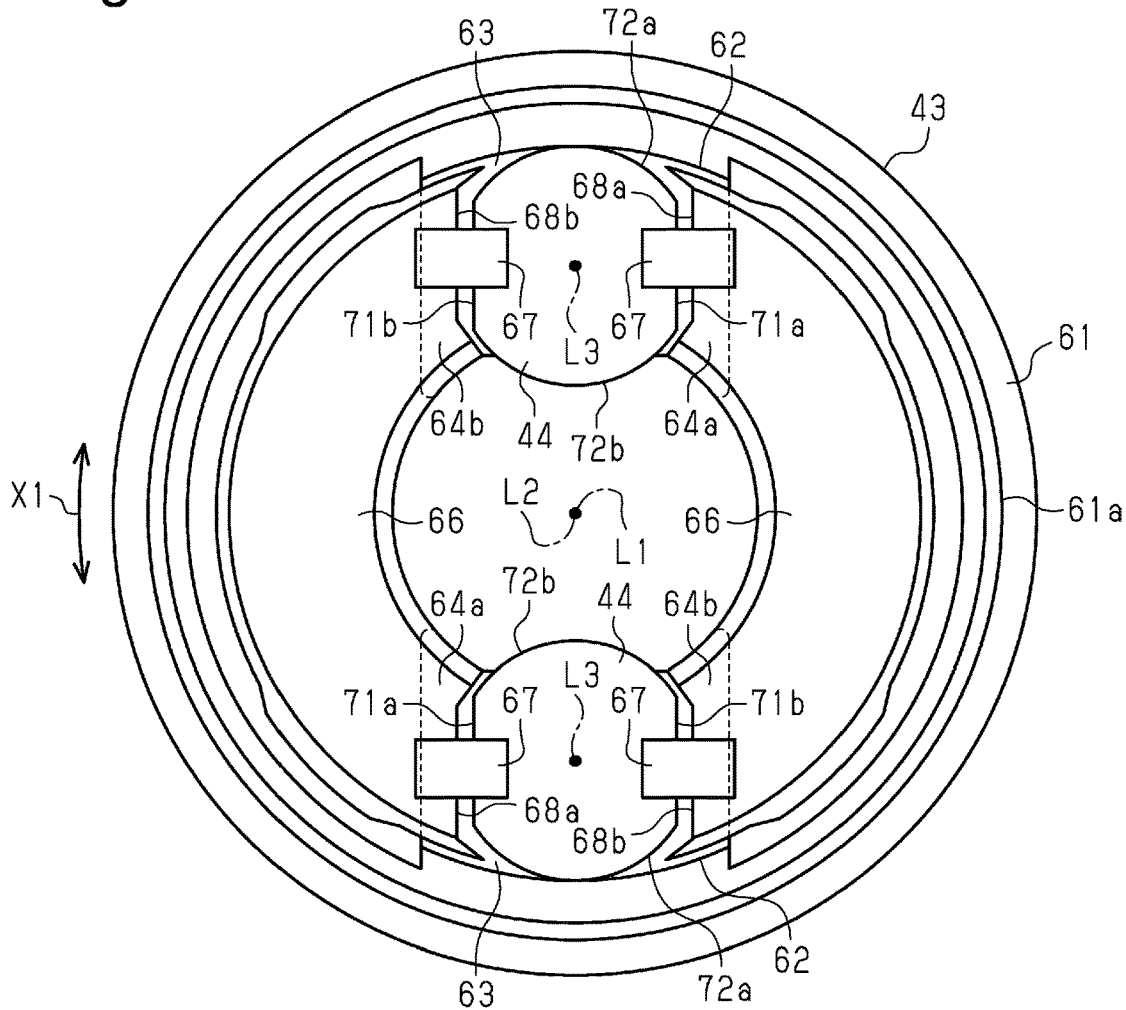
FIG. 4B is a bottom view of the support member.

As shown in FIGS. 4A and 4B, the rollers 44 are made of resin, and are arranged such that their central axes L3 are parallel to the central axis L1 of the rotation shaft 24 and the central axis L2 of the worm shaft 34. The rollers 44 in the first embodiment have a shape between two planes in widthwise direction in the shape as viewed from the axial direction. Thus, when viewed from the axial direction, the rollers 44 are in a shape having a longitudinal direction and a transverse direction. In a state shown in FIG. 4B, the radial direction of the clutch 40 is the longitudinal direction of the rollers 44, and the circumferential direction of the clutch 40 is the transverse direction of the rollers 44. Each roller 44 has first and second opposed surfaces 71a and 71b in a planar shape on both sides in a rotational direction X1 of the drive side rotating body 42 (same as circumferential direction of the clutch 40 and hereinafter referred to as the rotational direction X1). Each roller 44 further has first and second arcuate surfaces 72a and 72b on both sides in the radial direction of the clutch 40. The outer circumferential surface of each roller 44 in the first embodiment includes the first and second opposed surfaces 71a and 71b and the first and second arcuate surfaces 72a and 72b.

Figure 5:
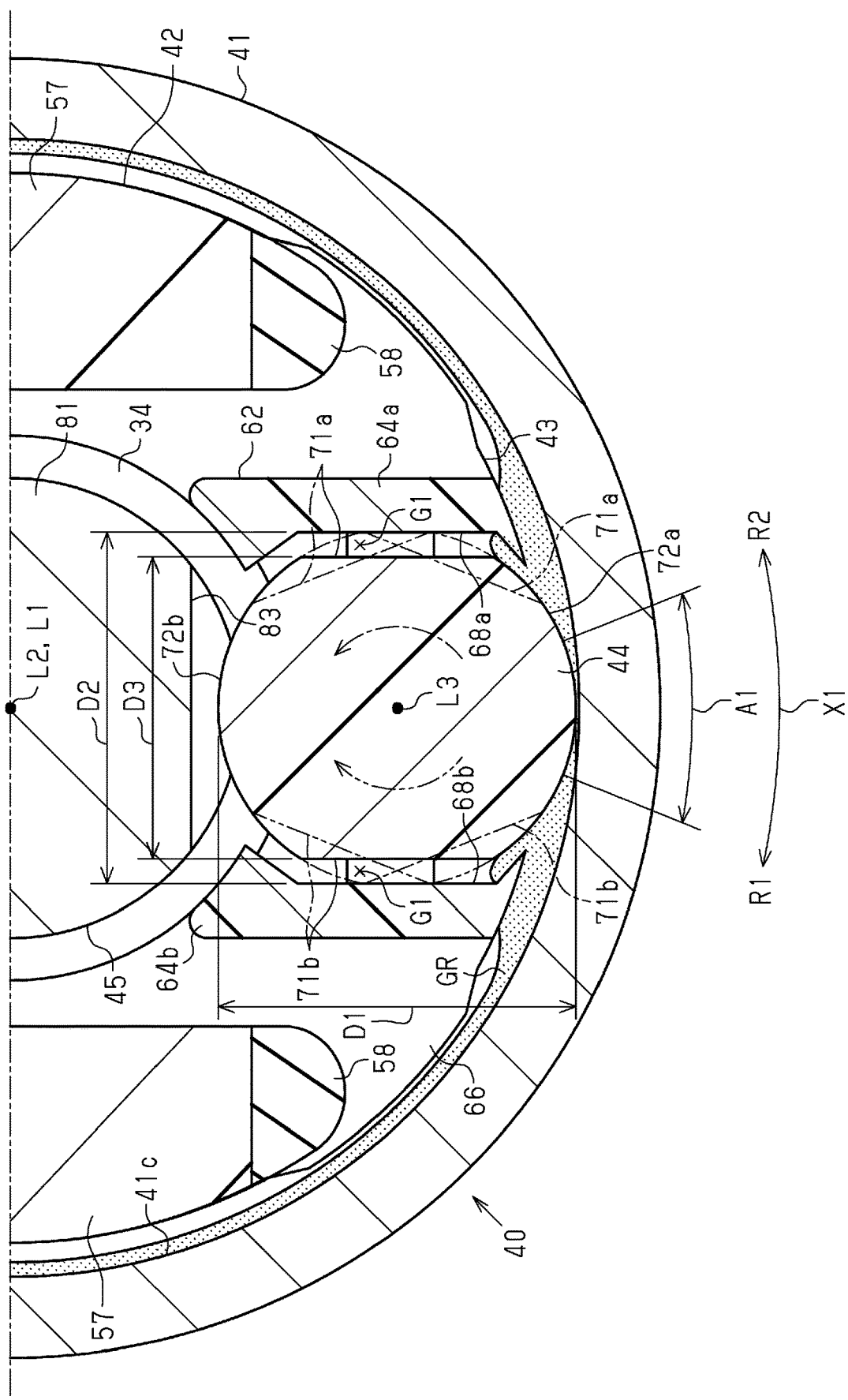
FIG. 5 is a partially enlarged cross-sectional view of the clutch in the first embodiment (cross-sectional view taken along line 6a-6a in FIG. 2).

As shown in FIG. 5, in each roller 44, the first and second opposed surfaces 71a and 71b are each parallel to the central axis L3 and parallel to each other. In each roller 44, the first and second arcuate surfaces 72a and 72b are in an arc shape with the central axis L3 as the center of curvature when viewed from the axial direction, and are equal in curvature to each other in the first embodiment. Further, the first and second arcuate surfaces 72a and 72b are formed in parallel without being inclined with respect to the central axis L3. In each roller 44, the first arcuate surface 72a located on the radially outside radially faces a cylindrical inner circumferential surface 41c of the clutch housing 41, and can contact the inner circumferential surface 41c. In each roller 44, the second arcuate surface 72b located on the radially inside radially faces the driven side rotating body 45, and can contact the driven side rotating body 45. Both axial end faces of each roller 44 are in a planar shape at right angles to the first and second opposed surfaces 71a and 71b (refer to FIG. 4A).

As shown in FIGS. 3, 4A, and 4B, each roller holding portion 62 has an axial support portion 63 extending radially inward from the ring 61. The axial support portion 63 axially faces the roller 44. Each roller holding portion 62 also has two roller supports 64a and 64b (rotational direction opposed portions) extended to the opposite side of the ring 61 (downward in FIG. 4A) from both circumferential ends of the axial support portion 63 along the axial direction (direction of central axes L1 and L2). In each roller holding portion 62, the two roller supports 64a and 64b are located on both sides of the roller 44 in the rotational direction X1, and hold the roller 44 from both sides in the rotational direction X1 so that the central axis L3 is parallel to the central axis L1. For the two roller supports 64a and 64b of each roller holding portion 62, when the clutch 40 is viewed from the motor unit 20 in the axial direction (that is, in a state shown in FIG. 6A), the roller support located on the counterclockwise side with respect to the roller 44 is referred to as a first roller support 64a, and the roller support located on the clockwise side with respect to the roller 44 is referred to as a second roller support 64b.

The support member 43 also has connecting portions 66 each of which connect a distal end portion of the first roller support 64a of one roller holding portion 62 and a distal end portion of the second roller support 64b of the other roller holding portion 62 to each other. The connecting portions 66 are in an arc shape centered around the central axes L1 and L2 in an axial view. Holding claws (support member side engaging portions) 67 protruding between the first and second roller supports 64a and 64b are provided at the distal end portions of the roller supports 64a and 64b. The holding claws 67 abut on one axial end face of the roller 44 from the axial direction to prevent the roller 44 from axially falling out of the roller holding portion 62.

As shown in FIGS. 4B and 5, in each roller holding portion 62, the two roller supports 64a and 64b have first and second abutting surfaces 68a and 68b, respectively, on side surfaces facing each other in the rotational direction X1. The first abutting surface 68a provided on the first roller support 64a is in a planar shape parallel to the central axes L1 and L2, and faces the first opposed surface 71a of the roller 44 arranged between the two roller supports 64a and 64b. Like the first abutting surface 68a, the second abutting surface 68b provided on the second roller support 64b is in a planar shape parallel to the central axes L1 and L2, and faces the second opposed surface 71b of the roller 44 arranged between the two roller supports 64a and 64b. The first and second opposed surfaces 71a and 71b facing each other in the rotational direction X1 are parallel to each other. The axial length of the first and second abutting surfaces 68a and 68b is longer than the axial length of the roller 44 (axial length of first and second opposed surfaces 71a and 71b). The width of the first and second abutting surfaces 68a and 68b in the radial direction of the clutch 40 is a width equal to or greater than the width of the first and second opposed surfaces 71a and 71b in the radial direction of the clutch 40.

As shown in FIG. 5, the maximum outer diameter of each roller 44 (that is, longitudinal width of roller 44 in an axial view) D1 is longer than a distance D2 between the first abutting surface 68a and the second abutting surface 68b of each roller holding portion 62. Further, the distance D2 at each roller holding portion 62 is longer than a width D3 of each roller 44 in the rotational direction X1 (that is, in the first embodiment, length between first opposed surface 71a and second opposed surface 71b, transverse width of roller 44 in axial view). Consequently, an allowance gap G1 that determines the rotational range of the roller 44 about the central axis L3 is provided between the two roller supports 64a and 64b and the roller 44 arranged between the two roller supports 64a and 64b. Therefore, each roller 44 is restricted in rotation about the central axis L3 by the two roller supports 64a and 64b.

As shown in FIG. 5, when the roller 44 rotates in a counterclockwise direction about its central axis L3 between the two roller supports 64a and 64b as viewed from the motor unit 20 in the axial direction, the roller 44 comes into contact with the first abutting surface 68a at an end portion of the first opposed surface 71a near the first arcuate surface 72a as shown by a double-dashed lines. Further, the roller 44 comes into contact with the second abutting surface 68b at an end portion of the second opposed surface 71b near the second arcuate surface 72b. When the roller 44 rotates in a clockwise direction about its central axis L3 between the two roller supports 64a and 64b as viewed from the motor unit 20 in the axial direction, the roller 44 comes into contact with the first abutting surface 68a at an end portion of the first opposed surface 71a near the second arcuate surface 72b as shown by the double-dashed lines. Further, the roller 44 comes into contact with the second abutting surface 68b at an end portion of the second opposed surface 71b near the first arcuate surface 72a. In this manner, by the rotation of the roller 44 about the central axis L3 being restricted by the two roller supports 64a and 64b, a sliding contact area A1 that can slide on the inner circumferential surface 41c of the clutch housing 41 is determined on the outer circumferential surface of the roller 44.

As shown in FIGS. 2 and 6A, when held by the support member 43 of the above structure, the two rollers 44 are spaced at equal angular intervals in the rotational direction X1 (that is, at 180° intervals in the first embodiment). Since the roller supports 64a and 64b holding the rollers 44 are inserted and arranged in the clutch housing 41, the rollers 44 radially face the clutch housing 41 inside the clutch housing 41. Further, each roller 44 can contact the inner circumferential surface 41c of the clutch housing 41 at a portion corresponding to the sliding contact area A1 on its first arcuate surface 72a (refer to FIG. 5) from between the two roller supports 64a and 64b. The support member 43 is relatively rotatable with respect to the clutch housing 41 in the rotational direction X1.

The roller release portions 57 of the drive side rotating body 42 are inserted into the clutch housing 41 through the inner peripheral side of the ring 61 of the support member 43. Further, each roller release portion 57 is arranged between the two roller holding portions 62, and is circumferentially adjacent to the roller holding portions 62. Consequently, both end portions (elastic portions 58) of each roller release portion 57 in the rotational direction X1 face the first roller support 64a of one roller holding portion 62 and the second roller support 64b of the other roller holding portion 62 in the rotational direction X1. The support member 43 and the drive side rotating body 42 are relatively rotatable in the rotational direction X1. When the drive side rotating body 42 rotates, the roller release portions 57 come into contact with the roller supports 64a and 64b located forward in the rotational direction.

As shown in FIGS. 2 and 3, the driven side rotating body 45 is formed integrally with a proximal end portion (upper end portion in FIG. 2) of the worm shaft 34, and is made of metal. The driven side rotating body 45 includes a control portion 81 and a driven side connecting portion 82 axially arranged side by side. The driven side connecting portion 82 is provided on the proximal end side (upper side in FIG. 2) of the control portion 81.

The control portion 81 is formed integrally with the worm shaft 34, and is in a columnar shape extending in the axial direction of the worm shaft 34. The control portion 81 has a central axis coinciding with the central axis L2 of the worm shaft 34, and is formed coaxially with the worm shaft 34. As shown in FIG. 6A, when viewed from the central axis L2 direction, the control portion 81 is in a point symmetrical shape with the central axis L2 of the worm shaft 34 as the center of symmetry.

Two control surfaces 83 are formed on the outer circumferential surface of the control portion 81. The control surfaces 83 are formed in two locations circumferentially at equal angular intervals (that is, at 180° intervals in the first embodiment) on the outer circumferential surface of the control portion 81. The control surfaces 83 are in a planar shape parallel to the axial direction and orthogonal to the radial direction of the driven side rotating body 45. Further, the two control surfaces 83 are parallel to each other, and the axial length of the control surfaces 83 is longer than the axial length of the rollers 44.

As shown in FIGS. 2 and 6B, the driven side connecting portion 82 is in a columnar shape extending in the axial direction of the worm shaft 34. The driven side connecting portion 82 has a central axis coinciding with the central axis L2 of the worm shaft 34, and is formed coaxially with the worm shaft 34. The driven side connecting portion 82 is made slightly thinner than the driven shaft insertion hole 54. The driven side connecting portion 82 has a substantially elliptical shape in the cross-sectional shape orthogonal to the axial direction, and its cross-sectional shape is axially uniform. In an axial view, the longitudinal direction of the driven side connecting portion 82 is a direction parallel to the control surfaces 83, and the transverse direction of the driven side connecting portion 82 is a direction orthogonal to the control surfaces 83 (see also FIG. 6A). As shown in FIG. 6B, when viewed from the central axis L2 direction, the driven side connecting portion 82 is in a point symmetrical shape with the central axis L2 of the worm shaft 34 as the center of symmetry.

Two first driven side transmission surfaces 84 and two second driven side transmission surfaces 85 are formed on the outer circumferential surface of the driven side connecting portion 82. One first driven side transmission surface 84 of the two first driven side transmission surfaces 84 is formed 180° opposite to the other first driven side transmission surface 84. The two first driven side transmission surfaces 84 are each in a planar shape parallel to the axial direction, and are parallel to each other. The distance between the two first driven side transmission surfaces 84 is made equal to the distance between the two drive side transmission surfaces 54a provided in the driven shaft insertion hole 54 of the drive side rotating body 42.

The second driven side transmission surfaces 85 are each formed between the two first driven side transmission surfaces 84. One second driven side transmission surface 85 is formed 180° opposite to the other second driven side transmission surface 85. The two second driven side transmission surfaces 85 are each in a planar shape parallel to the axial direction, and are parallel to each other. The distance between the two second driven side transmission surfaces 85 is made equal to the distance between the two drive side transmission surfaces 54a provided in the driven shaft insertion hole 54 of the drive side rotating body 42. The first driven side transmission surfaces 84 and the second driven side transmission surfaces 85 are axially formed from one end to the other end of the driven side connecting portion 82 in the axial direction.

As shown in FIG. 2, the driven side rotating body 45 as described above is inserted into the clutch housing 41 and the support member 43 from the side opposite to the drive side rotating body 42. The driven side rotating body 45 is arranged coaxially with the clutch housing 41, the drive side rotating body 42, and the support member 43.

As shown in FIG. 6B, the driven side connecting portion 82 is loosely fitted in the driven shaft insertion hole 54 integrally rotatably with the drive side rotating body 42. The first and second elastic members 55 and 56 are interposed between the outer circumferential surface of the driven side connecting portion 82 loosely fitted in the driven shaft insertion hole 54 and the inner circumferential surface of the driven shaft insertion hole 54. Specifically, the two second elastic members 56 are in contact with both end portions of the driven side connecting portion 82 in the longitudinal direction in an axial view. The four first elastic members 55 are interposed between the two first driven side transmission surfaces 84 and the two second driven side transmission surfaces 85 and the drive side transmission surface 54a.

When the drive side rotating body 42 rotates about the central axis with respect to the driven side rotating body 45, the drive side transmission surfaces 54a come into contact with the first driven side transmission surfaces 84 or the second driven side transmission surfaces 85 in the rotational direction while elastically deforming the first elastic members 55. Thus, the drive side rotating body 42 is engaged with the driven side rotating body 45 in the rotational direction to transmit the rotational driving force of the drive side rotating body 42 to the driven side rotating body 45.

As shown in FIG. 6A, the control portion 81 of the driven side rotating body 45 is inserted into the support member 43 such that the rollers 44 are interposed between the control surfaces 83 and the inner circumferential surface 41c of the clutch housing 41, and radially faces the clutch housing 41 and the rollers 44. That is, the support member 43 holds the rollers 44 between the inner circumferential surface 41c of the clutch housing 41 and the control surfaces 83 of the driven side rotating body 45.

The distance between each control surface 83 and the inner circumferential surface 41c of the clutch housing 41 (spacing in a direction orthogonal to control surface 83) changes in the rotational direction of the driven side rotating body 45. In the first embodiment, the distance between each control surface 83 and the inner circumferential surface 41c of the clutch housing 41 is the longest at the circumferential center of the control surface 83, and gradually becomes shorter from the circumferential center to both circumferential ends of the control surface 83. The distance between the circumferential center of each control surface 83 and the inner circumferential surface 41c of the clutch housing 41 is longer than the maximum outer diameter D1 of each roller 44 (refer to FIG. 5). The distance between a circumferential end of each control surface 83 and the inner circumferential surface 41c of the clutch housing 41 is shorter than the maximum outer diameter D1 of each roller 44.

As shown in FIG. 5, in the clutch 40 of the first embodiment, grease GR is applied to the inner circumferential surface 41c of the clutch housing 41. The grease GR is arranged to fill also a space between the inner circumferential surface 41c of the clutch housing 41 and the first arcuate surfaces 72a of the rollers 44. The grease GR has a function to increase sliding friction between the inner circumferential surface 41c of the clutch housing 41 and the rollers 44 when the rotation shaft 24 is not rotationally driven (that is, when drive side rotating body 42 is not rotationally driven). In the drawings other than FIG. 5, the grease GR is not illustrated.

The operation of the motor 10 configured as described above will now be described focusing on the operation of the clutch 40.

Figure 7A:
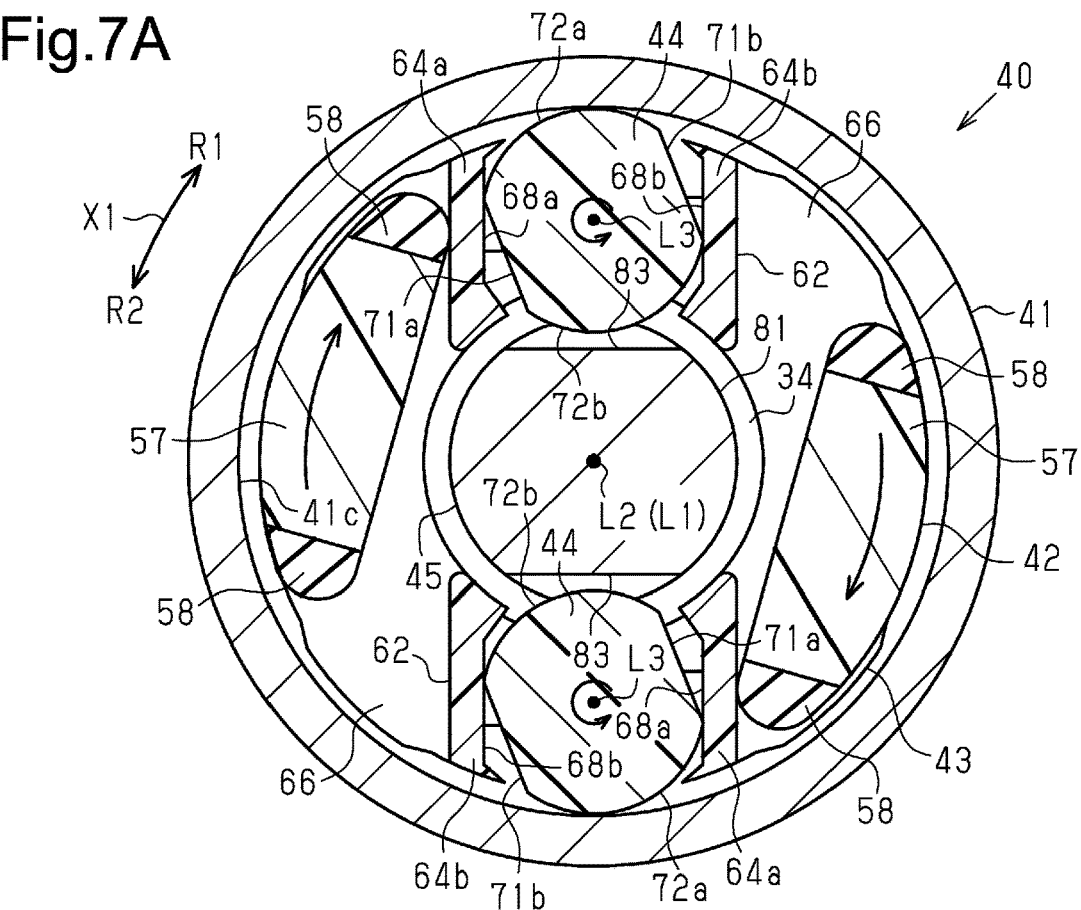
FIGS. 7A and 7B are cross-sectional views for explaining the operation of the clutch in the first embodiment.
Figure 7B:
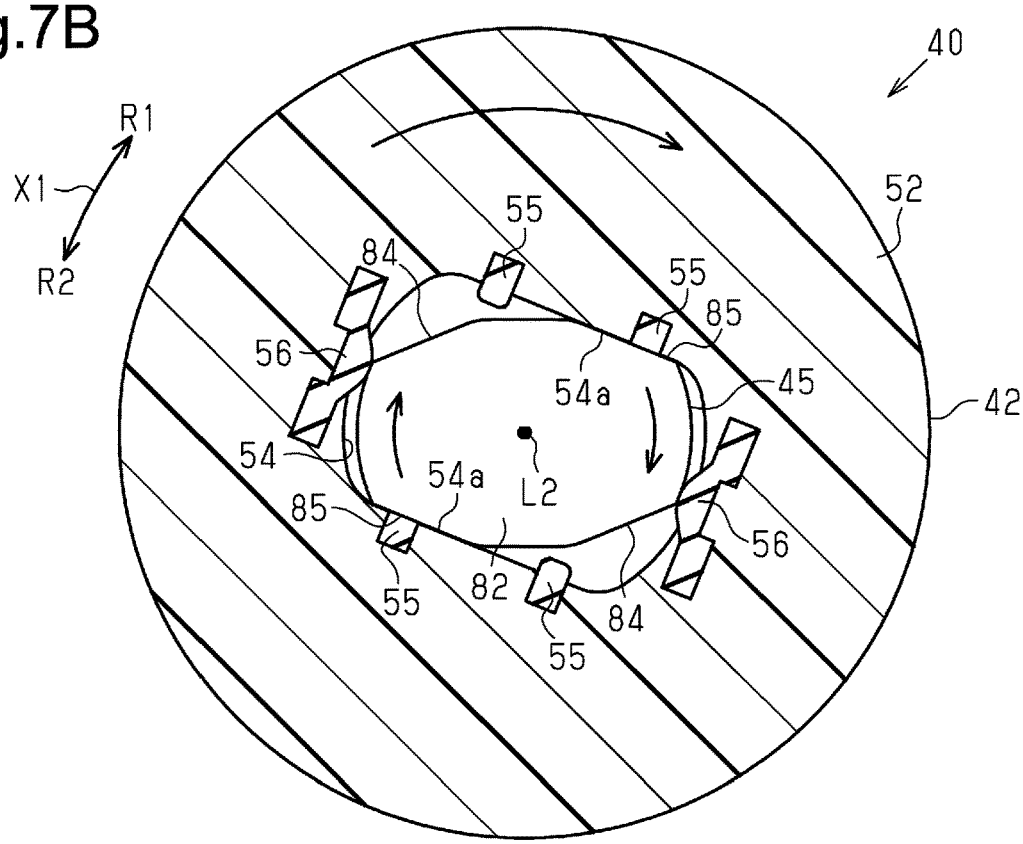

As shown in FIGS. 2 and 7A, when the motor unit 20 is driven by energizing the motor unit 20, the drive side rotating body 42 rotates together with the rotation shaft 24. That is, the drive side rotating body 42 is rotationally driven. FIGS. 7A and 7B illustrate a case where the drive side rotating body 42 is rotationally driven in a first direction R1. As shown in FIG. 7A, with the rotation of the drive side rotating body 42 in the first direction R1, the circumferential ends (elastic portions 58) of the roller release portions 57 of the drive side rotating body 42 at the front side in the rotational direction come into contact with the first roller supports 64a of the roller holding portions 62 in the rotational direction, pressing the first roller supports 64a and the rollers 44 in the first direction R1. This causes each roller 44 to be arranged at a circumferentially central portion of the control surface 83 of the driven side rotating body 45. In other words, the rollers 44 are brought into an unlocked state in which the rollers 44 are not sandwiched between the control surfaces 83 and the clutch housing 41 (that is, rollers 44 do not interfere with rotation of driven side rotating body 45).

In the unlocked state, as shown in FIG. 7B, the drive side transmission surfaces 54a of the drive side rotating body 42 come into contact with the second driven side transmission surfaces 85 of the driven side connecting portion 82 from the first direction R1 so that the drive side rotating body 42 and the driven side rotating body 45 are connected in the rotational direction X1 in an integrally rotatable manner. As a result, the rotational driving force of the drive side rotating body 42 (rotation shaft 24) is transmitted to the driven side rotating body 45 (worm shaft 34), and the rotation shaft 24 and the worm shaft 34 integrally rotate in the first direction R1.

At this time, as shown in FIGS. 5 and 7A, by the first roller supports 64a being pressed by the roller release portions 57 in the first direction R1, the support member 43 and the rollers 44 rotate about the rotation axis of the drive side rotating body 42 (same as central axis L1) together with the drive side rotating body 42 and the driven side rotating body 45. Due to frictional force between each roller 44 and the inner circumferential surface 41c of the clutch housing 41, the roller 44 tends to rotate about its central axis L3 in a direction opposite to the rotational direction of the support member 43 between the two roller supports 64a and 64b. When each roller 44 rotates about its central axis L3 by an amount allowed by the allowance gap G1 between the roller 44 and the roller supports 64a and 64b holding the roller 44, the roller 44 comes into contact with the roller supports 64a and 64b on both sides of the roller 44 in the rotational direction X1. In the first embodiment, when the drive side rotating body 42 rotates in the first direction R1, each roller 44 comes into contact with the first abutting surface 68a at the end portion of the first opposed surface 71a near the first arcuate surface 72a, and comes into contact with the second abutting surface 68b at the end portion of the second opposed surface 71b near the second arcuate surface 72b. Thus, the rollers 44 are restricted in rotation about the central axes L3 by the support member 43. Consequently, even when the rollers 44 rotate about the rotation axis of the drive side rotating body 42 together with the drive side rotating body 42 during the rotational driving of the drive side rotating body 42, the rollers 44 rotate about their central axes L3 only within the range allowed by the support member 43.

The rotation of the worm shaft 34 in the first direction R1 is transmitted to the output shaft 38 while being decelerated between the worm shaft 34 and the worm wheel 37, and is output from the output shaft 38. Then, the vehicle window glass is raised or lowered by the window regulator (not shown) according to the rotational direction of the output shaft 38. When the energization of the motor unit 20 is stopped, the rotational driving of the rotation shaft 24, that is, the rotational driving of the drive side rotating body 42 is stopped.

Figure 8A:
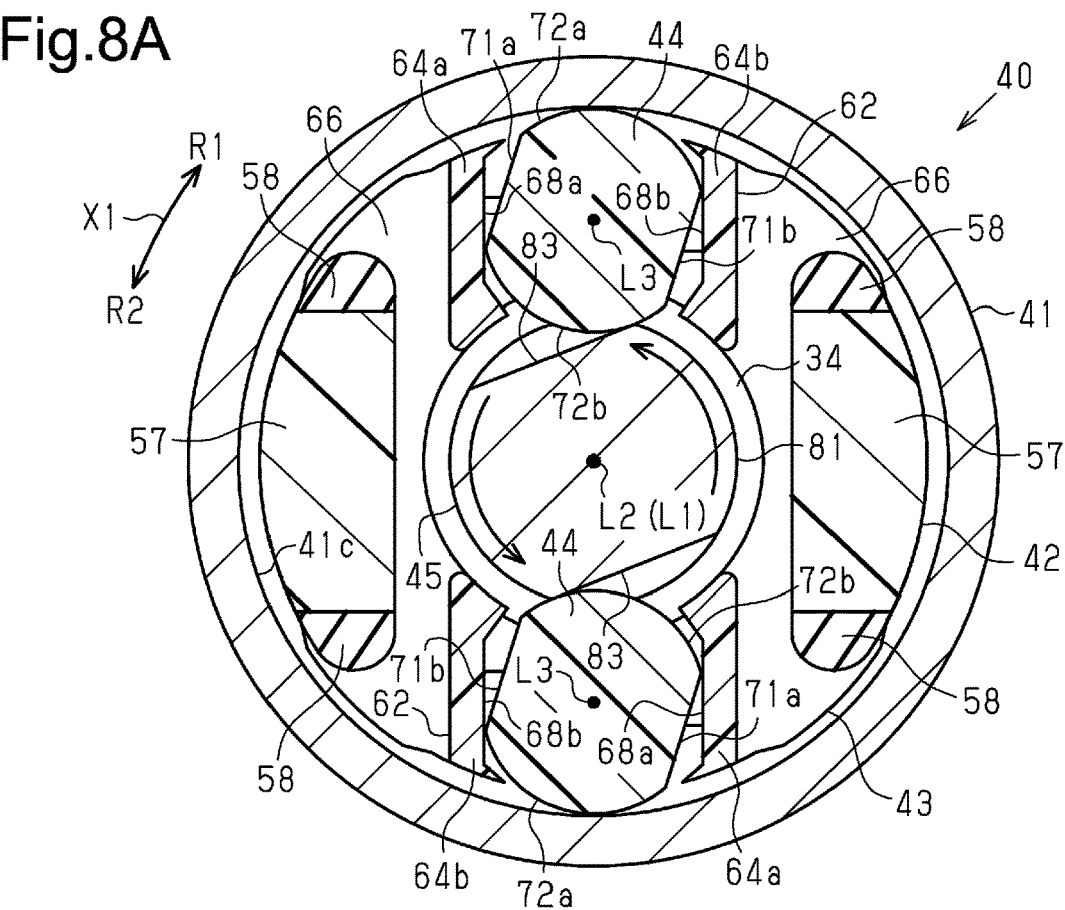
FIGS. 8A and 8B are cross-sectional views for explaining the operation of the clutch in the first embodiment.
Figure 8B:
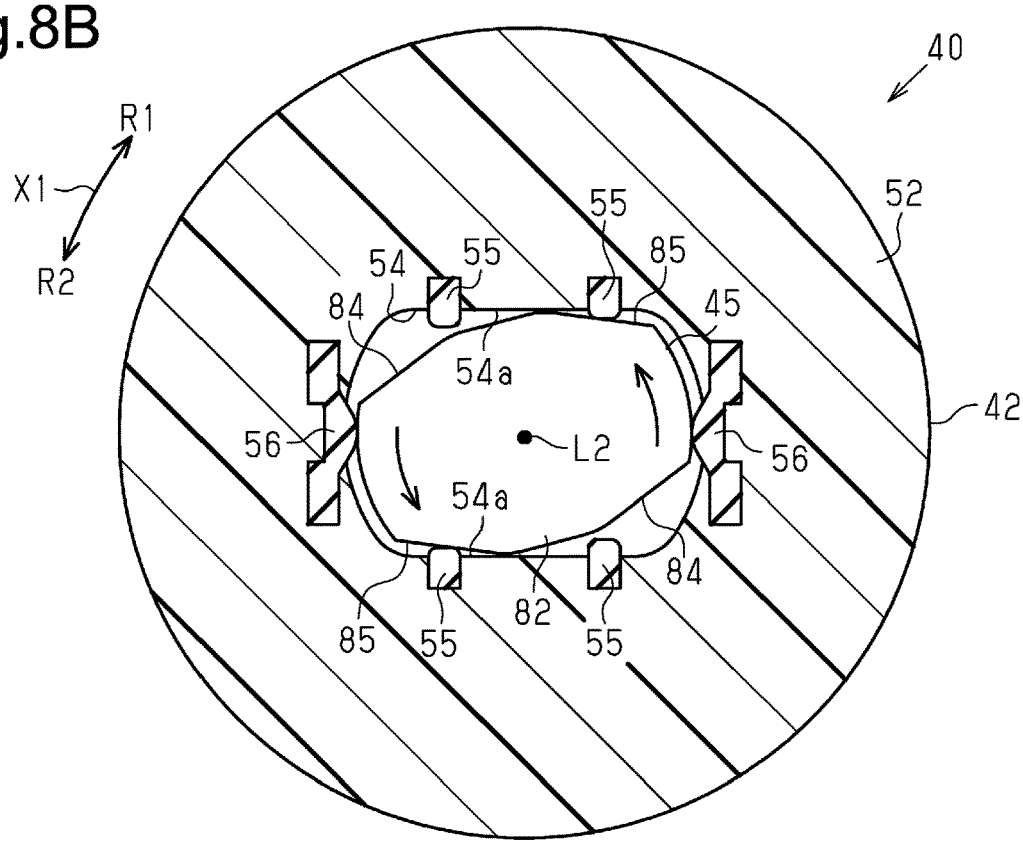

As shown in FIGS. 8A and 8B, when a load is applied from the load side (window regulator side in first embodiment) to the output shaft 38 in a state where the driving of the motor unit 20 is stopped, that is, while the rotation shaft 24 (drive side rotating body 42) is not rotationally driven, the driven side rotating body 45 tends to rotate due to the load. FIGS. 8A and 8B illustrate a case where the driven side rotating body 45 tends to rotate in a second direction R2. Then, the control surfaces 83 of the driven side rotating body 45 press the rollers 44 arranged between the control surfaces 83 and the inner circumferential surface 41c of the clutch housing 41 to the outer peripheral side. For each roller 44 pressed by the control surface 83, the first arcuate surface 72a abuts on the inner circumferential surface 41c of the clutch housing 41 between the two roller supports 64a and 64b, and the second arcuate surface 72b abuts on a portion of the control surface 83 closer to a circumferential end portion than to the circumferential center of the control surface 83 (rearward end portion of control surface 83 in second direction R2). Then, each roller 44 is sandwiched between the portion of the control surface 83 closer to the rearward end portion in the second direction R2 and the inner circumferential surface 41c of the clutch housing 41. As a result, the rollers 44 serve as wedges to hinder rotation (rotation in second direction R2) of the driven side rotating body 45 (that is, to lock rotation of worm shaft 34). This hinders rotation of the output shaft 38 when the rotation shaft 24 (drive side rotating body 42) is not rotationally driven. In a state (state shown in FIG. 8A) where the driven side rotating body 45 is located in a locked position (position sandwiching rollers 44 between driven side rotating body 45 and clutch housing 41), as shown in FIG. 8B, the second driven side transmission surfaces 85 of the driven side connecting portion 82 do not contact the drive side transmission surfaces 54a of the drive side rotating body 42 in the rotational direction (second direction R2).

Also, when the driven side rotating body 45 tends to rotate in the first direction R1 while the motor unit 20 (drive side rotating body 42) is not driven, the rotation of the driven side rotating body 45 is hindered in the same manner. That is, when each roller 44 is sandwiched between a portion of the control surface 83 closer to a rearward end portion in the first direction R1 and the inner circumferential surface 41c of the clutch housing 41, the rollers 44 serve as wedges to hinder rotation of the driven side rotating body 45 (rotation in first direction R1) (that is, to lock the rotation of worm shaft 34).

Figure 9A:
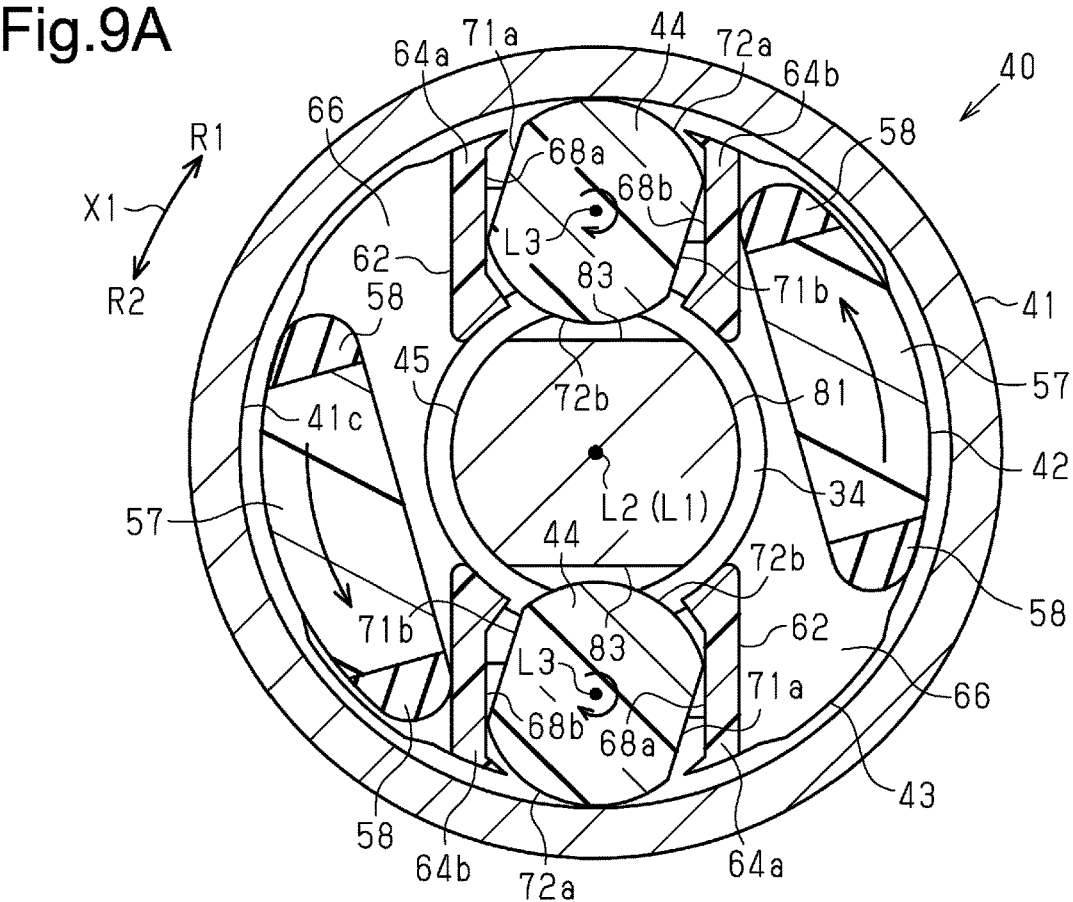
FIGS. 9A and 9B are cross-sectional views for explaining the operation of the clutch in the first embodiment.
Figure 9B:
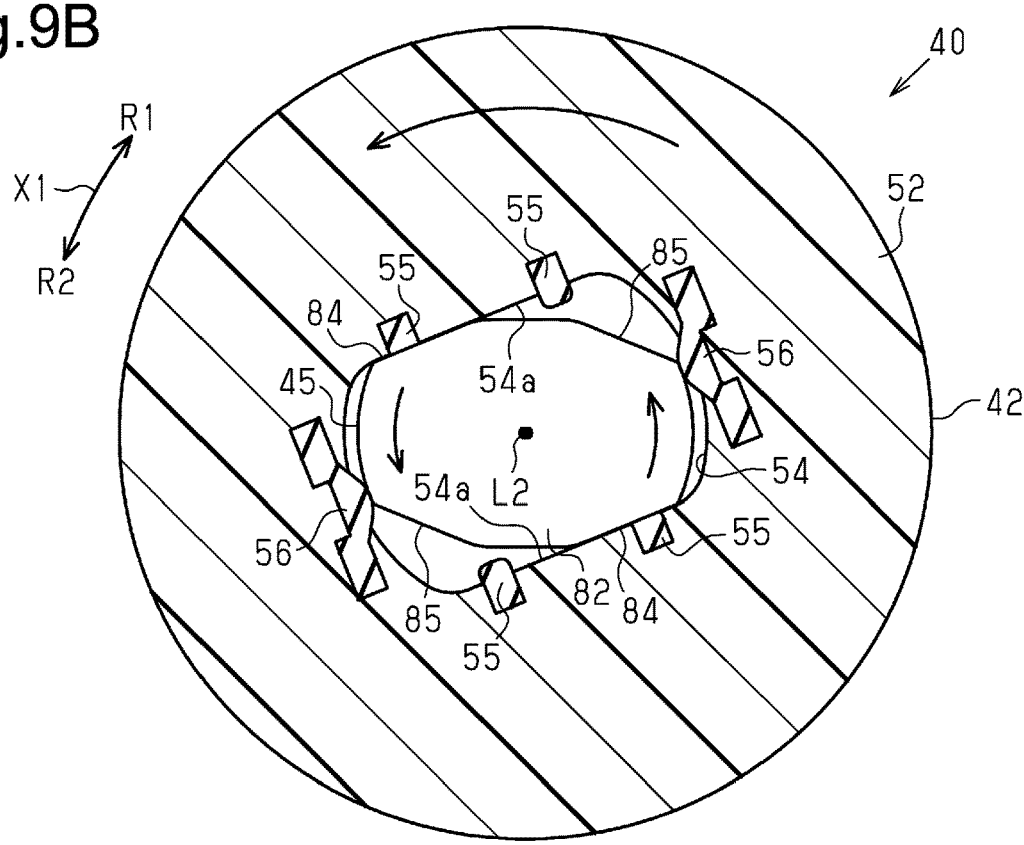

As shown in FIGS. 2, 9A, and 9B, when the drive side rotating body 42 rotates together with the rotation shaft 24 in the second direction R2 by the driving of the motor unit 20, the rotational direction of each member is reversed. In the same operation as when the drive side rotating body 42 rotates in the first direction R1 (refer to FIG. 7), the clutch 40 connects the rotation shaft 24 and the worm shaft 34. That is, with the rotation of the drive side rotating body 42 in the second direction R2, the circumferential end portions (elastic portions 58) of the roller release portions 57 of the drive side rotating body 42 at the front side in the rotational direction come into contact with the second roller supports 64b of the roller holding portions 62 in the rotational direction, pressing the second roller supports 64b and the rollers 44 in the second direction R2. As a result, each roller 44 is arranged at the circumferentially central portion of the control surface 83 of the driven side rotating body 45 to be brought into an unlocked state in which the roller 44 is not sandwiched between the control surface 83 and the clutch housing 41. In the unlocked state, the drive side transmission surfaces 54a of the drive side rotating body 42 abut on the first driven side transmission surfaces 84 of the driven side connecting portion 82 from the second direction R2 so that the rotational driving force of the drive side rotating body 42 (rotation shaft 24) is transmitted to the driven side rotating body 45 (worm shaft 34), and the rotation shaft 24 and the worm shaft 34 rotate integrally in the second direction R2.

At this time, as shown in FIGS. 5 and 9A, by the second roller supports 64b being pressed by the roller release portions 57 in the second direction R2, the support member 43 and the rollers 44 rotate about the rotation axis of the drive side rotating body 42 together with the drive side rotating body 42 and the driven side rotating body 45. Due to frictional force between each roller 44 and the inner circumferential surface 41c of the clutch housing 41, the roller 44 tends to rotate about its central axis L3 in a direction opposite to the rotational direction of the support member 43 between the two roller supports 64a and 64b. When each roller 44 rotates about its central axis L3 by an amount allowed by the allowance gap G1 between the roller 44 and the roller supports 64a and 64b holding the roller 44, the roller 44 comes into contact with the roller supports 64a and 64b on both sides of the roller 44 in the rotational direction X1. In the first embodiment, when the drive side rotating body 42 rotates in the second direction R2, each roller 44 comes into contact with the first abutting surface 68a at an end portion of the first opposed surface 71a near the second arcuate surface 72b, and comes into contact with the second abutting surface 68b at an end portion of the second opposed surface 71b near the first arcuate surface 72a. Thus, the rollers 44 are restricted in rotation about the central axes L3 by the support member 43. Consequently, even when the rollers 44 rotate about the rotation axis of the drive side rotating body 42 together with the drive side rotating body 42 during the rotational driving of the drive side rotating body 42, the rollers 44 rotate about their central axes L3 only within the range allowed by the support member 43.

When the rotation of the worm shaft 34 in the second direction R2 is transmitted to the output shaft 38 and output from the output shaft 38, the vehicle window glass is raised or lowered by the window regulator (not shown) according to the rotational direction of the output shaft 38. When the energization of the motor unit 20 is stopped, the rotational driving of the rotation shaft 24, that is, the rotational driving of the drive side rotating body 42 is stopped. After the driving of the motor unit 20 is stopped, as described above, the rollers 44 serve as wedges to hinder rotation of the driven side rotating body 45 (that is, to lock rotation of worm shaft 34), thereby hindering rotation of the output shaft 38 (refer to FIG. 8A).

The advantages of the first embodiment will now be described.

(1) The rollers 44 are restricted in rotation about the central axes L3 of the rollers 44 by the support member 43. Consequently, even when the rollers 44 rotate about the rotation axis of the drive side rotating body 42 together with the drive side rotating body 42 during the rotational driving of the drive side rotating body 42, the rollers 44 rotate about their central axes L3 only within the range allowed by the support member 43. Consequently, the scattering of the grease GR caused by the rotation of the rollers 44 about their central axes L3 is restricted so that the grease GR between the inner circumferential surface 41c of the clutch housing 41 and the rollers 44 can be prevented from becoming insufficient. As a result, when the rotational driving of the drive side rotating body 42 is stopped, the rollers 44 do not have difficulty in serving as wedges between the inner circumferential surface 41c of the clutch housing 41 and the control surfaces 83 of the driven side rotating body 45.

(2) When each roller 44 rotates about the central axis L3 of the roller 44 by the amount of the allowance gap G1 provided between the roller 44 and the roller supports 64a and 64b facing each other in the rotational direction X1, the roller 44 comes into contact with the roller supports 64a and 64b in the rotational direction of the roller 44. As a result, the roller supports 64a and 64b hinder further rotation of each roller 44 about the central axis L3 of the roller 44. Consequently, the scattering of the grease GR caused by the rotation of the rollers 44 about the central axes L3 of the rollers 44 can be prevented by the simple structure. As a result, the grease GR between the inner circumferential surface 41c of the clutch housing 41 and the rollers 44 can be easily prevented from becoming insufficient.

Each roller 44 can rotate about the central axis L3 of the roller 44 within the rotational range determined by the allowance gap G1 provided between the roller 44 and the roller supports 64a and 64b. That is, the position of each roller 44 with respect to the inner circumferential surface 41c of the clutch housing 41 can be changed about the central axis L3. Thus, the grease GR is moved between each roller 44 and the inner circumferential surface 41c of the clutch housing 41 with the rotation of the roller 44 about the central axis L3 within the rotational range so that the grease GR can be supplied to a portion of the roller 44 to contact the inner circumferential surface 41c of the clutch housing 41. Consequently, the grease GR between the inner circumferential surface 41c of the clutch housing 41 and the rollers 44 can be further prevented from becoming insufficient.

(3) When each roller 44 rotates about the central axis L3 of the roller 44 by the amount allowed by the allowance gap G1, the roller 44 comes into contact with the roller supports 64a and 64b on both sides of the roller 44 in the rotational direction X1. Consequently, the roller 44 in contact with the roller supports 64a and 64b can more stably maintain the position in contact with the roller supports 64a and 64b. As a result, noise in the clutch 40 is limited when the drive side rotating body 42 is rotationally driven.

(4) Each roller 44 has the planar first and second opposed surfaces 71a and 71b facing the roller supports 64a and 64b in the rotational direction X1 on both sides of the roller 44 in the rotational direction X1. Consequently, it is easy to set the allowance gap G1 provided between each roller 44 and the roller supports 64a and 64b holding the roller 44. In addition, the rollers 44 are prevented from becoming complicated in shape, and thus the rollers 44 can be easily manufactured.

(5) At the start of the rotational driving of the drive side rotating body 42, the rotational driving force of the drive side rotating body 42 is transmitted from the roller release portions 57 to the roller supports 64a or 64b, and further transmitted from the roller supports 64a or 64b to the rollers 44. At this time, the roller supports 64a or 64b to which the rotational driving force has been transmitted from the drive side rotating body 42 each bring the first abutting surface 68a or the second abutting surface 68b into surface contact with the first opposed surface 71a or the second opposed surface 71b of the roller 44, thereby being able to efficiently transmit the rotational driving force to the roller 44. Consequently, it is possible to easily release the sandwiching of the rollers 44 by the inner circumferential surface 41c of the clutch housing 41 and the driven side rotating body 45.

(6) In the motor 10, the rotation shaft 24 and the worm shaft 34 are connected by the clutch 40 in which the grease GR between the inner circumferential surface 41c of the clutch housing 41 and the rollers 44 is prevented from becoming insufficient. Consequently, when the rotation shaft 24 is not rotationally driven, further rotation of the rotation shaft 24 by the worm shaft 34 is limited.

The first embodiment may be modified as follows.

Each roller 44 may have a grease housing recess that is open in the sliding contact area A1 on the outer circumferential surface of the roller 44 and accommodates the grease GR. The grease housing recess is formed in such a manner as to leave the outer circumferential surface of the roller 44 in the sliding contact area A1, and is not formed over the entire sliding contact area A1.

For example, the roller 44 shown in FIGS. 10A and 10B has a grease housing recess 75 in one axial end portion of the roller 44 (end portion on proximal end side of the roller supports 64a and 64b). The grease housing recess 75 is open to one side of the roller 44 in the axial direction and to the outside of the roller 44 in the radial direction (that is, toward the clutch housing 41). In FIG. 10B, the sliding contact area A1 is shaded.

Further, for example, the roller 44 shown in FIGS. 11A and 11B has a grease housing recess 76 in the other axial end portion of the roller 44 (that is, end portion on distal end side of roller supports 64a and 64b). The grease housing recess 76 is open to the other side of the roller 44 in the axial direction and to the outside of the roller 44 in the radial direction (that is, toward clutch housing 41).

As shown in FIGS. 12A and 12B, the roller 44 may have grease housing recesses 75 and 76 in both end portions in the axial direction.

Further, for example, the roller 44 shown in FIGS. 13A and 13B has a grease housing recess 77 in an axially central portion. The grease housing recess 77 is radially provided in the radial direction of the first arcuate surface 72a of the roller 44 from a portion corresponding to the sliding contact area A1 on the first arcuate surface 72a.

As shown in FIGS. 14A and 14B, the roller 44 may have grease housing recesses 75 and 76 in both end portions in the axial direction, and further have a grease housing recess 77 in an axially central portion.

In the examples shown in FIGS. 10A to 14B, the grease housing recesses 75, 76, and 77 all have a rectangular shape in the shape viewed from the radial direction of the first arcuate surface 72a, but are not limited to this, and may have a circular shape, a polygonal shape, or the like. Further, the roller 44 may have four or more grease housing recesses open in the sliding contact area A1.

In this way, the grease housing recesses 75, 76, and 77 provided in the roller 44 are open in the sliding contact area A1 that can slide on the inner circumferential surface 41c of the clutch housing 41. Consequently, the grease GR accommodated in the grease housing recesses)75, 76, and 77 is drawn out toward the inner circumferential surface 41c of the clutch housing 41 as the roller 44 rotates to be supplied to a space between the roller 44 and the inner circumferential surface 41c of the clutch housing 41. Therefore, the grease GR between the inner circumferential surface 41c of the clutch housing 41 and the rollers 44 can be further prevented from becoming insufficient. As a result, when the rotational driving of the drive side rotating body 42 is stopped, the rollers 44 do not have difficulty in serving as wedges between the inner circumferential surface 41c of the clutch housing 41 and the control surfaces 83 of the driven side rotating body 45.

The rollers 44 are restricted in rotation about the central axes L3 of the rollers 44 by the support member 43. Consequently, on the outer circumferential surface of each roller 44, a portion that can contact the inner circumferential surface 41c of the clutch housing 41 can be different in curvature from a portion that can contact the control surface 83 of the driven side rotating body 45. Thus, the first arcuate surface 72a and the second arcuate surface 72b of each roller 44, which have the same curvature in the first embodiment, may have different curvatures.

Figure 15:
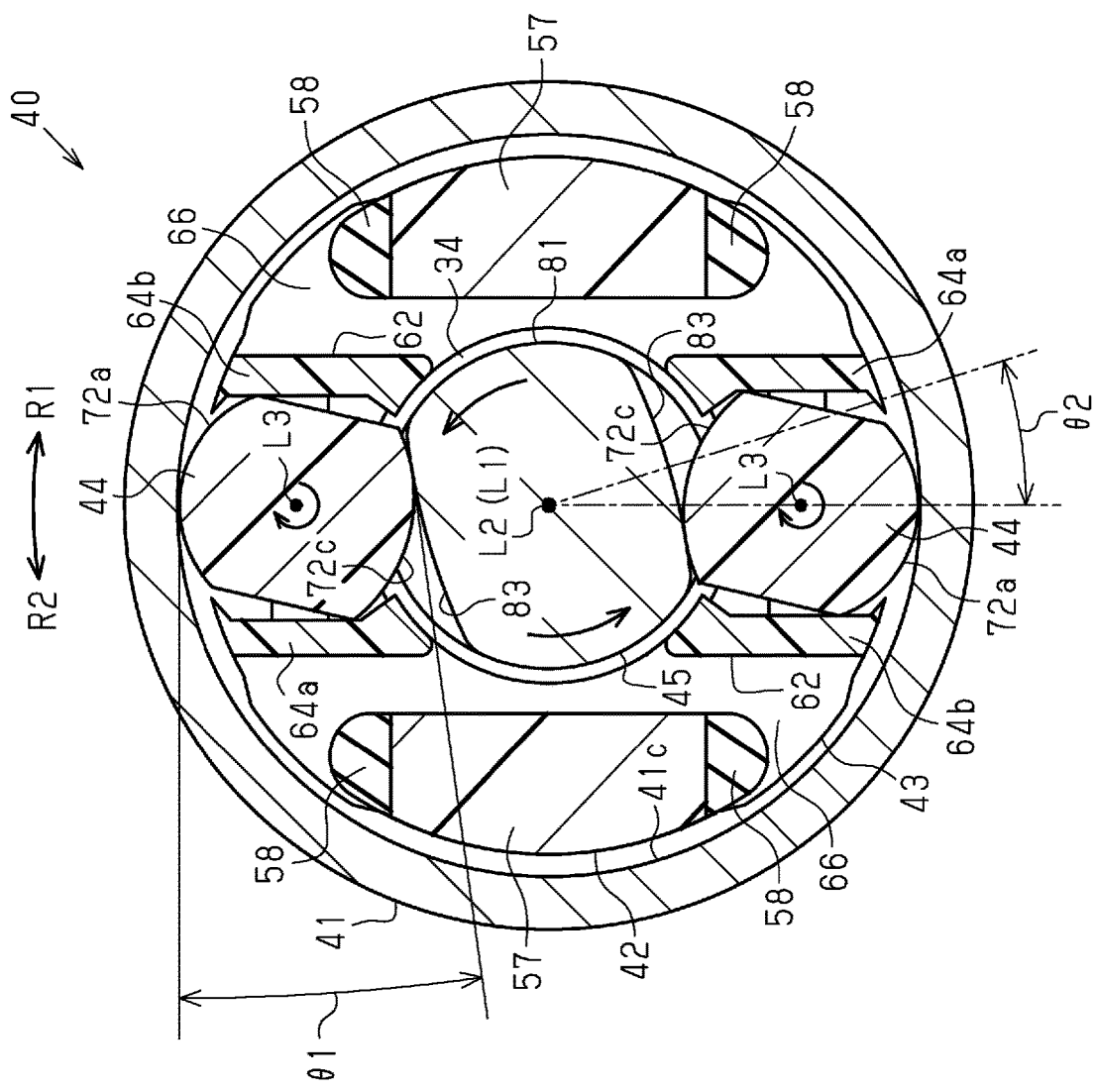
FIG. 15 is a cross-sectional view of a clutch in a different form.

For example, as shown in FIG. 15, the second arcuate surface 72c to contact the control surface 83 of the driven side rotating body 45 may be formed in an arc shape smaller in curvature than that of the first arcuate surface 72a to contact the inner circumferential surface 41c of the clutch housing 41. This allows a wedge angle θ1 when the inner circumferential surface 41c of the clutch housing 41 and the control surface 83 of the driven side rotating body 45 sandwich the roller 44 as a wedge to be smaller than that when the entire outer circumferential surface of the roller 44 has the curvature of the first arcuate surface 72a (that is, has cylindrical shape). In that case, when the rotational driving of the drive side rotating body 42 is stopped, an idle running angle θ2 that is an angle at which the driven side rotating body 45 rotates until the rollers 44 are sandwiched between the inner circumferential surface 41c of the clutch housing 41 and the control surfaces 83 is smaller than that when the entire outer circumferential surface of each roller 44 has the curvature of the first arcuate surface 72a. Consequently, when the driven side rotating body 45 tends to rotate while the drive side rotating body 42 is not rotationally driven, the rollers 44 can be sandwiched by the driven side rotating body 45 and the clutch housing 41 in a stage where the rotational speed of the driven side rotating body 45 is lower, compared to the case where the entire outer circumferential surface of each roller 44 has the curvature of the first arcuate surface 72a. Thus, when the rollers 44 tend to rotate through the driven side rotating body 45, the rollers 44 can be sandwiched by the driven side rotating body 45 and the clutch housing 41 in an earlier stage so that the rotation of the driven side rotating body 45 can be hindered quickly when the rotational driving of the drive side rotating body 42 is stopped.

Figure 16A:
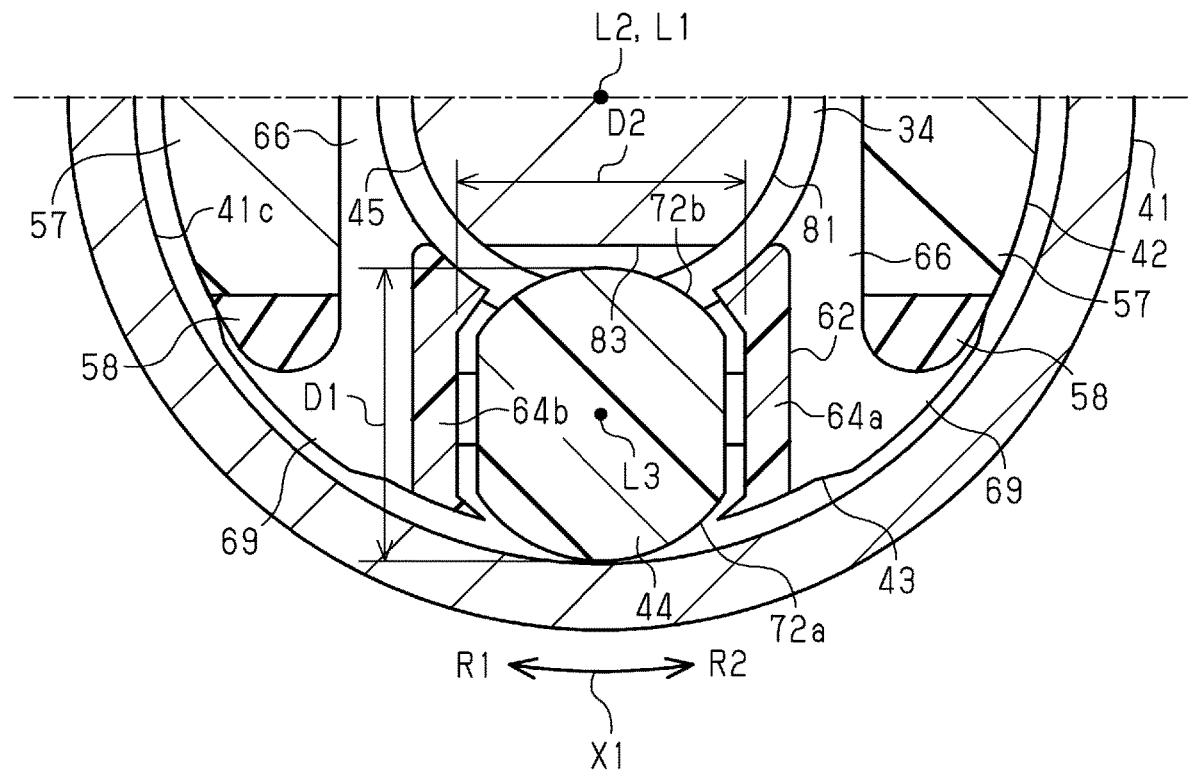
FIGS. 16A and 16B are cross-sectional views of a clutch in a different form.
Figure 16B:
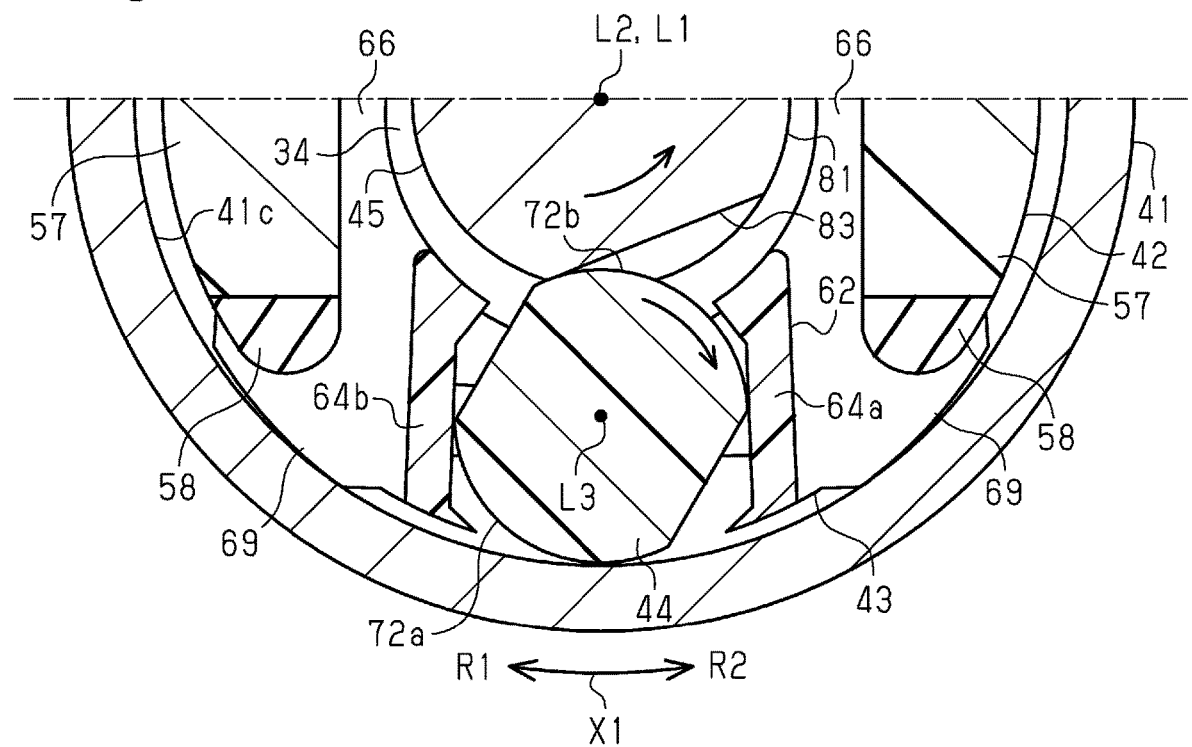

As shown in FIGS. 16A and 16B, the support member 43 may have abutting portions 69. When the drive side rotating body 42 is not rotationally driven, the abutting portions 69 are moved radially outward to abut on the inner circumferential surface 41c of the clutch housing 41 by the roller supports 64a and 64b being pressed by the rollers 44 tending to rotate about their central axes L3. More specifically, in the support member 43, the abutting portions 69 protruding radially outward (that is, toward clutch housing 41) from radially outer side surfaces of the connecting portions 66 are provided on both sides of each roller holding portion 62 in the circumferential direction (rotational direction X1). When the rollers 44 are not sandwiched by the inner circumferential surface 41c of the clutch housing 41 and the control surfaces 83 of the driven side rotating body 45 (for example, in a state shown in FIG. 16A), the abutting portions 69 are located away from the inner circumferential surface 41c of the clutch housing 41. As shown in FIG. 16B, when the driven side rotating body 45 tends to rotate while the drive side rotating body 42 is not rotationally driven, each roller 44 is rotated about its central axis L3 by frictional force between the roller 44 and the driven side rotating body 45 until the roller 44 is sandwiched by the driven side rotating body 45 and the clutch housing 41. FIG. 16B illustrates a state in which the driven side rotating body 45 tends to rotate in the second direction R2. Since the maximum outer diameter D1 of each roller 44 is longer than the distance D2 between the roller supports 64a and 64b, by rotating about the central axis L3, the roller 44 comes into contact with the roller supports 64a and 64b from the rotational direction about the central axis L3, and then further presses the roller supports 64a and 64b in directions to separate them from each other. Then, the two roller supports 64a and 64b move in directions to separate from each other, thereby moving radially outward. That is, the roller supports 64a and 64b are moved radially outward when pressed by the roller 44 that has rotated about the central axis L3. Then, the support member 43 is elastically deformed, and the connecting portions 66 provided integrally with the roller supports 64a and 64b are moved radially outward. As a result, the abutting portions 69 are moved radially outward to abut on the inner circumferential surface 41c of the clutch housing 41. The frictional force produced between the abutting portions 69 and the inner circumferential surface 41c of the clutch housing 41 limits movement of the rollers 44 in the rotational direction X1 of the drive side rotating body 42. Consequently, it becomes easier to sandwich the rollers 44 between the driven side rotating body 45 and the inner circumferential surface 41c of the clutch housing 41 so that the rotation of the driven side rotating body 45 can be more easily stopped when the drive side rotating body 42 is not rotationally driven. Further, even when a load applied to the output shaft 38 becomes greater, in addition to the frictional force between the rollers 44 and the inner circumferential surface 41c of the clutch housing 41, the frictional force between the abutting portions 69 and the inner circumferential surface 41c of the clutch housing 41 acts to hinder the rotation of the driven side rotating body 45 so that the rotation of the driven side rotating body 45 is easily hindered.

When the sandwiching of the rollers 44 by the inner circumferential surface 41c of the clutch housing 41 and the driven side rotating body 45 is released at the start of the rotational driving of the drive side rotating body 42, the support member 43 returns to its original shape so that the abutting portions 69 separate from the inner circumferential surface 41c of the clutch housing 41.

Although the abutting portions 69 are in a shape protruding radially outward from the connecting portions 66 of the support member 43 in the example shown in FIGS. 16A and 16B, the shape of the abutting portions 69 is not limited to this. Abutting portions may be of any shape in which they are moved radially outward by the roller supports 64a and 64b being moved radially outward by the rollers 44 tending to rotate about their central axes L3, to abut on the inner circumferential surface 41c of the clutch housing 41 when the drive side rotating body 42 is not rotationally driven. For example, the outer circumferential surfaces of the connecting portions 66, radially outer side surfaces of the roller supports 64a and 64b, or the like may be configured to form abutting portions.

In the first embodiment, in the roller supports 64a and 64b, portions on which the rollers 44 that have rotated about the central axes L3 abut are the planar first and second abutting surfaces 68a and 68b. However, the first and second abutting surfaces 68a and 68b on which the rollers 44 that have rotated about the central axes L3 abut do not necessarily need to be planar. For example, the first and second abutting surfaces 68a and 68b may be in an arc shape when viewed from the axial direction.

In the first embodiment, each roller 44 has the planar first and second opposed surfaces 71a and 71b on both sides in the rotational direction X1. However, in each roller 44, the first and second opposed surfaces 71a and 71b, which are portions abutting on the roller supports 64a and 64b when the roller 44 has rotated about the central axis L3, do not necessarily need to be planar. That is, the rollers 44 do not necessarily need to be in a shape between two planes in widthwise direction. The roller 44 may be of any shape that has a longitudinal direction and a transverse direction when viewed from the axial direction and is an axially extending columnar shape. For example, each roller 44 may have the first and second opposed surfaces 71a and 71b in an arc shape when viewed from the axial direction (however, roller 44 is not cylindrical). Further, for example, the rollers 44 may be elliptical in shape when viewed from the axial direction.

In the first embodiment, when each roller 44 rotates about the central axis L3 of the roller 44 by the amount allowed by the allowance gap G1, the roller 44 comes into contact with the roller supports 64a and 64b on both sides of the roller 44 in the rotational direction X1. However, when each roller 44 rotates about the central axis L3 of the roller 44 by the amount allowed by the allowance gap G1, the roller 44 may come into contact with the roller support 64a or the roller support 64b only on one side of the roller 44 in the rotational direction X1. In this case, each roller 44 is formed, for example, in a shape in which a part of the outer periphery of a cylinder is planar (substantially D-shaped in axial view).

In the first embodiment, by the provision of the allowance gap G1 between the two roller supports 64a and 64b and each roller 44, the rotational range of the roller 44 about the central axis L3 is restricted. However, as long as the rotation of each roller 44 about the central axis L3 is restricted, the allowance gap G1 does not necessarily need to be provided between the roller supports 64a and 64b and the roller 44. For example, the first opposed surface 71a of each roller 44 may abut on the first abutting surface 68a of the roller support 64a at all times, and the second opposed surface 71b of the roller 44 may abut on the second abutting surface 68b of the roller support 64b at all times. This restricts the rotation of each roller 44 about its central axis L3 by the roller supports 64a and 64b so as not to rotate about its central axis L3. Also in this case, the scattering of the grease GR caused by the rotation of the rollers 44 about their central axes L3 is prevented so that the grease GR between the inner circumferential surface 41c of the clutch housing 41 and the rollers 44 can be prevented from becoming insufficient.

Figure 17:
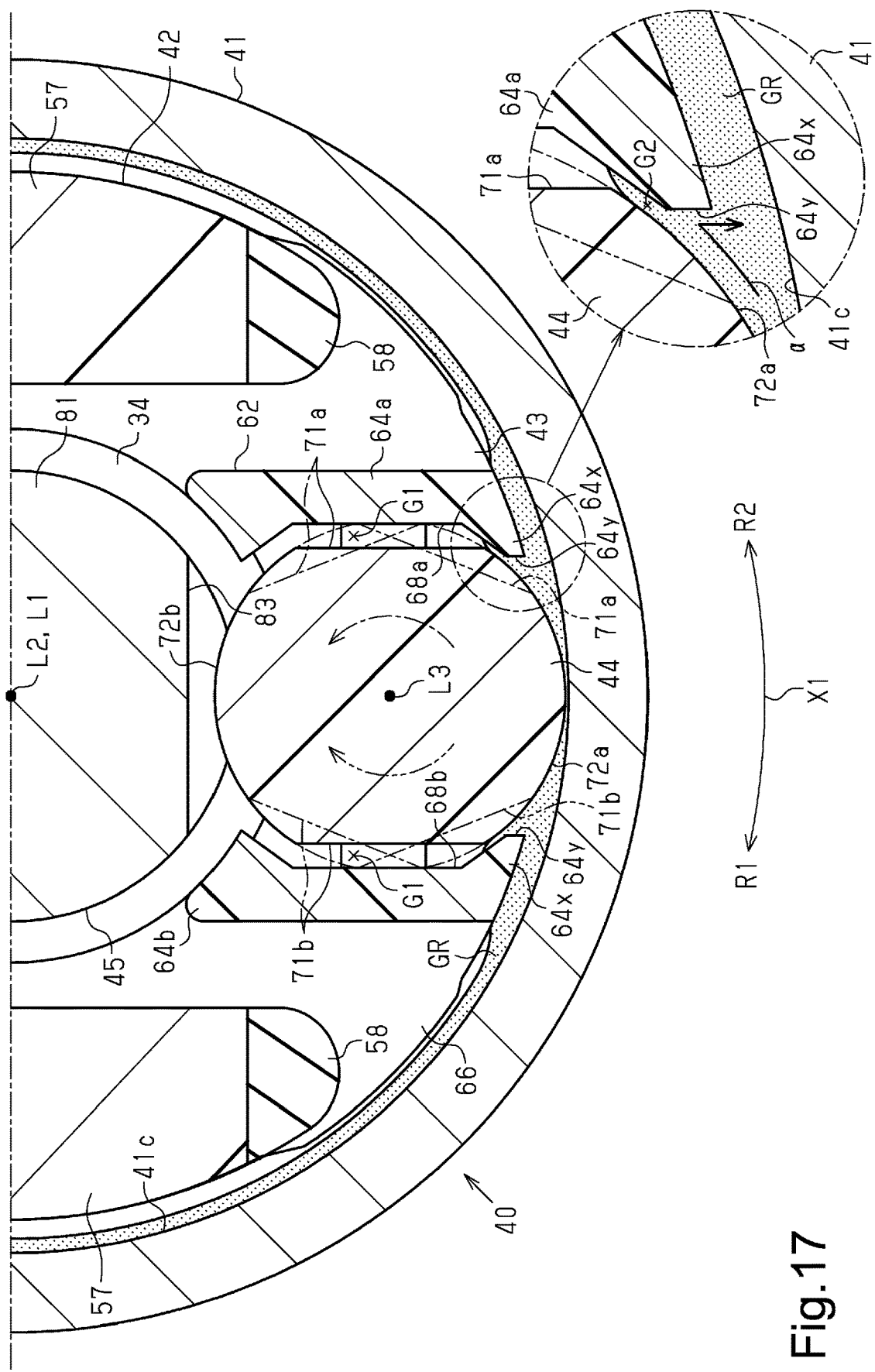
FIG. 17 is a partially enlarged cross-sectional view of a clutch in a different form.

The roller supports 64a and 64b may be modified as shown in FIG. 17. The two roller supports 64a and 64b are each provided with a protruding piece 64x at a radially outer portion thereof. The protruding pieces 64x extend in such a manner as to face each other across the roller 44 along the inner circumferential surface 41c of the clutch housing 41 (in rotational direction X1 of drive side rotating body 42). The movement of the roller 44 radially outward or in other directions is restricted by the protruding pieces 64x. In the first embodiment shown in FIG. 5 and other drawings, a distal end portion of each protruding piece 64x is in an acute-angle protruding shape. In an example shown in FIG. 17, the distal end portion of each protruding piece 64x is provided with a distal end surface 64y. The distal end surfaces 64y form planes parallel to each other, more specifically, planes each parallel to a radial straight line connecting the central axis L1 of the rotation shaft 24 (central axis L2 of worm shaft 34) and the central axis L3 of the roller 44.

The function of the roller supports 64a and 64b like this will be described with a case where the drive side rotating body 42 and the support member 43 rotate in the first direction R1 by the driving of the motor unit 20 as a representative example. When the drive side rotating body 42 and the support member 43 rotate in the first direction R1, each first roller support 64a pressed by the drive side rotating body 42 circles around in the same direction. At this time, the protruding piece 64x of the roller support 64a travels, pushing aside the grease GR. The distal end surface 64y provided at the distal end portion of the protruding piece 64x produces flow in the grease GR toward the inner circumferential surface 41c of the clutch housing (arrow α in FIG. 17). This results in a state in which the grease GR is easily held between the inner circumferential surface 41c of the clutch housing 41 and the first arcuate surface 72a of the roller 44.

If a gap G2 between the protruding piece 64x and the first arcuate surface 72a of the roller 44 is set small with the provision of the distal end surface 64y at the distal end portion of the protruding piece 64x, escape of the grease GR into the gap G2 can be prevented. This also leads to the acceleration of the flow of the grease GR toward the inner circumferential surface 41c of the clutch housing 41 described above, contributing to creating a state in which the grease GR is easily held between the inner circumferential surface 41c of the clutch housing 41 and the first arcuate surface 72a of the roller 44.

The shape and orientation of the distal end surface 64y of each protruding piece 64x are an example, and may be changed as appropriate. For example, the distal end surface 64y may not be a single plane. Further, the distal end surface 64y may not be a surface parallel to the above-described radial straight line, and may be a plane that allows the production of the flow of the grease GR described above, that is, a plane intersecting with the rotational direction X1 of the drive side rotating body 42.

In the first embodiment, the grease GR is applied to the inner circumferential surface 41c of the clutch housing 41. However, as long as the grease GR is arranged at least between the inner circumferential surface 41c of the clutch housing 41 and the rollers 44, the location of the grease GR is not limited to that of the first embodiment.

The shapes of the clutch housing 41, the drive side rotating body 42, the support member 43, the rollers 44, and the driven side rotating body 45 forming the clutch 40 do not necessarily need to be the shapes of the first embodiment. For example, the drive side rotating body 42 may be formed integrally with the rotation shaft 24. Further, for example, the driven side rotating body 45 may be provided separately from the worm shaft 34 and fitted integrally rotatably with the worm shaft 34. Furthermore, the number of the rollers 44 is not limited to two. At least one roller 44 may be arranged between the inner circumferential surface 41c of the clutch housing 41 and the driven side rotating body 45.

In the first embodiment, the speed reduction mechanism 32 in the output unit 30 includes the worm shaft 34 and the worm wheel 37. The number of gears included in the speed reduction mechanism 32 may be appropriately changed. The speed reduction mechanism 32 does not necessarily need to be a worm speed reduction mechanism as long as it has a driven shaft connected to the rotation shaft 24 by the clutch 40. Further, the output unit 30 does not necessarily need to include the speed reduction mechanism 32 as long as it has a driven shaft connected to the rotation shaft 24 by the clutch 40 and is configured to be able to output rotation transmitted from the rotation shaft 24.

Although the motor 10 is used as the drive source of the power window device in the first embodiment, it may be used as a drive source of another device.

In the first embodiment, the clutch 40 is provided in the motor 10 to connect the rotation shaft 24 and the worm shaft 34 of the speed reduction mechanism 32. However, the clutch 40 may be provided in a device other than the motor 10 to connect a rotation shaft rotationally driven and a driven shaft to which the rotational driving force of the rotation shaft is transmitted.

Second Embodiment

A second embodiment of a motor including a clutch will now be described. Same reference numerals are given to those components that are the same as the corresponding components of the first embodiment. Such components will not be described in detail.

Figure 19:
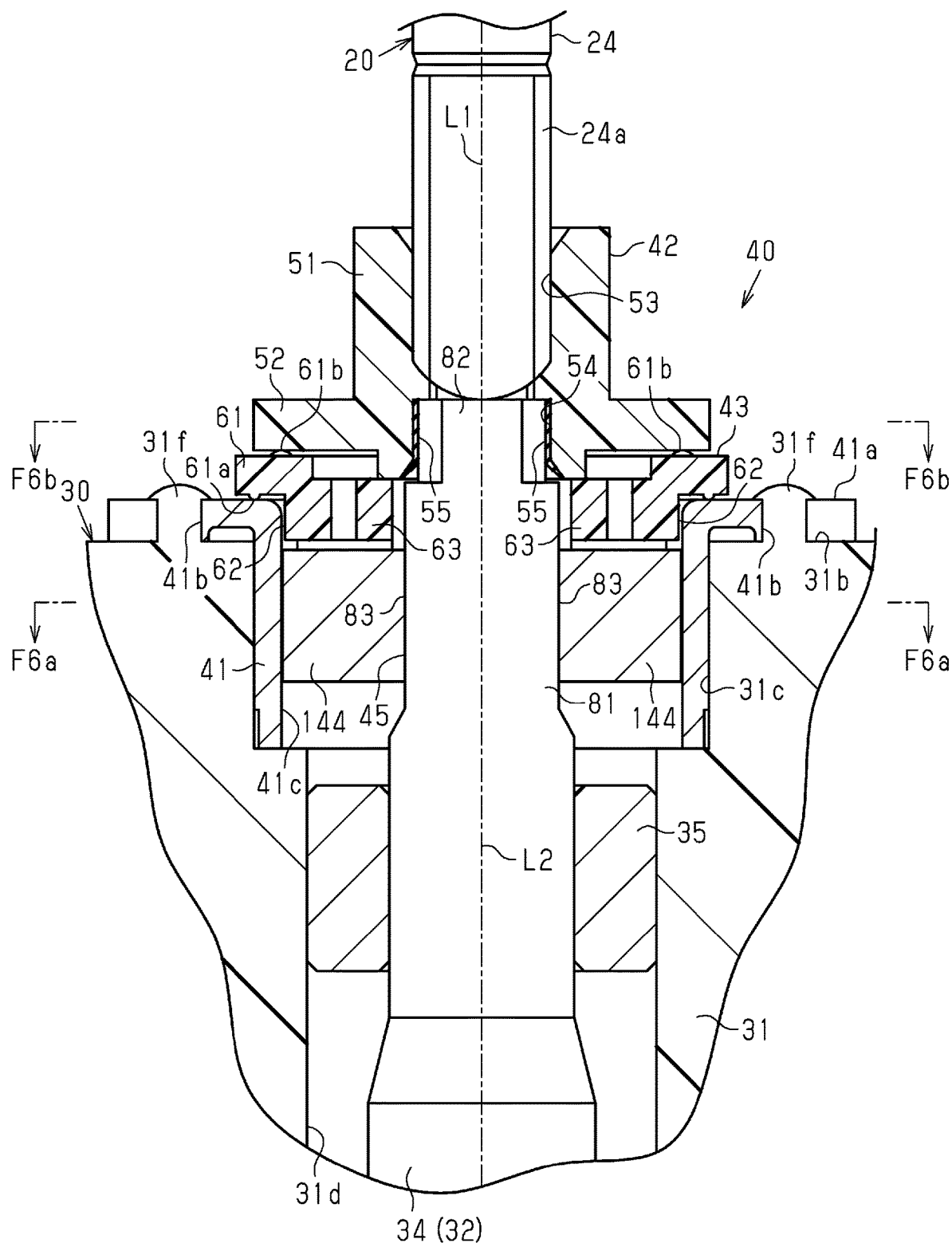
FIG. 19 is a partially enlarged cross-sectional view of the motor of the second embodiment.
Figure 20:
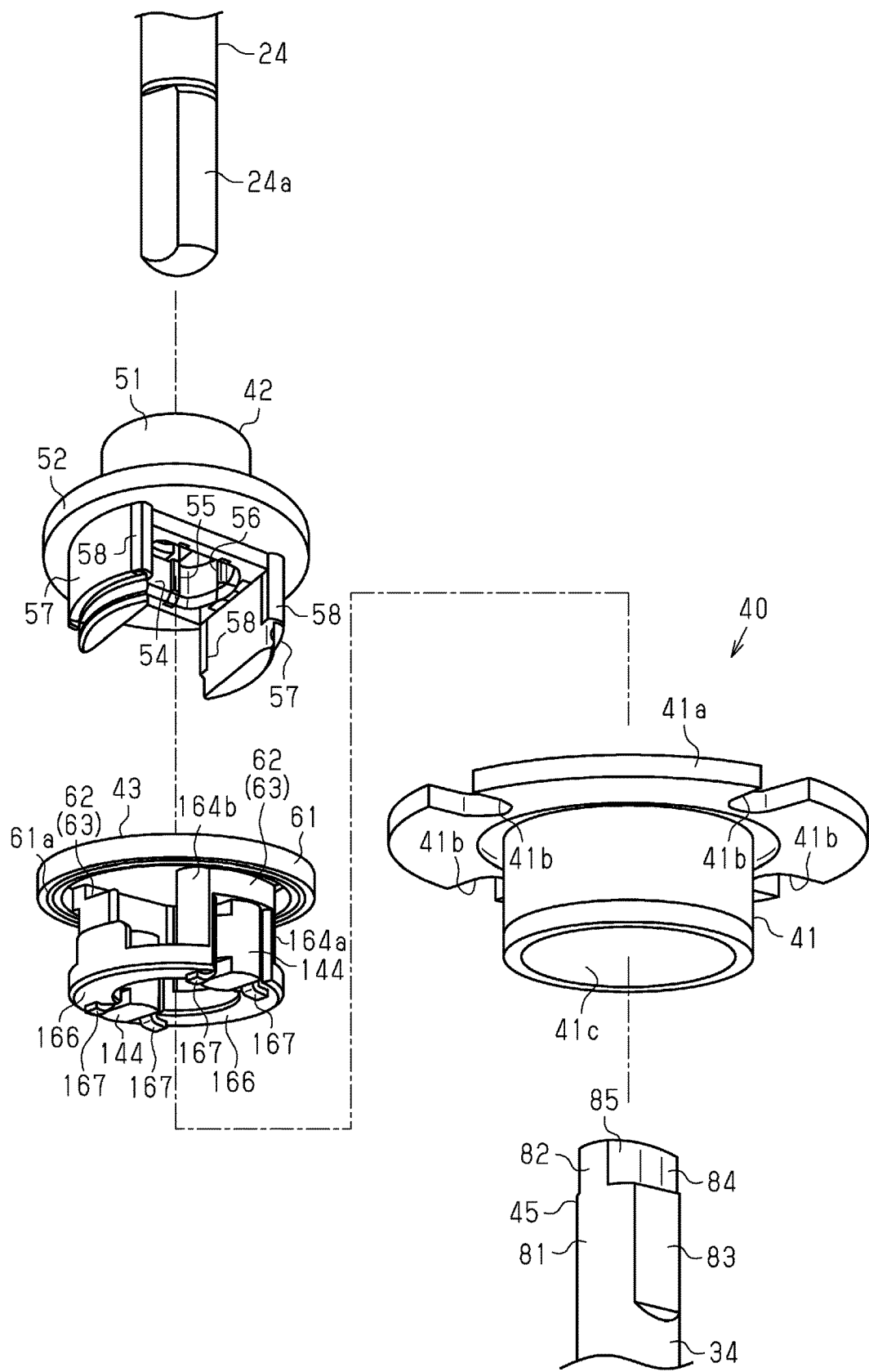
FIG. 20 is an exploded perspective view of a clutch in the second embodiment.

As shown in FIGS. 19 and 20, the support member 43 holds rollers 144 between the clutch housing 41 and the driven side rotating body 45 radially facing each other. The support member 43 of the second embodiment is made of resin.

Figure 21A:
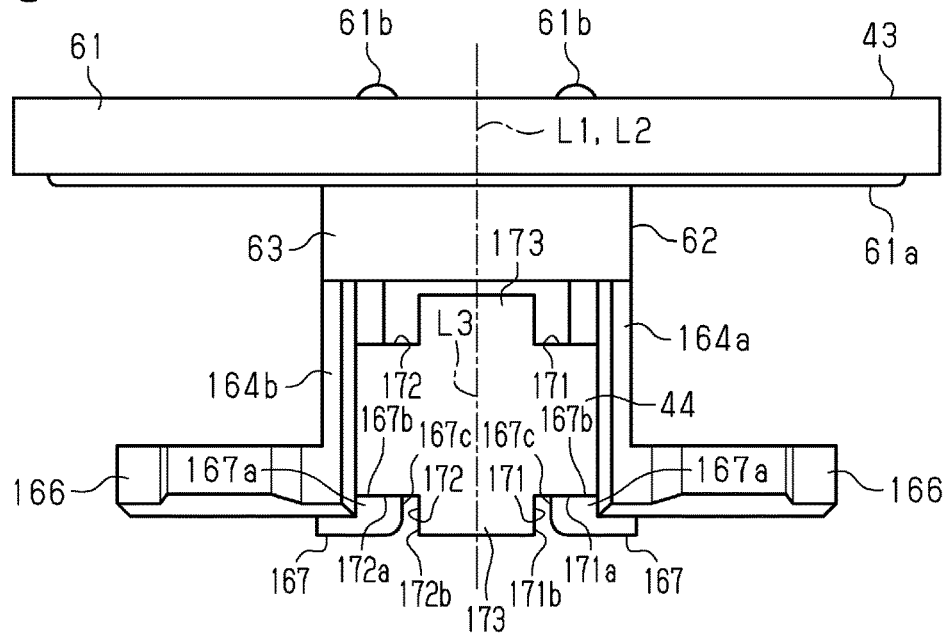
FIG. 21A is a side view of a support member holding rollers in the clutch of the second embodiment.
Figure 21B:
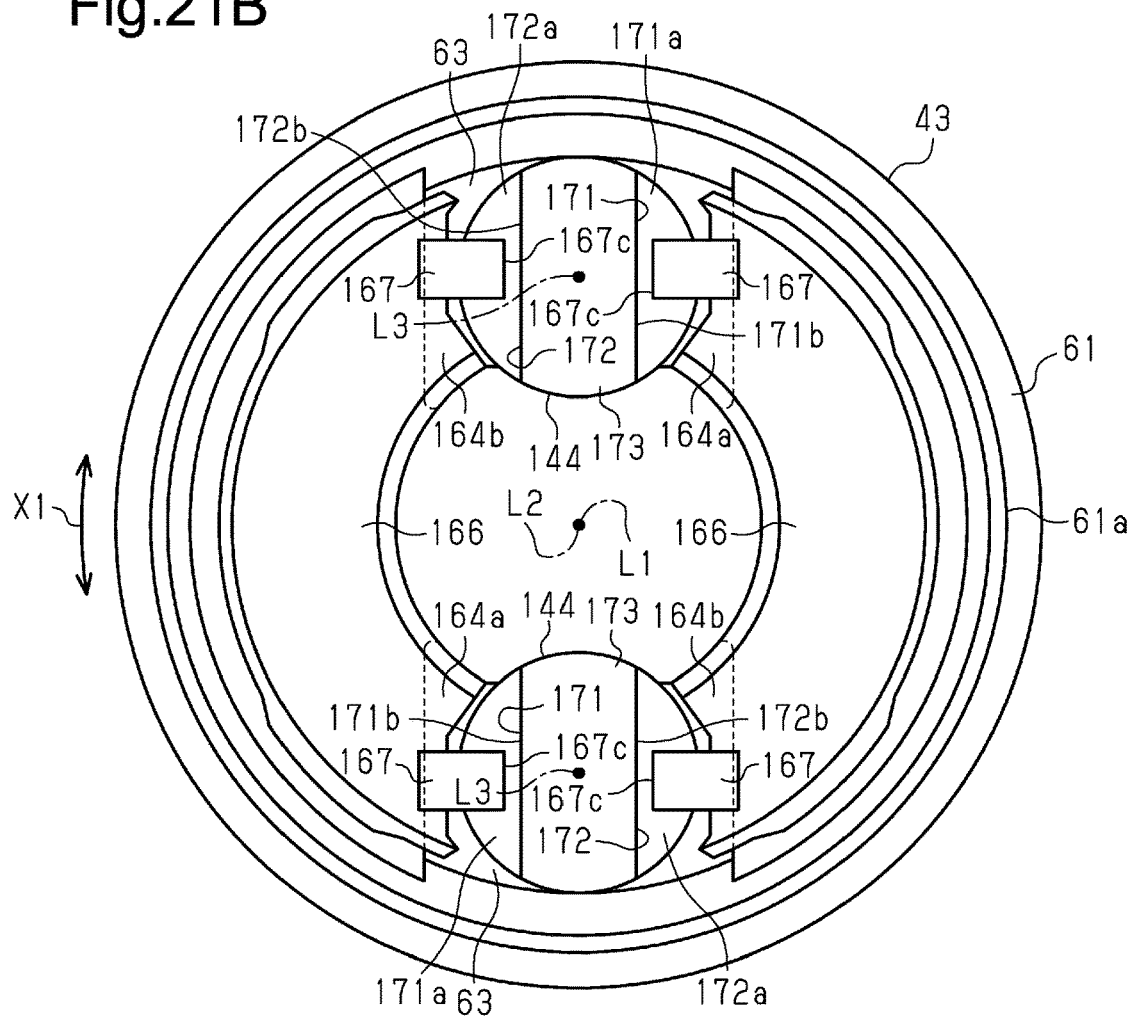
FIG. 21B is a bottom view of the support member.

As shown in FIGS. 20, 21A, and 21B, each roller holding portion 62 has an axial opposed portion (axial support portion) 63 that extends radially inward from the ring 61 and faces the roller 144 in the central axis L1 direction (that is, rotation axis direction of drive side rotating body 42). Each roller holding portion 62 also has two roller supports 164a and 164b (rotational direction opposed portions) extended to the opposite side of the ring 61 (downward in FIG. 21A) along the central axis L1 direction from both end portions of the axial opposed portion 63 in the rotational direction X1 of the drive side rotating body 42 (both end portions in lateral direction in FIG. 21). The roller supports 164a and 164b each serve as a rotational direction holding portion. The rotational direction X1 of the drive side rotating body 42 is the same as the circumferential direction of the rotation shaft 24 and the circumferential direction of the clutch 40, and hereinafter, is referred to as the rotational direction X1. In each roller holding portion 62, the two roller supports 164a and 164b are located from the axial opposed portion 63 on both sides of the roller 144 in the rotational direction X1, protrude in the central axis L1 direction, and hold the roller 144 from both sides in the rotational direction X1. Specifically, in each roller holding portion 62, the two roller supports 164a and 164b are located on both sides of the roller 144 in the rotational direction X1, and hold the roller 144 from both sides in the rotational direction X1 so that the central axis L3 of the roller 144 is parallel to the central axis L1. For the two roller supports 164a and 164b of each roller holding portion 62, when the clutch 40 is viewed from the motor unit 20 in the axial direction (that is, in state shown in FIG. 23A), the roller support located on the counterclockwise side with respect to the roller 144 is referred to as a first roller support 164a, and the roller support located on the clockwise side with respect to the roller 144 is referred to as a second roller support 164b.

In the support member 43, a distal end portion of the first roller support 164a of one roller holding portion 62 and a distal end portion of the second roller support 164b of the other roller holding portion 62 are connected to each other by a connecting portion 166. The connecting portion 166 is in an arc shape centered around the central axes L1 and L2 in an axial view.

Holding claws (support member side engaging portions) 167 protruding to the roller 144 arranged between the first and second roller supports 164a and 164b are provided at the distal end portions of the roller supports 164a and 164b. The holding claws 167 extend along distal end surfaces of the two roller support 164a and 164b to the roller 144 between the roller supports 164a and 164b, and then bend toward the proximal end side of the roller supports 164a and 164b between the two roller supports 164a and 164b, and further extend along the central axis L1. In each holding claw 167, a distal end surface of an engagement holding portion 167a that is a portion extending in the central axis L1 direction between the two roller supports 164a and 164b forms an abutment holding surface 167b in a planar shape orthogonal to the central axis L1. The abutment holding surface 167b faces the axial opposed portion 63. Further, of the engagement holding portions 167a of the holding claws 167 provided to the two roller supports 164a and 164b, side surfaces facing each other in the rotational direction X1 form restriction surfaces 167c in a planar shape parallel to each other and parallel to the central axis L1 direction.

As shown in FIG. 21A and FIG. 21B, the rollers 144 are made of resin, and have a substantially cylindrical shape. The rollers 144 are held by the support member 43 to be arranged such that their central axes L3 are parallel to the central axes L1 and L2.

Two first and second engaging recesses 171 and 172 are provided in either end portion of each roller 144 in the central axis L3 direction. The first and second engaging recesses 171 and 172 each serve as a roller side engaging portion. That is, each roller 144 has the first and second engaging recesses 171 and 172. In the second embodiment, in each roller 144, the first engaging recesses 171 are provided in portions facing the first roller support 164a in the rotational direction X1, and the second engaging recesses 172 are provided in portions facing the second roller support 164b in the rotational direction X1.

The two first and second engaging recesses 171 and 172 are provided in either end portion of each roller 144 in the central axis L3 direction on both sides in a direction orthogonal to the central axis L3 (that is, diametrical direction of roller 144, lateral direction in FIG. 21B). The first and second engaging recesses 171 and 172 are provided in a direction orthogonal to the central axis L3 so as to narrow the width of the roller 144 in the end portions of the roller 144 in the central axis L3 direction. The first and second engaging recesses 171 and 172 in the end portions of each roller 144 in the central axis L3 direction extend through the roller 144 in the diametrical direction of the roller 144 (vertical direction in FIG. 21B) on both sides in a direction orthogonal to the central axis L3 direction. Further, the first and second engaging recesses 171 and 172 are open to the outside of the roller 144 in the diametrical direction and to one side in the central axis L3 direction (that is, side opposite to central portion of roller 144 in direction of central axis L3). The two first and second engaging recesses 171 and 172 are in a rotationally symmetrical relationship with the central axis L3 as the axis of symmetry. That is, the engaging recesses 171 and 172 have the same shape although their open directions are different.

The inner circumferential surface of each first engaging recess 171 is formed of a first engaging surface 171a in a planar shape orthogonal to the central axis L3 direction and a first abutting surface 171b in a planar shape parallel to the central axis L3. The first abutting surface 171b serves as a parallel plane. Similarly, the inner circumferential surface of each second engaging recess 172 is formed by a second engaging surface 172a in a planar shape orthogonal to the central axis L3 direction and a second abutting surface 172b in a planar shape parallel to the central axis L3. The second abutting surface 172b serves as a parallel plane. In the two first and second engaging recesses 171 and 172, the first abutting surface 171b is parallel to the second abutting surface 172b.

In each roller 144, a portion between the two the first engaging recess 171 and the second engaging recess 172 (that is, portion between first abutting surface 171b and second abutting surface 172b, portion protruding in direction of central axis L3 from first and second engaging surfaces 171a and 172a) is referred to as an inter-recess portion 173. In the second embodiment, each inter-recess portion 173 is in a shape between two planes in widthwise direction having the two first and second abutting surfaces 171b and 172b parallel to each other. Each inter-recess portion 173 is of a shape having a longitudinal direction and a transverse direction as viewed from the central axis L3 direction. Specifically, in each inter-recess portion 173 as viewed from the central axis L3 direction, a direction parallel to the first and second abutting surfaces 171b and 172b is the longitudinal direction, and a direction orthogonal to the first and second abutting surfaces 171b and 172b is the transverse direction. In a state shown in FIG. 21B, each roller 144 is arranged such that the longitudinal direction of the inter-recess portions 173 conforms to the radial direction of the clutch 40, and the transverse direction of the inter-recess portions 173 conforms to the circumferential direction of the clutch 40. In each roller 144, a portion between the two inter-recess portions 173 at both ends in its central axis L3 direction is in a cylindrical shape having an outer diameter equal to the maximum outer diameter of the inter-recess portions 173.

Each roller 144 is arranged between the two roller supports 164a and 164b. The engagement holding portion 167a of the holding claw 167 provided at the distal end of the first roller support 164a is inserted into the first engaging recess 171 located on the distal end side of the roller support 164a (that is, on lower side in FIG. 21A). Further, the engagement holding portion 167a of the holding claw 167 provided at the distal end of the second roller support 164b is inserted into the second engaging recess 172 located on the distal end side of the roller support 164b (that is, on lower side in FIG. 21A). That is, the first and second engaging recesses 171 and 172 of the roller 144 are engaged with the holding claws 167 (engagement holding portions 167a) of the roller supports 164a and 164b. The abutment holding surfaces 167b of the holding claws 167 inserted into the first and second engaging recesses 171 abut on the first and second engaging surfaces 171a and 172a from the central axis L1 direction so that the roller 144 is prevented from axially falling out of the roller holding portion 62 by the holding claws 167.

Figure 23A:
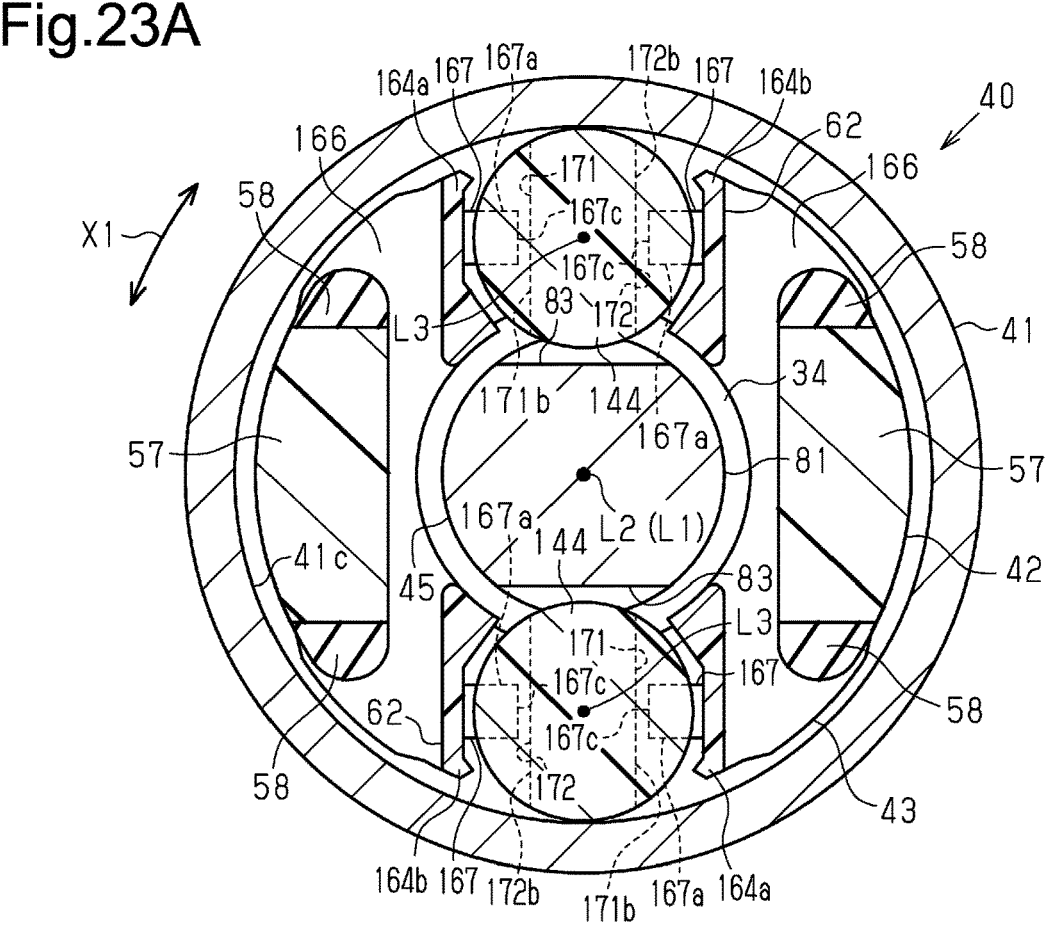
FIG. 23A is a cross-sectional view of the clutch in the second embodiment (cross-sectional view taken along line F6a-F6a in FIG. 19)
Figure 23B:
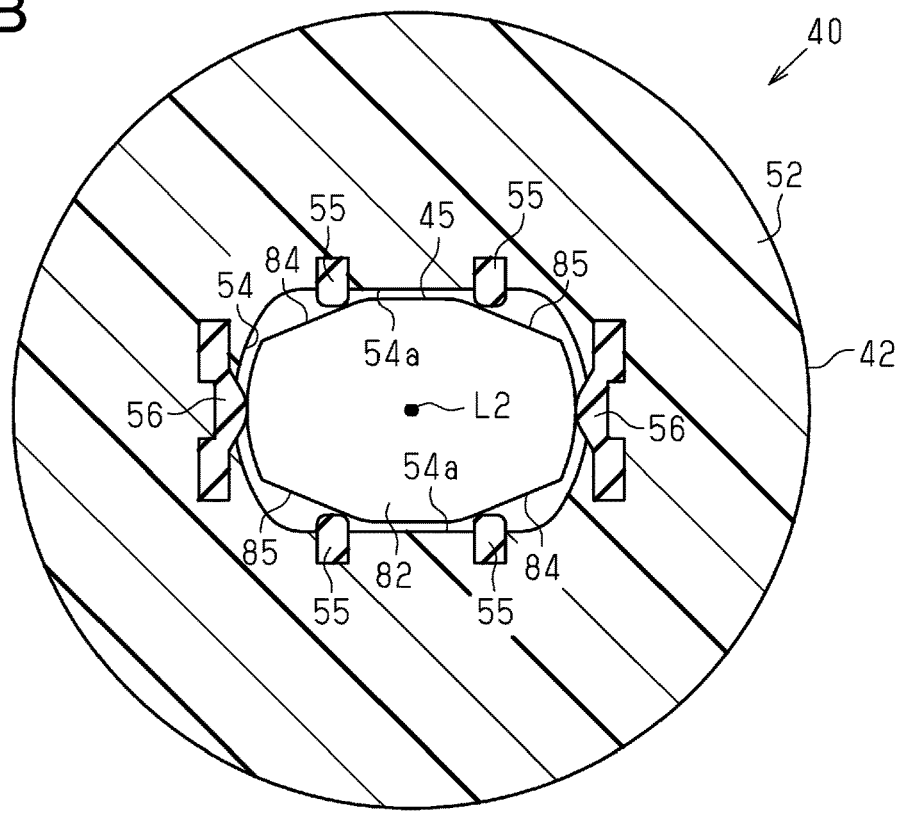
FIG. 23B is a cross-sectional view of the clutch in the second embodiment (cross-sectional view taken along line F6b-F6b in FIG. 19).

As shown in FIGS. 19 and 23A, when held by the support member 43 of the above structure, the two rollers 144 are spaced at equal angular intervals (that is, at 180° intervals in the second embodiment) in the rotational direction X1. Since the roller supports 164a and 164b holding the rollers 144 are inserted and arranged in the clutch housing 41, the rollers 144 radially face the clutch housing 41 inside the clutch housing 41. The outer circumferential surface of each roller 144 radially faces the cylindrical inner circumferential surface 41c of the clutch housing 41, and can contact the inner circumferential surface 41c from between the two roller supports 164a and 164b. The outer circumferential surface of each roller 144 radially faces the driven side rotating body 45, and can contact the driven side rotating body 45. The support member 43 is relatively rotatable with respect to the clutch housing 41 in the rotational direction X1.

The roller release portions 57 of the drive side rotating body 42 are inserted into the clutch housing 41 through the inner peripheral side of the ring 61 of the support member 43. Further, each roller release portion 57 is arranged between the two roller holding portions 62, and is circumferentially adjacent to the roller holding portions 62. Consequently, the both end portions (elastic portions 58) of each roller release portion 57 in the rotational direction X1 face the first roller support 164a of one roller holding portion 62 and the second roller support 164b of the other roller holding portion 62 in the rotational direction X1. The support member 43 and the drive side rotating body 42 are relatively rotatable in the rotational direction X1. When the drive side rotating body 42 rotates, each roller release portion 57 comes into contact with the axial opposed portion 63 and the roller support 164a or 164b located forward in the rotational direction.

Here, as shown in FIG. 22, in each roller 144, the length of the inter-recess portion 173 in the longitudinal direction (that is, maximum outer diameter of inter-recess portion 173) D4 is longer than the distance D5 between the restriction surfaces 167c of the two holding claws 167 of the two roller supports 164a and 164b. Further, in each roller 144, the length of the inter-recess portion 173 in the transverse direction (that is, length between first abutting surface 171b and second abutting surface 172b) D6 is shorter than the distance D5 between the restriction surfaces 167c facing each other in the rotational direction X1. Consequently, an allowance gap G3 that determines the rotational range of the roller 144 about the central axis L3 is provided between the two holding claws 167 of the two roller supports 164a and 164b and the inter-recess portion 173 of the roller 144 arranged between the holding claws 167. Specifically, the allowance gap G3 is present at least between the first abutting surface 171b and the restriction surface 167c facing each other in the rotational direction X1, or between the second abutting surface 172b and the restriction surface 167c facing each other in the rotational direction X1. Consequently, each roller 144 can rotate about the central axis L3 only by an amount allowed by the allowance gap G3. When each roller 144 rotates about the central axis L3, thereby rotating the first and second engaging recesses 171 and 172 about the central axis, the first and second abutting surfaces 171b and 172b come into contact with the holding claws 167 (engagement holding portions 167a) from the rotational direction at the time when the roller 144 has rotated by the amount allowed by the allowance gap G3. Consequently, the rotation of the first and second engaging recesses 171 and 172 about the central axis L3 is restricted, and further rotation of the roller 144 about the central axis L3 is hindered. In this manner, the rotation of each roller 144 about the central axis L3 is restricted by the holding claws 167 and the first and second engaging recesses 171 and 172 engaged with each other.

When each roller 144 rotates in the clockwise direction about its central axis L3 between the two roller supports 164a and 164b as viewed from the output unit 30 in the axial direction (that is, in state shown in FIG. 22), the first abutting surface 171b of the roller 144 comes into contact with a radially outer end portion of the restriction surface 167c facing the first abutting surface 171b as shown by the single-dashed lines. Further, the second abutting surface 172b of the roller 144 comes into contact with a radially inner end portion of the restriction surface 167c facing the second abutting surface 172b. When the roller 144 rotates in the counterclockwise direction about its central axis L3 between the two roller supports 164a and 164b as viewed from the output unit 30 in the axial direction, the first abutting surface 171b of the roller 144 comes into contact with a radially inner end portion of the restriction surface 167c facing the first abutting surface 171b as shown by the double-dashed lines. Further, the second abutting surface 172b of the roller 144 comes into contact with a radially outer end portion of the restriction surface 167c facing the second abutting surface 172b. In this manner, by the rotation of the roller 144 about the central axis L3 being restricted by the holding claws 167 and the first and second engaging recesses 171 and 172 engaged with each other, a sliding contact area A2 that can slide on the inner circumferential surface 41c of the clutch housing 41 is determined on the outer circumferential surface of the roller 144. Each roller 144 can contact the inner circumferential surface 41c of the clutch housing 41 at a portion corresponding to the sliding contact area A2 on its outer circumferential surface from between the two roller supports 164a and 164b.

The operation of the motor 10 configured as described above will now be focusing on the operation of the clutch 40.

Figure 24A:
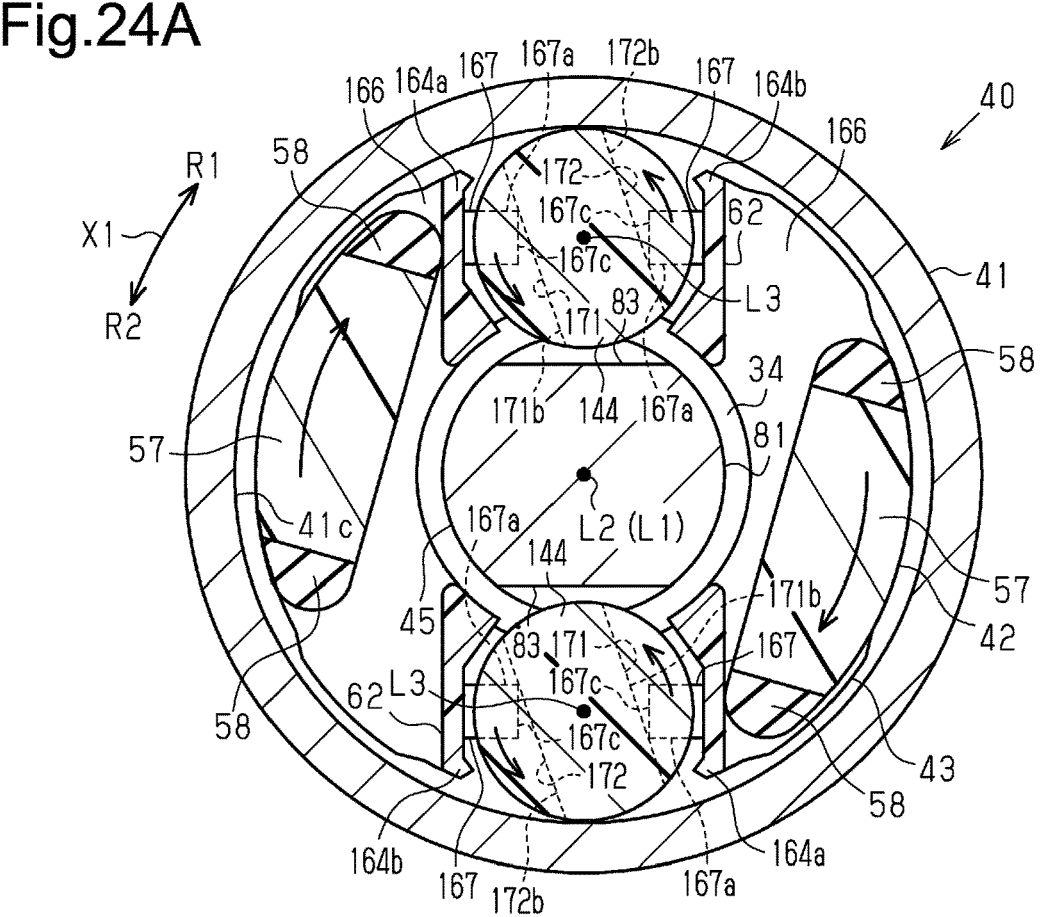
FIGS. 24A and 24B are cross-sectional views for explaining the operation of the clutch in the second embodiment.
Figure 24B:
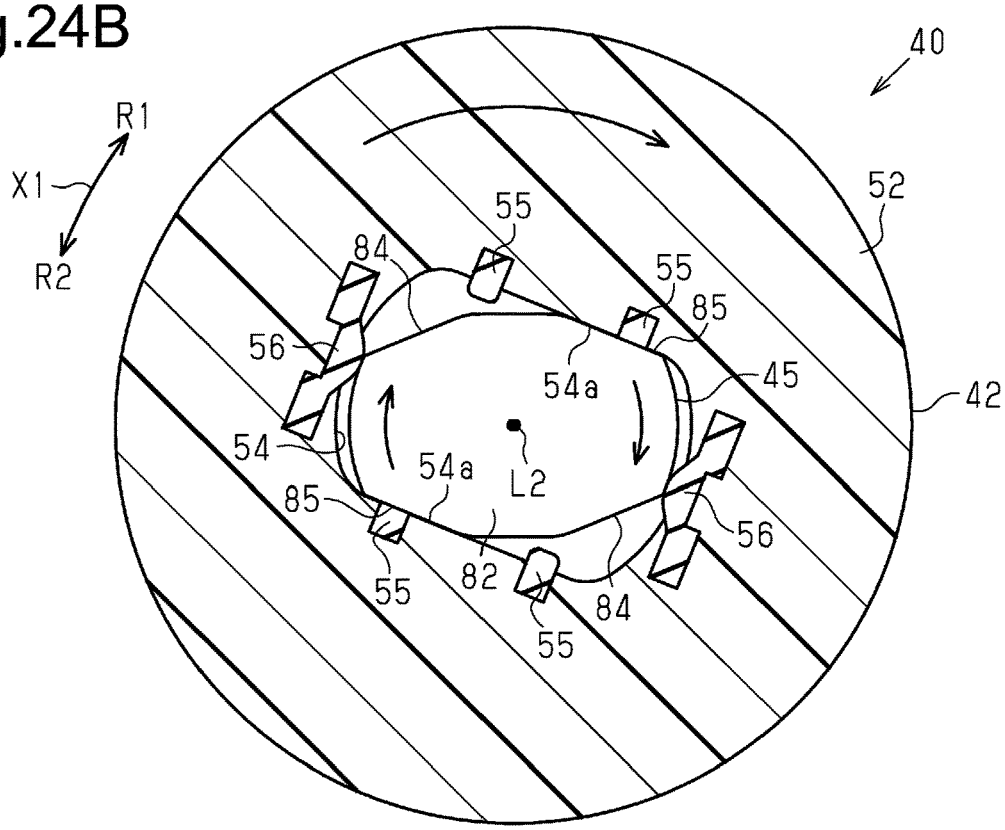

As shown in FIGS. 19 and 24A, when the motor unit 20 is driven by energizing the motor unit 20, the drive side rotating body 42 rotates together with the rotation shaft 24. That is, the drive side rotating body 42 is rotationally driven. FIGS. 24A and 24B illustrate a case where the drive side rotating body 42 is rotationally driven in the first direction R1. As shown in FIG. 24A, with the rotation of the drive side rotating body 42 in the first direction R1, the circumferential end portions (elastic portions 58) of the roller release portions 57 of the drive side rotating body 42 at the front side in the rotational direction come into contact with the axial opposed portions 63 and the first roller supports 164a of the roller holding portions 62 in the rotational direction to transmit the rotational driving force of the drive side rotating body 42. As a result, the first roller supports 164a press the rollers 144 in the first direction R1. Consequently, each roller 144 is arranged at the circumferentially central portion of the control surface 83 of the driven side rotating body 45. In other words, the rollers 144 are brought into an unlocked state in which the rollers 144 are not sandwiched between the control surfaces 83 and the clutch housing 41 (that is, rollers 144 do not interfere with rotation of driven side rotating body 45).

In the unlocked state, as shown in FIG. 24B, the drive side transmission surfaces 54a of the drive side rotating body 42 abut on the second driven side transmission surfaces 85 of the driven side connecting portion 82 from the first direction R1 so that the drive side rotating body 42 and the driven side rotating body 45 are connected in the rotational direction X1 in an integrally rotatable manner. As a result, the rotational driving force of the drive side rotating body 42 (rotation shaft 24) is transmitted to the driven side rotating body 45 (worm shaft 34), and the rotation shaft 24 and the worm shaft 34 integrally rotate in the first direction R1.

At this time, as shown in FIGS. 22 and 24A, by the axial opposed portions 63 and the first roller supports 164a being pressed by the roller release portions 57 in the first direction R1, the support member 43 and the rollers 144 rotate about the rotation axis of the drive side rotating body 42 (same as central axis L1) together with the drive side rotating body 42 and the driven side rotating body 45. Due to frictional force between each roller 144 and the inner circumferential surface 41c of the clutch housing 41, the roller 144 tends to rotate about its central axis L3 in a direction opposite to the rotational direction of the support member 43 between the two roller supports 164a and 164b. When each roller 144 rotates about its central axis L3 by the amount allowed by the allowance gap G3 between the roller 144 and the holding claws 167 (engagement holding portions 167a) of the roller supports 164a and 164b holding the roller 144, the inner circumferential surfaces of the first and second engaging recesses 171 and 172 rotated about the central axis L3 in the roller 144 come into contact with the engagement holding portions 167a of the holding claws 167. In the second embodiment, when the drive side rotating body 42 rotates in the first direction R1, in each roller 144 that has rotated about the central axis L3, the first abutting surface 171b abuts on the radially outer end portion of the restriction surface 167c facing the first abutting surface 171b, and the second abutting surface 172b abuts on the radially inner end portion of the restriction surface 167c facing the second abutting surface 172b. Thus, the rotation of each roller 144 about the central axis L3 is restricted by the holding claws 167 (engagement holding portions 167a) and the first and second engaging recesses 171 and 172 engaged with each other. Consequently, even when each roller 144 rotates about the rotation axis of the drive side rotating body 42 together with the drive side rotating body 42 during the rotational driving of the drive side rotating body 42, the roller 144 rotates about the central axis L3 only within the range allowed by the holding claws 167 and the first and second engaging recesses 171 and 172 engaged with each other.

Figure 18:
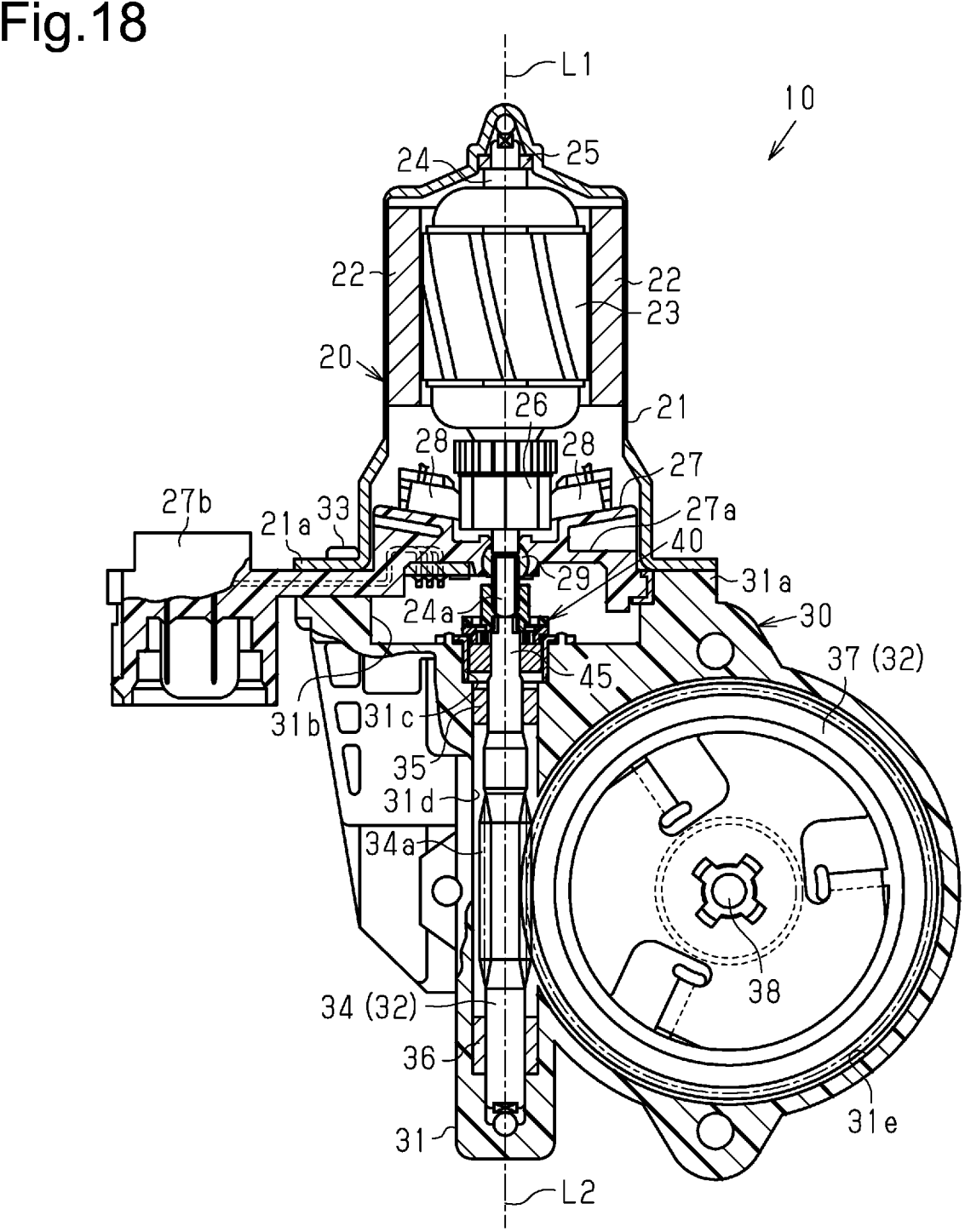
FIG. 18 is a cross-sectional view of a motor of a second embodiment.

As shown in FIGS. 18 and 24A, the rotation of the worm shaft 34 in the first direction R1 is transmitted to the output shaft 38 while being decelerated between the worm shaft 34 and the worm wheel 37, and is output from the output shaft 38. Then, the vehicle window glass is raised or lowered by the window regulator (not shown) according to the rotational direction of the output shaft 38. When the energization of the motor unit 20 is stopped, the rotational driving of the rotation shaft 24, that is, the rotational driving of the drive side rotating body 42 is stopped.

Figure 25A:
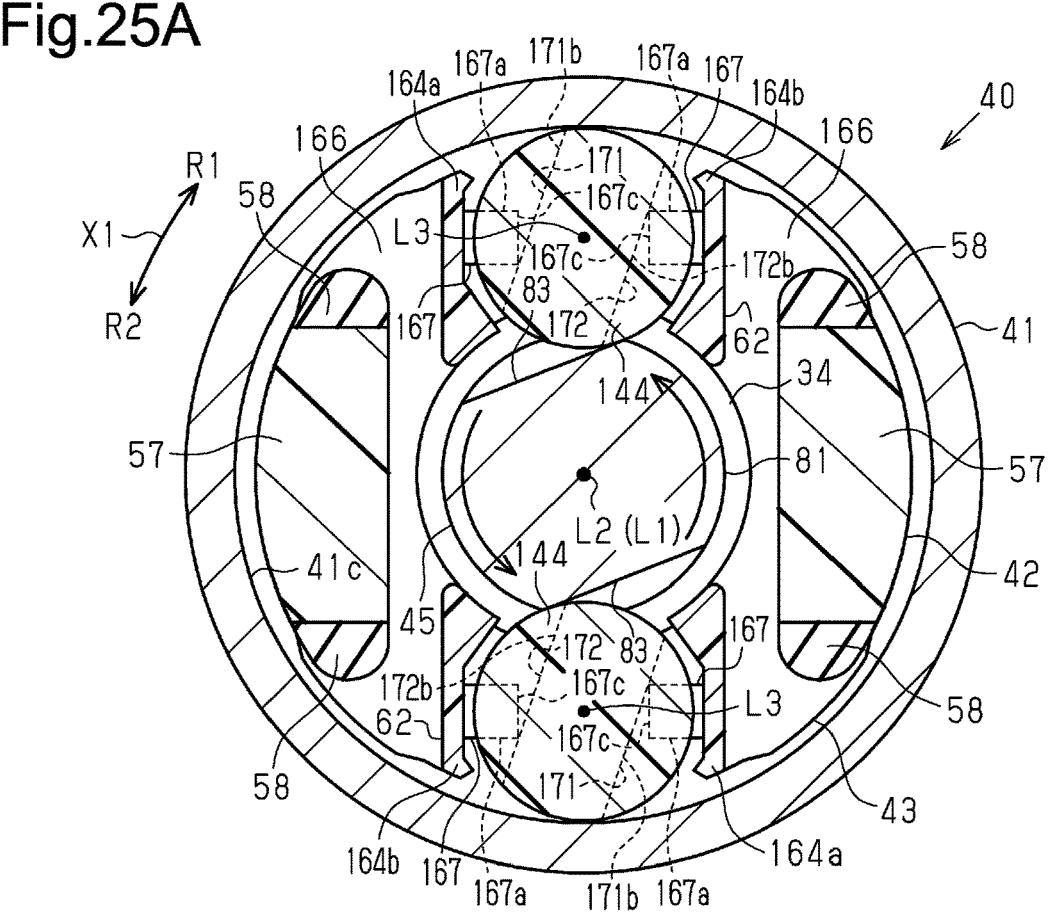
FIGS. 25A and 25B are cross-sectional views for explaining the operation of the clutch in the second embodiment.
Figure 25B:
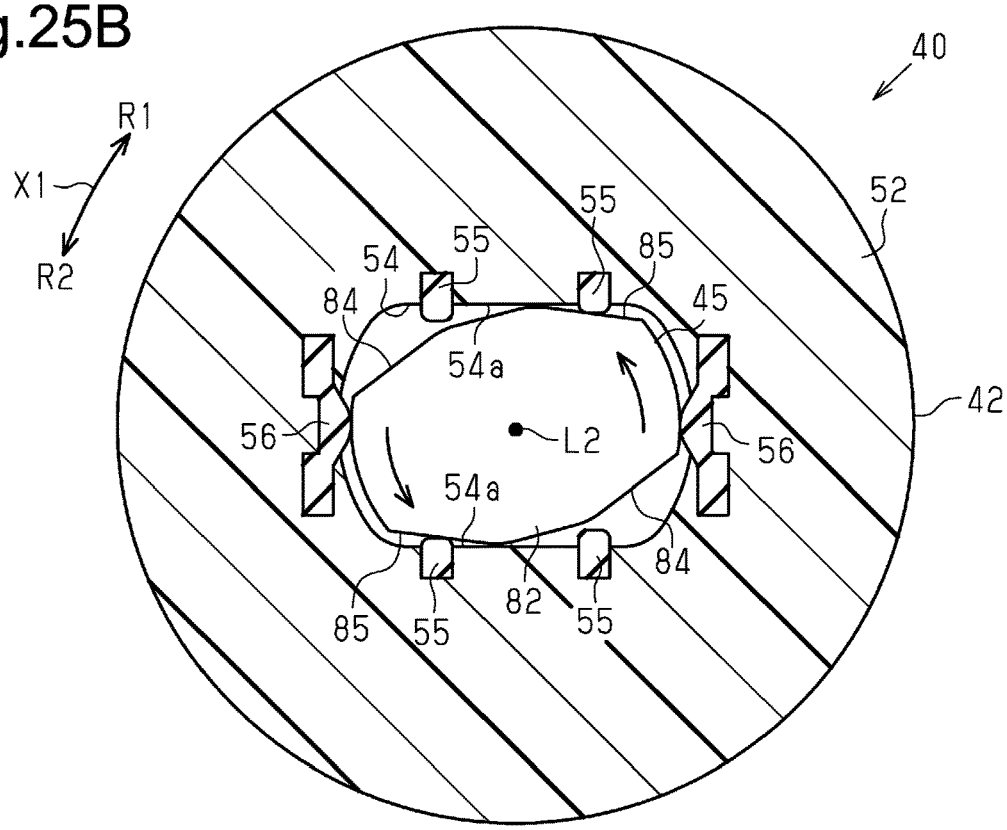

As shown in FIGS. 25A and 25B, when a load is applied from the load side (that is, window regulator side in second embodiment) to the output shaft 38 in a state where the driving of the motor unit 20 is stopped, that is, while the rotation shaft 24 (drive side rotating body 42) is not rotationally driven, the driven side rotating body 45 tends to rotate due to the load. FIGS. 25A and 25B illustrate a case where the driven side rotating body 45 tends to rotate in the second direction R2. Then, the control surfaces 83 of the driven side rotating body 45 press the rollers 144 arranged between the control surfaces 83 and the inner circumferential surface 41c of the clutch housing 41 to the outer peripheral side. Each roller 144 pressed by the control surface 83 comes into contact with the inner circumferential surface 41c of the clutch housing 41 between the two roller supports 164a and 164b, and comes into contact with a portion of the control surface 83 closer to a circumferential end portion than to the circumferential center of the control surface 83 (that is, rearward end portion of control surface 83 in the second direction R2). Then, each roller 144 is sandwiched between the portion of the control surface 83 closer to the rearward end portion in the second direction R2 and the inner circumferential surface 41c of the clutch housing 41. As a result, the rollers 144 serve as wedges to hinder rotation (rotation in second direction R2) of the driven side rotating body 45 (that is, to lock rotation of the worm shaft 34). Consequently, rotation of the output shaft 38 is hindered when the rotation shaft 24 (drive side rotating body 42) is not rotationally driven. In a state where the driven side rotating body 45 is arranged in a locked position (that is, position to sandwich the rollers 144 between driven side rotating body 45 and the clutch housing 41) (state shown in FIG. 25A), as shown in FIG. 25B, the second driven side transmission surfaces 85 of the driven side connecting portion 82 do not contact the drive side transmission surfaces 54a of the drive side rotating body 42 in the rotational direction (second direction R2).

Also, when the driven side rotating body 45 tends to rotate in the first direction R1 while the motor unit 20 (drive side rotating body 42) is not driven, the rotation of the driven side rotating body 45 is hindered in the same manner. That is, by each roller 144 being sandwiched between the portion of the control surface 83 closer to the rearward end portion in the first direction R1 and the inner circumferential surface 41c of the clutch housing 41, the rollers 144 serve as wedges to hinder rotation of the driven side rotating body 45 (rotation in first direction R1) (that is, to lock rotation of the worm shaft 34).

Figure 26A:
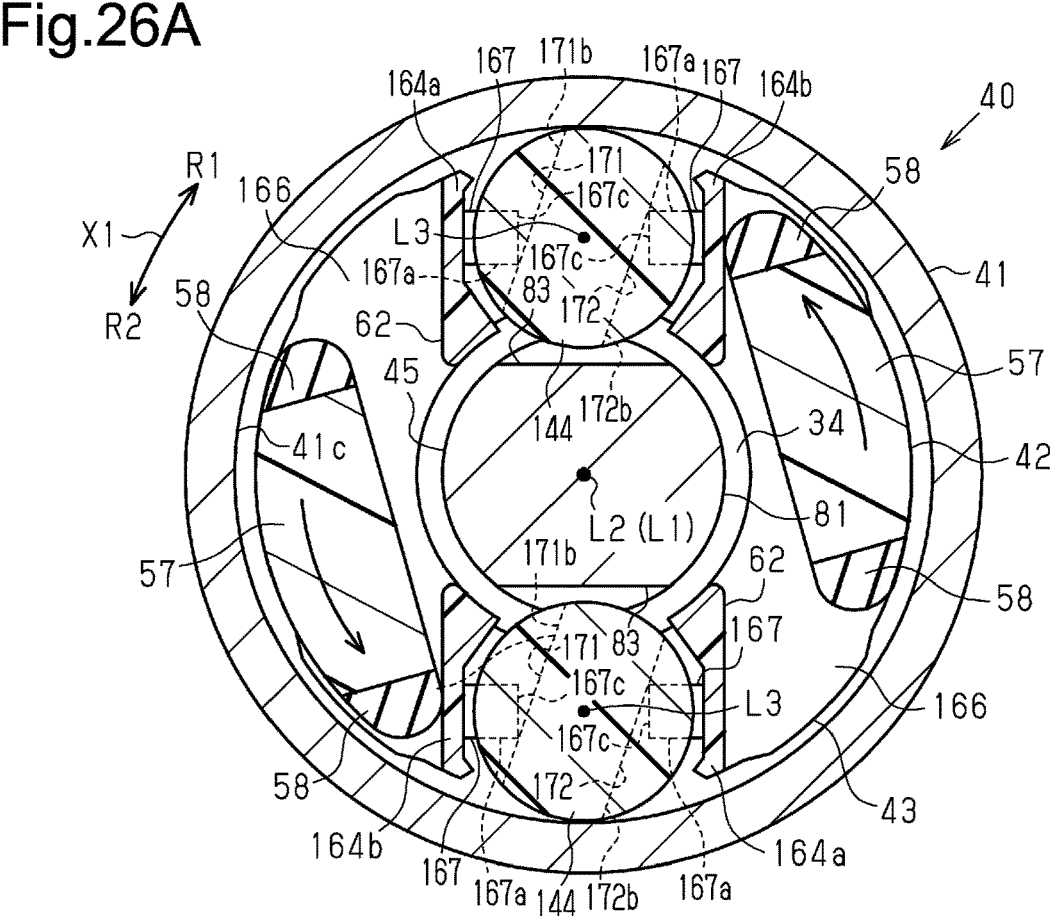
FIGS. 26A and 26B are cross-sectional views for explaining the operation of the clutch in the second embodiment.
Figure 26B:
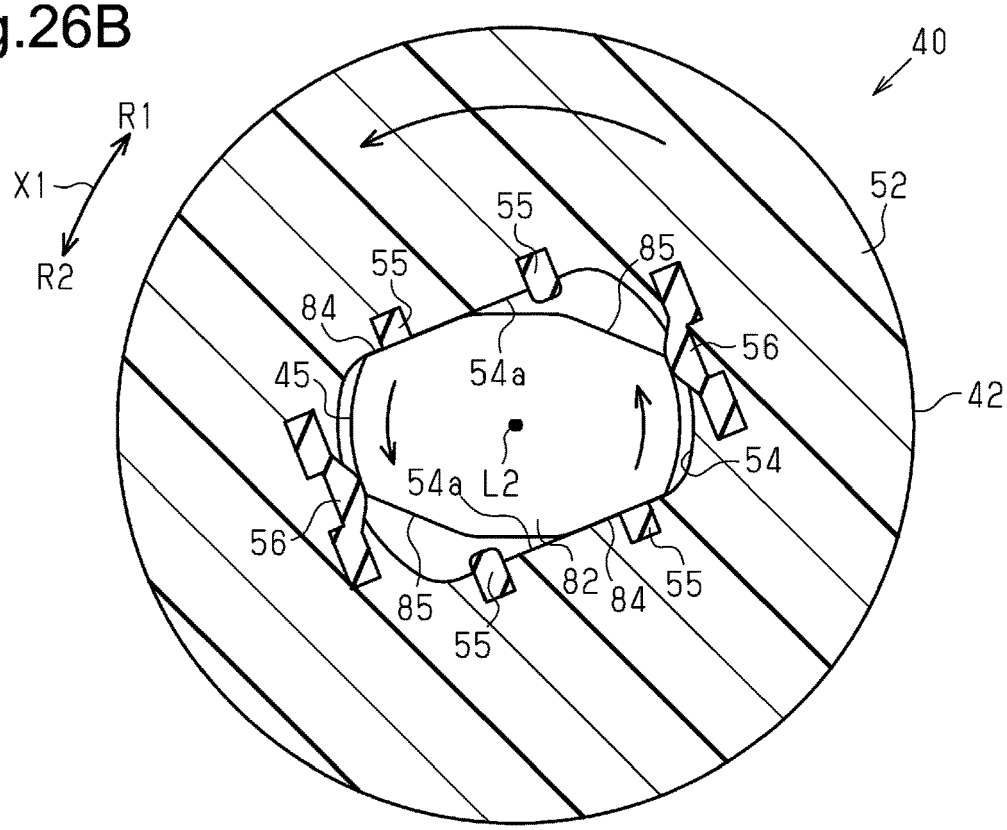

As shown in FIGS. 19, 26A, and 26B, when the drive side rotating body 42 rotates together with the rotation shaft 24 in the second direction R2 by the driving of the motor unit 20, the rotational direction of each member is reversed. In the same operation as in the case where the drive side rotating body 42 rotates in the first direction R1 (refer to FIG. 24), the clutch 40 connects the rotation shaft 24 and the worm shaft 34. That is, with the rotation of the drive side rotating body 42 in the second direction R2, the circumferential end portions (elastic portions 58) of the roller release portions 57 of the drive side rotating body 42 at the front side in the rotational direction come into contact with the axial opposed portions 63 and the second roller supports 164b of the roller holding portions 62 in the rotational direction to transmit the rotational driving force of the drive side rotating body 42. As a result, the second roller supports 164b press the rollers 144 in the second direction R2. Consequently, each roller 144 is arranged at the circumferentially central portion of the control surface 83 of the driven side rotating body 45 to be brought into an unlocked state in which the roller 144 is not sandwiched between the control surface 83 and the clutch housing 41. In the unlocked state, the drive side transmission surfaces 54a of the drive side rotating body 42 abut on the first driven side transmission surfaces 84 of the driven side connecting portion 82 from the second direction R2 so that the rotational driving force of the drive side rotating body 42 (rotation shaft 24) is transmitted to the driven side rotating body 45 (worm shaft 34), and the rotation shaft 24 and the worm shaft 34 rotate integrally in the second direction R2.

At this time, as shown in FIGS. 22 and 26A, by the axial opposed portions 63 and the second roller supports 164b being pressed by the roller release portions 57 in the second direction R2, the support member 43 and the rollers 144 rotate about the rotation axis of the drive side rotating body 42 together with the drive side rotating body 42 and the driven side rotating body 45. Due to frictional force between each roller 144 and the inner circumferential surface 41c of the clutch housing 41, the roller 144 tends to rotate about its central axis L3 in a direction opposite to the rotational direction of the support member 43 between the two roller supports 164a and 164b. When each roller 144 rotates about its central axis L3 by the amount allowed by the allowance gap G3 between the roller 144 and the holding claws 167 (engagement holding portions 167a) of the roller supports 164a and 164b holding the roller 144, the inner circumferential surfaces of the first and second engaging recesses 171 and 172 that have rotated about the central axis L3 in the roller 144 abut on the engagement holding portions 167a of the holding claws 167. In the second embodiment, when the drive side rotating body 42 rotates in the second direction R2, in each roller 144 that has rotated about the central axis L3, the first abutting surface 171b abuts on the radially inner end portion of the restriction surface 167c facing the first abutting surface 171b, and the second abutting surface 172b abuts on the radially outer end portion of the restriction surface 167c facing the second abutting surface 172b. Thus, the rotation of each roller 144 about the central axis L3 is restricted by the holding claws 167 (engagement holding portions 167a) and the first and second engaging recesses 171 and 172 engaged with each other. Consequently, even when each roller 144 rotates about the rotation axis of the drive side rotating body 42 together with the drive side rotating body 42 during the rotational driving of the drive side rotating body 42, the roller 144 rotates about the central axis L3 only within the range allowed by the holding claws 167 and the first and second engaging recesses 171 and 172 engaged with each other.

When the rotation of the worm shaft 34 in the second direction R2 is transmitted to the output shaft 38 and output from the output shaft 38 as shown in FIGS. 19 and 26A, the vehicle window glass is raised or lowered by the window regulator (not shown) according to the rotational direction of the output shaft 38. Thereafter, when the energization of the motor unit 20 is stopped, the rotational driving of the rotation shaft 24 (drive side rotating body 42) is stopped. After the driving of the motor unit 20 is stopped, as described above, the rollers 144 serve as wedges to hinder rotation of the driven side rotating body 45 (that is, to lock rotation of worm shaft 34), thereby hindering rotation of the output shaft 38 (refer to FIG. 25A).

The advantages of the second embodiment will now be described.

(7) In each roller 144, the first and second engaging recesses 171 and 172 are provided in the axial end portion on the distal end side of the roller supports 164a and 164b. The rotation of the roller 144 about the central axis L3 is restricted by the first and second engaging recesses 171 and 172 and the holding claws 167 engaged with them. That is, by the engagement of the first and second engaging recesses 171 and 172 with the holding claws 167, the roller 144 is restricted in rotation about the central axis L3 of the roller 144 by the holding claws 167. Thus, the roller 144 rotates about the central axis L3 of the roller 144 only within the range allowed by the holding claws 167. Consequently, the scattering of the grease GR caused by the rotation of the rollers 144 about the central axes L3 of the rollers 144 is prevented so that the grease GR between the inner circumferential surface 41c of the clutch housing 41 and the rollers 144 can be prevented from becoming insufficient.

In addition, by the simple structure of engagement between the first and second engaging recesses 171 and 172 provided in the rollers 144 and the holding claws 167 provided to the support member 43, the rotation of the rollers 144 about the central axes L3 can be restricted. As a result, the grease GR between the inner circumferential surface 41c of the clutch housing 41 and the rollers 144 can be easily prevented from becoming insufficient.

(8) When each roller 144 rotates about the central axis L3 by the amount of the allowance gap G3 provided between the first and second abutting surfaces 171b and 172b of the first and second engaging recesses 171 and 172 and the restriction surfaces 167c of the holding claws 167 facing the first and second abutting surfaces 171b and 172b, the first and second abutting surfaces 171b and 172b come into contact with the holding claws 167 from the rotational direction of the roller 144. The holding claws 167 of the support member 43 hinder further rotation of the rollers 144 about their central axes L3. That is, the rollers 144 can rotate about their central axes L3 within the rotational range determined by the allowance gap G3 by the engagement of the first and second engaging recesses 171 and 172 with the holding claws 167. Consequently, the position of each roller 144 with respect to the inner circumferential surface 41c of the clutch housing 41 can be changed about the central axis L3 of the roller 144. The grease GR around the rollers 144 is moved with the rotation of the rollers 144 around the central axes L3 within the rotational range so that the grease GR can be supplied to portions of the rollers 144 to contact the inner circumferential surface 41c of the clutch housing 41. Consequently, the grease GR between the inner circumferential surface 41c of the clutch housing 41 and the rollers 144 can be further prevented from becoming insufficient.

(9) By the provision of the first and second engaging recesses 171 and 172 of a recess shape in the rollers 144, it is possible to reduce the material forming the rollers 144. As a result, the manufacturing cost of the rollers 144 can be reduced.

(10) The first and second engaging recesses 171 and 172 are provided in the axial end portion of each roller 144 on the distal end side of the roller supports 164a and 164b. Consequently, the holding claws 167 for preventing the rollers 144 from falling out of the support member 43 in the rotation axis direction of the drive side rotating body 42 can be used as support member side engaging portions for restricting the rotation of the first and second engaging recesses 171 and 172 about the central axes L3. Consequently, it is possible to prevent the shape of the support member 43 from becoming complicated, compared to a case where the support member 43 is additionally provided with support member side engaging portions.

(11) Each roller 144 has the two first and second engaging recesses 171 and 172 provided on both sides in a direction orthogonal to the central axis L3 in each end portion in the central axis L3 direction. As viewed from the central axis L3 direction, the portion between the two the first and second engaging recesses 171 and 172 (that is, inter-recess portion 173) of each roller 144 is in a shape between two planes in widthwise direction having the two first and second abutting surfaces 171b and 172b that are of a planar shape parallel to the central axis L3 and are parallel to each other. Consequently, the shapes of the first and second engaging recesses 171 and 172 are prevented from becoming complicated. Thus, by the provision of the first and second engaging recesses 171 and 172, it is possible to prevent the shape of the rollers 144 from becoming complicated. As a result, the rollers 144 can be easily manufactured.

(12) The two first and second engaging recesses 171 and 172 are provided in either end portion of each roller 144 in the central axis L3 direction. Therefore, when each roller 144 is fitted between the two roller supports 164a and 164b, either end portion of the roller 144 in the central axis L3 direction may be arranged on the distal end side of the roller supports 164a and 164b. Consequently, even when the first and second engaging recesses 171 and 172 to be engaged with the holding claws 167 are provided in the rollers 144, the rollers 144 can be easily fitted to the support member 43.

(13) In the motor 10, the rotation shaft 24 and the worm shaft 34 are connected by the clutch 40 in which the grease GR between the inner circumferential surface 41c of the clutch housing 41 and the rollers 144 is prevented from becoming insufficient. Consequently, when the rotation shaft 24 is not rotationally driven, rotation of the rotation shaft 24 by the worm shaft 34 is limited.

(14) The support member 43 rotates together with the drive side rotating body 42 about the rotation axis of the drive side rotating body 42 (that is, about central axis L1). Further, the rollers 144 rotate about the rotation axis of the drive side rotating body 42 together with the drive side rotating body 42 while being held by the support member 43 during the rotational driving of the drive side rotating body 42. Therefore, the clutch 40 is configured such that the rollers 144 tend to rotate about their central axes L3 when the drive side rotating body 42 is rotationally driven. That is, in that configuration, the grease tends to scatter when the rollers freely rotate about the central axes L3. However, even with the clutch 40 of the configuration in which the rollers 144 tend to rotate about their central axes L3, the holding claws 167 and the first and second engaging recesses 171 and 172 engaged with each other as in the second embodiment restrict the rotation of the rollers 144 about the central axes L3, thus being able to prevent the scattering of the grease GR caused by the rotation of the rollers 144 about the central axes L3. Therefore, in the clutch 40 of the configuration in which the rollers 144 tend to rotate about the central axes L3 during the rotational driving of the drive side rotating body 42, the grease GR between the inner circumferential surface 41c of the clutch housing 41 and the rollers 144 can be effectively prevented from becoming insufficient.

Third Embodiment

A third embodiment of a clutch will now be described. Same reference numerals are given to those components that are the same as the corresponding components of the second embodiment. Such components will not be described in detail.

Figure 27A:
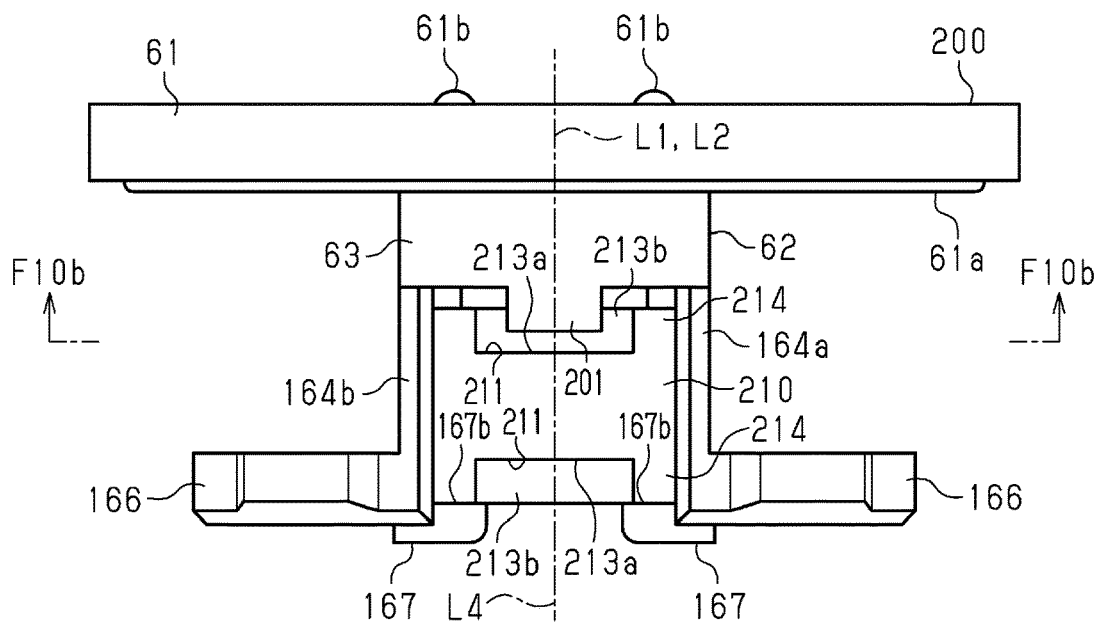
FIG. 27A is a side view of a support member holding rollers in a clutch of a third embodiment.
Figure 27B:
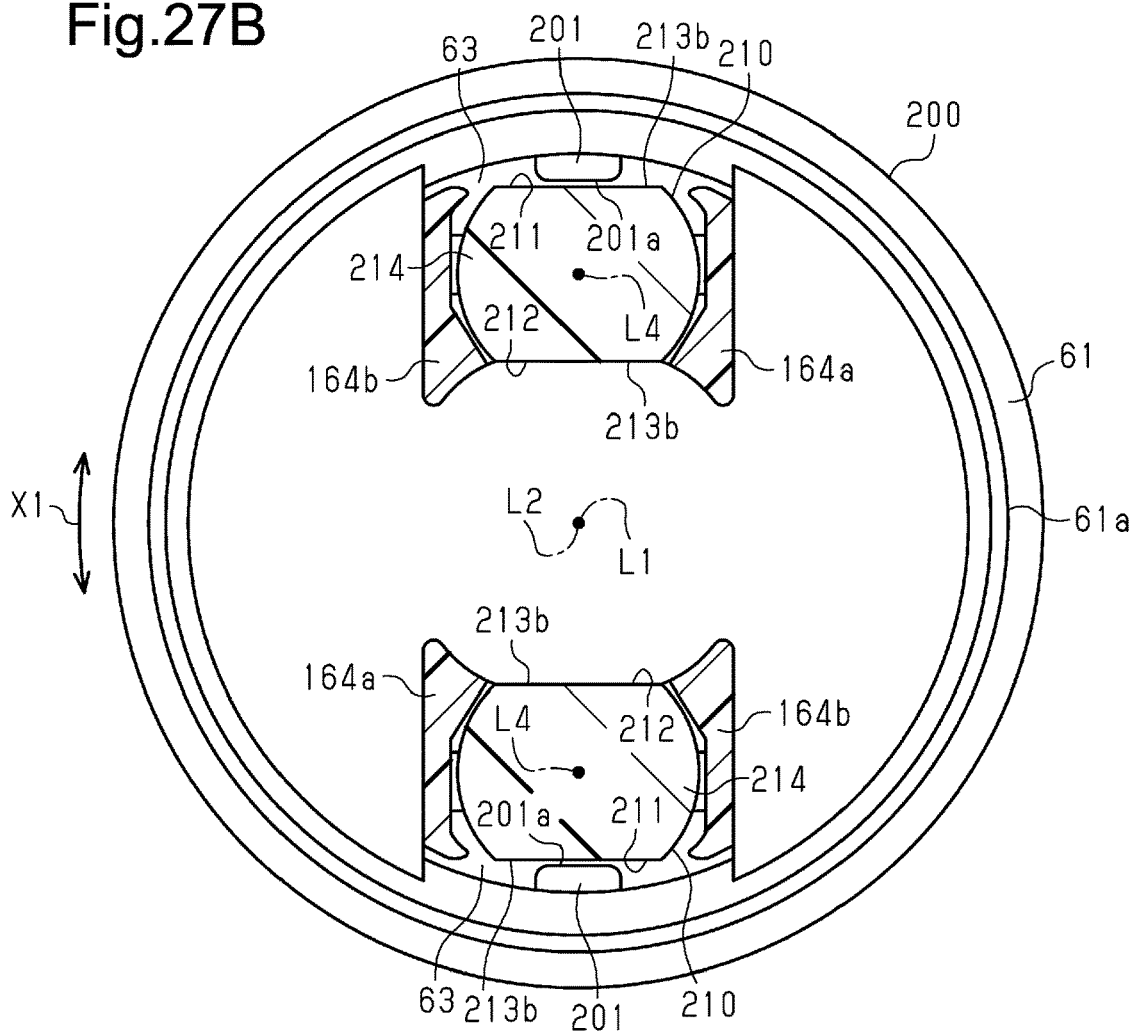
FIG. 27B is a cross-sectional view of the support member (cross-sectional view taken along line F10b-F10b in FIG. 27A).

A support member 200 and rollers 210 of the third embodiment shown in FIGS. 27A and 27B are provided in the clutch 40 of the second embodiment in place of the support member 43 and the rollers 144 (refer to FIG. 20).

An engaging protrusion (support member side engaging portion) 201 protruding in the rotation axis (same as central axis L1) direction of the drive side rotating body 42 is formed at the axial opposed portion 63 of each roller holding portion 62 of the support member 200. Each engaging protrusion 201 of the third embodiment protrudes in the central axis L1 direction from a radially outer end portion of the axial opposed portion 63 toward the distal end side of the roller supports 164a and 164b. In each roller holding portion 62, the engaging protrusion 201 is located at a central portion between the two roller supports 164a and 164b. The radially inner side surface of each engaging protrusion 201 forms a restriction surface 201a of a planar shape orthogonal to the diametrical direction of the ring 61. The restriction surfaces 201a of the engaging protrusions 201 provided at the two roller holding portions 62 are parallel to the central axis L1 direction and are parallel to each other.

The two rollers 210 held by the above-described support member 200 are made of resin and in a substantially cylindrical shape. The rollers 210 are held by the support member 200 so that their central axes L4 are parallel to the central axes L1 and L2.

Figure 28:
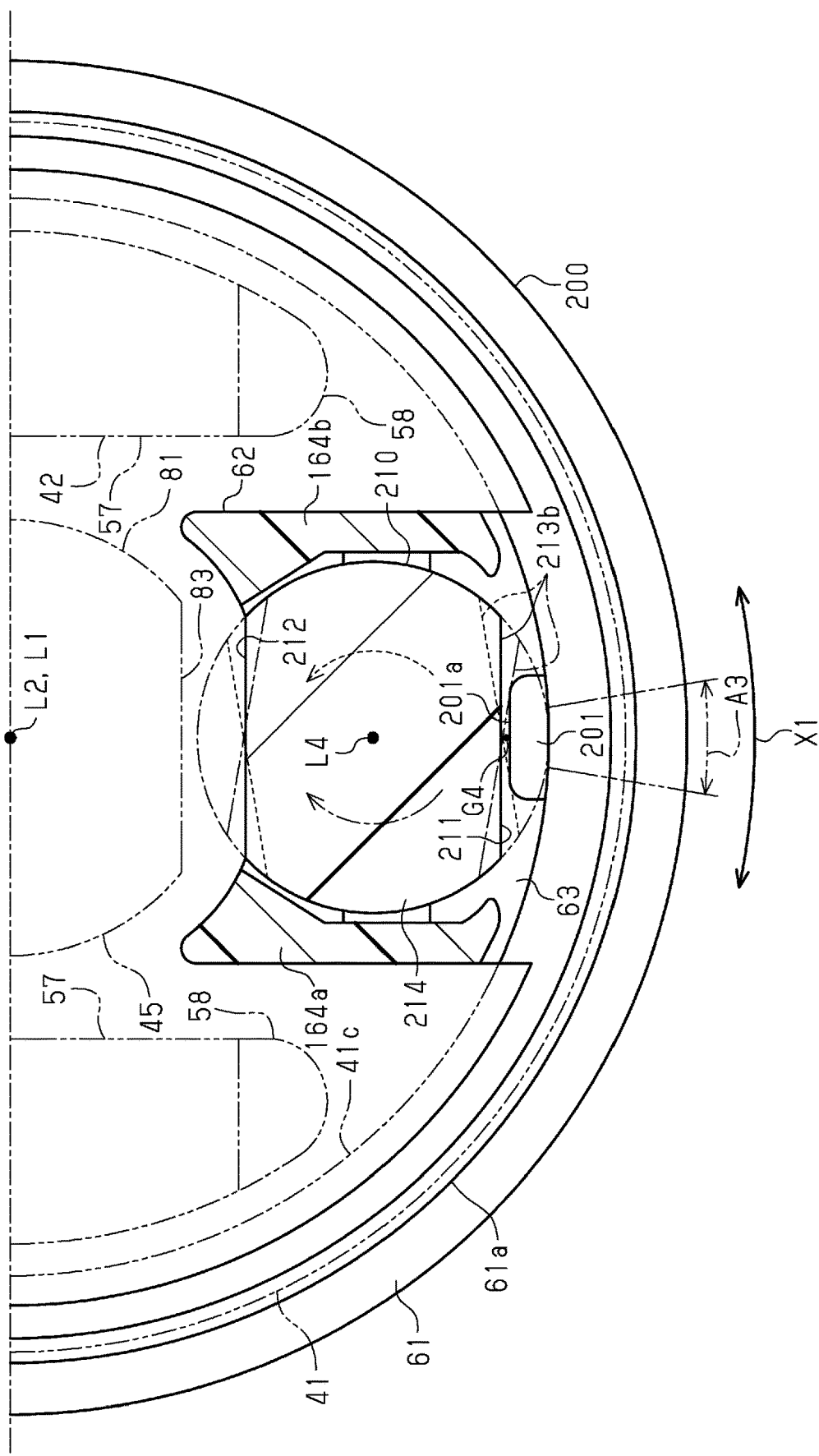
FIG. 28 is a partially enlarged cross-sectional view of the support member and the rollers in the clutch of the third embodiment.

Two first and second engaging recesses 211 and 212 are formed in the two end portions of each roller 210 in the central axis L4 direction (refer to FIG. 28). That is, each roller 210 has two pairs of engaging recesses 211 and 212. In the third embodiment, in each roller 210, the first engaging recesses 211 are located on the radially outside of the support member 200, and the second engaging recesses 212 are located on the radially inside of the support member 200.

The two first and second engaging recesses 211 and 212 are provided in the end portions of each roller 210 in the central axis L4 direction on both sides in a direction orthogonal to the central axis L4 (diametrical direction of the roller 210, a vertical direction in FIG. 27B). The first and second engaging recesses 211 and 212 are provided in the end portions of each roller 210 in the central axis L4 direction in a direction orthogonal to the central axis L4 so as to narrow the width of the roller 210. The first and second engaging recesses 211 and 212 in the end portions of each roller 210 in the central axis L4 direction extend through the roller 210 in the diametrical direction of the roller 210 (that is, lateral direction in FIG. 27B) on both sides in a direction orthogonal to the central axis L4. Further, the first and second engaging recesses 211 and 212 are each open to the outside of the roller 210 in the diametrical direction and to one side in the central axis L4 direction (that is, side opposite to central portion of roller 210 in direction of central axis L4). The two first and second engaging recesses 211 and 212 are in a rotationally symmetrical relationship with the central axis L4 as the axis of symmetry. That is, the engaging recesses 211 and 212 have the same shape although their open directions are different.

The inner circumferential surface of each of the engaging recesses 211 and 212 is formed of an opposed surface 213a in a planar shape orthogonal to the central axis L4 direction and an abutting surface 213b in a planar shape parallel to the central axis L4. In the two first and second engaging recesses 211 and 212, the abutting surfaces 213b are parallel to each other. In each roller 210, a portion between the two first and second engaging recesses 211 and 212 (that is, portion between the two abutting surfaces 213b, portion protruding from the opposed surfaces 213a in direction of central axis L4) is referred to as an inter-recess portion 214. In the third embodiment, each inter-recess portion 214 is in a shape between two planes in widthwise direction having the two abutting surfaces 213b parallel to each other on both sides in its transverse direction. When viewed from the central axis L4 direction, a direction parallel to the abutting surfaces 213b is the longitudinal direction. In a state shown in FIG. 27B, each roller 210 is arranged such that the transverse direction of the inter-recess portions 214 conforms to the radial direction of the clutch 40, and the longitudinal direction of the inter-recess portions 214 conforms to the circumferential direction of the support member 200. In each roller 210, a portion between the two inter-recess portions 214 at both ends in its central axis L4 direction is of a cylindrical shape having an outer diameter equal to the maximum outer diameter of the inter-recess portions 214. Both end faces of each roller 210 in the central axis L4 direction are in a planar shape orthogonal to the central axis L4.

The rollers 210 arranged between the two roller supports 164a and 164b are held by the roller supports 164a and 164b from both sides in the rotational direction X1. Further, the abutment holding surfaces 167b of the holding claws 167 abut on axial end faces of the rollers 210 on the distal end side of the roller supports 164a and 164b from the central axis L1 direction, and the rollers 210 are prevented from axially falling out of the roller holding portions 62 by the holding claws 167. Each engaging protrusion 201 is inserted into the first engaging recess 211 located radially outside of the two first and second engaging recesses 211 and 212 provided in the axial end portion of the roller 210 on the proximal end side of the roller supports 164a and 164b. That is, the engaging protrusion 201 is engaged with one first engaging recess 211 provided in the axial end portion of the roller 210 near the axial opposed portion 63. In the first engaging recess 211 and the engaging protrusion 201 engaged with each other, the abutting surface 213b and the restriction surface 201a face each other in the radial direction of the support member 200.

As shown in FIGS. 27B and 28, the two rollers 210 held by the support member 200 of the above-described structure and spaced at equal angular intervals (that is, at 180° intervals in third embodiment) in the rotational direction X1. Since the roller supports 164a and 164b holding the rollers 210 are inserted and arranged in the clutch housing 41, the rollers 210 radially face the clutch housing 41 inside the clutch housing 41. The outer circumferential surface of each roller 210 radially faces the cylindrical inner circumferential surface 41c of the clutch housing 41. The outer circumferential surface of each roller 210 can contact the inner circumferential surface 41c from between the two roller supports 164a and 164b. Further, the outer circumferential surface of each roller 210 radially faces the control surface 83 of the driven side rotating body 45, and can contact the control surface 83. The support member 200 is relatively rotatable with respect to the clutch housing 41 in the rotational direction X1. The support member 200 shown in FIG. 28 is a cross-sectional view taken along section indicating line F10b-F10b in FIG. 27A. In FIG. 28, the clutch housing 41 and the driven side rotating body 45 are shown by the double-dashed lines. Further, the outer shape of the central portion of the roller 210 in the central axis L4 direction (that is, cylindrical portion between two inter-recess portions 214) is indicated by the double-dashed lines.

As shown in FIG. 28, an allowance gap G4 that determines the rotational range of the roller 210 about the central axis L4 is provided between the abutting surface 213b of the first engaging recess 211 of the roller 210 and the restriction surface 201a of the engaging protrusion 201 inserted into the first engaging recess 211. Therefore, the roller 210 can rotate about the central axis L4 by an amount allowed by the allowance gap G4. When the roller 210 rotates about its central axis L4 in the clockwise direction between the two roller supports 164a and 164b as viewed axially from the output unit 30 (distal end side of roller holding portion 62) (state shown in FIG. 28), the first engaging recess 211 of the roller 210 rotates about the central axis L4 in the clockwise direction. At the time when the roller 210 has rotated by the amount allowed by the allowance gap G4, the abutting surface 213b of the first engaging recess 211 abuts on one circumferential end portion of the engaging protrusion 201 facing the abutting surface 213b (right end portion in FIG. 28) from the rotational direction, as shown by broken lines. This hinders further rotation of the roller 210 about the central axis L4 in the clockwise direction by the engaging protrusion 201 and the first engaging recess 211 engaged with each other. When the roller 210 rotates about its central axis L4 in the counterclockwise direction between the two roller supports 164a and 164b as viewed axially from the output unit 30, the first engaging recess 211 of the roller 210 rotates about the central axis L4 in the counterclockwise direction. At the time when the roller 210 has rotated by the amount allowed by the allowance gap G4, the abutting surface 213b of the first engaging recess 211 abuts on the other circumferential end portion of the engaging protrusion 201 facing the abutting surface 213b (left end portion in FIG. 28) from the rotational direction, as shown by a broken line. Engagement of the engaging protrusion 201 and the first engaging recess 211 hinders further rotation of the roller 210 about the central axis L4 in the counterclockwise direction. In this manner, the rotation of the roller 210 about the central axis L4 is restricted by the engaging protrusion 201 and the first engaging recess 211 engaged with each other. Further, by the rotation of the roller 210 about the central axis L4 being restricted to the range allowed by the allowance gap G4 between the restriction surface 201a and the abutting surface 213b facing each other, a sliding contact area A3 that can slide on the inner circumferential surface 41c of the clutch housing 41 is determined on the outer circumferential surface of the roller 210.

The operation of the third embodiment will now be described.

When the drive side rotating body 42 is rotationally driven, as in the second embodiment, the rollers 210 are brought into an unlocked state in which the rollers 210 are not sandwiched between the control surfaces 83 and the clutch housing 41. In the unlocked state, the drive side rotating body 42 and the driven side rotating body 45 are connected in the rotational direction X1 in an integrally rotatable manner so that the rotational driving force of the drive side rotating body 42 (rotation shaft 24) is transmitted to the driven side rotating body 45 (worm shaft 34), and the rotation shaft 24 and the worm shaft 34 rotate integrally.

At this time, as shown in FIG. 28, the first or second roller supports 164a or 164b and the axial opposed portions 63 are pressed by the roller release portions 57 in the rotational direction X1 so that the support member 200 and the rollers 210 rotate about the rotation axis (same as central axis L1) of the drive side rotating body 42 together with the drive side rotating body 42 and the driven side rotating body 45. Due to frictional force between each roller 210 and the inner circumferential surface 41c of the clutch housing 41, the roller 210 tends to rotate about its central axis L4 in a direction opposite to the rotational direction of the support member 200 between the two roller supports 164a and 164b. When each roller 210 rotates about its central axis L4 by the amount allowed by the allowance gap G4 between the restriction surface 201a and the abutting surface 213b facing each other, the abutting surface 213b of the first engaging recess 211 rotating about the central axis L4 in the roller 210 comes into contact with the engaging protrusion 201 engaged with the engaging recess 211 from the rotational direction. Thus, the roller 210 is restricted in rotation about the central axis L4 by the first engaging recess 211 and the engaging protrusion 201 engaged with each other. Consequently, even when the rollers 210 rotate about the rotation axis of the drive side rotating body 42 together with the drive side rotating body 42 during the rotational driving of the drive side rotating body 42, each roller 210 rotates about the central axis L4 only within the range allowed by the engaging protrusion 201 and the first engaging recess 211 engaged with each other.

In addition, when the driven side rotating body 45 tends to rotate while the drive side rotating body 42 is not rotationally driven, in the same manner as in the second embodiment, each roller 210 is sandwiched between the control surface 83 and the inner circumferential surface 41c of the clutch housing 41 so that the rollers 210 serve as wedges to hinder rotation of the driven side rotating body 45.

According to the third embodiment, in addition to the same effects as (8), (9), (11) to (14) of the second embodiment, the following advantages can be achieved.

(15) In each roller 210, the first engaging recess 211 provided in the axial end portion on the proximal end side of the roller support 164a and 164b is restricted in rotation about the central axis L4 by the engaging protrusion 201 engaged with the first engaging recess 211. That is, by the first engaging recess 211 and the engaging protrusion 201 being engaged with each other, the roller 210 is restricted in rotation about the central axis L4 of the roller 210 by the engaging protrusion 201. Thus, the roller 210 rotates about the central axis L4 of the roller 210 only within the range allowed by the engaging protrusion 201. Consequently, the scattering of the grease GR caused by the rotation of the rollers 210 about the central axes L4 of the rollers 210 is prevented so that the grease GR between the inner circumferential surface 41c of the clutch housing 41 and the rollers 210 can be prevented from becoming insufficient.

In addition, by the simple structure of engagement between the first engaging recesses 211 provided in the rollers 210 and the engaging protrusions 201 provided at the support member 200, the rotation of the rollers 210 about the central axes L4 can be restricted. As a result, the grease GR between the inner circumferential surface 41c of the clutch housing 41 and the rollers 210 can be easily prevented from becoming insufficient.

(16) At the start of the rotational driving of the drive side rotating body 42, the rotational driving force of the drive side rotating body 42 is transmitted to the support member 200 through the axial opposed portions 63. Then, the rotational driving force of the drive side rotating body 42 is transmitted to the rollers 210 by the axial opposed portions 63 and the roller supports 164a and 164b. Since the engaging protrusions 201 are provided at the axial opposed portions 63, the first engaging recesses 211 of the rollers 210 and the engaging protrusions 201 of the support member 200 are engaged with each other in the vicinity of the axial opposed portions 63 to which the rotational driving force of the drive side rotating body 42 is directly transmitted. Thus, the rotational driving force of the drive side rotating body 42 is more easily transmitted to the rollers 210 by the support member 200. Consequently, at the start of the rotational driving of the drive side rotating body 42, the sandwiching of the rollers 210 by the inner circumferential surface 41c of the clutch housing 41 and the driven side rotating body 45 is more easily released.

Fourth Embodiment

A fourth embodiment of a clutch will now be described. Same reference numerals are given to those components that are the same as the corresponding components of the second embodiment. Such components will not be described in detail.

Figure 29A:
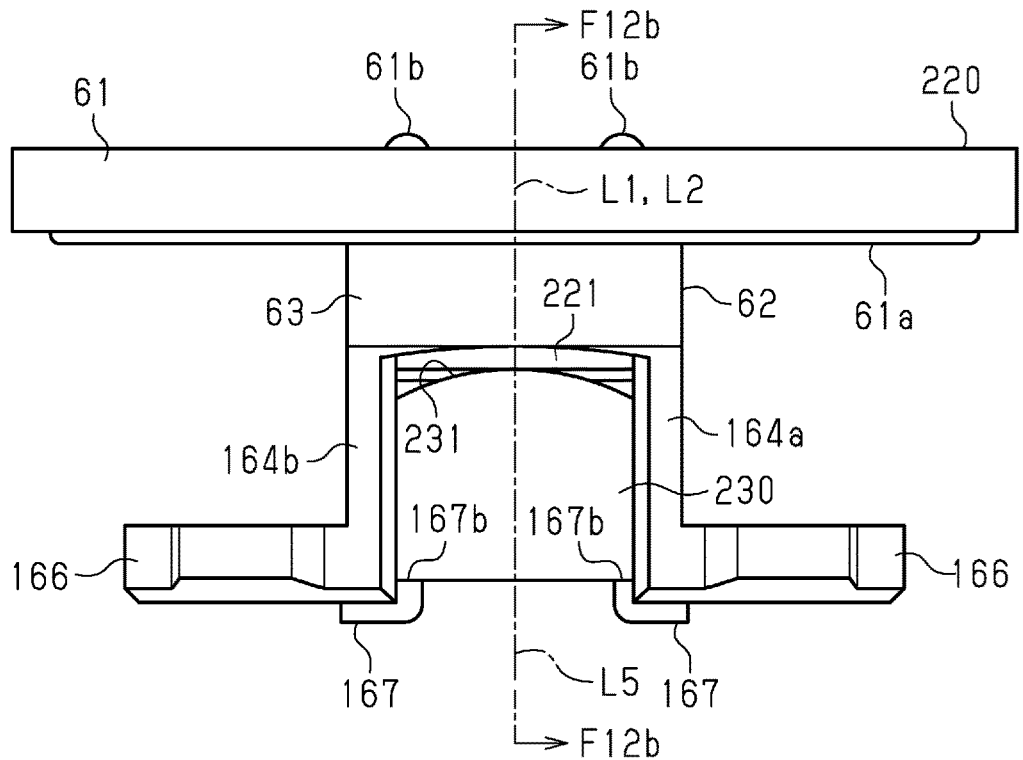
FIG. 29A is a side view of a support member holding rollers in a clutch of a fourth embodiment.
Figure 29B:
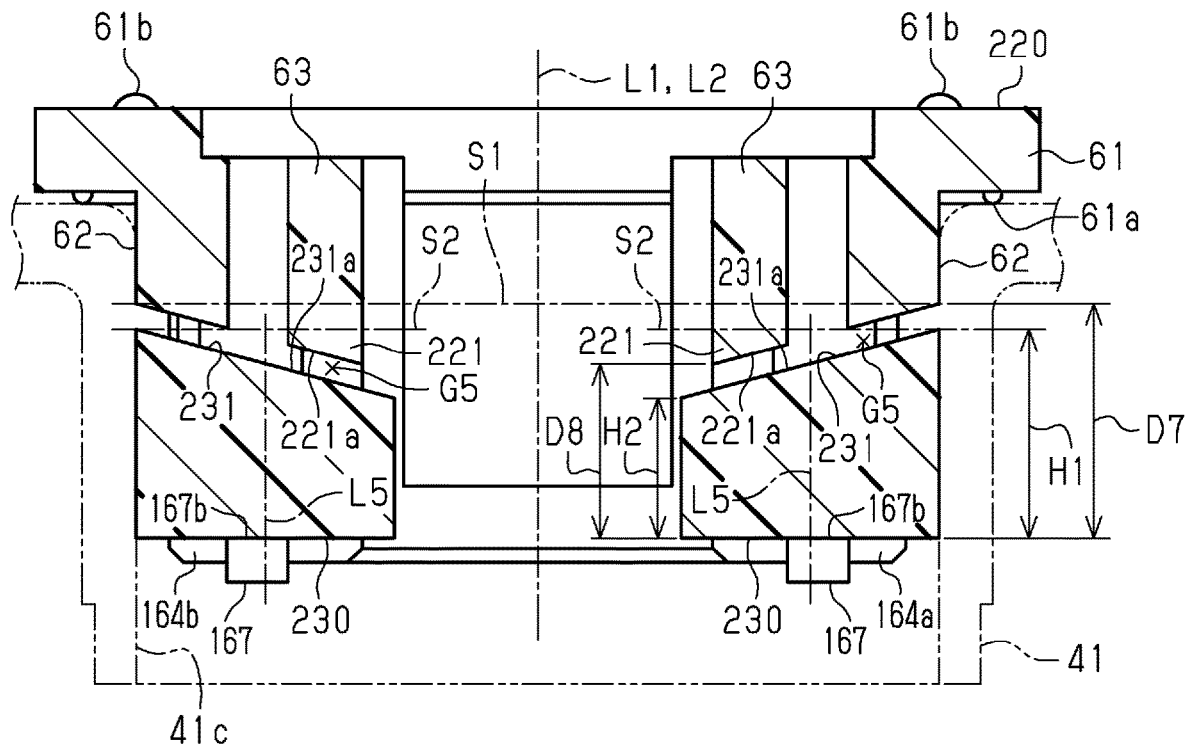
FIG. 29B is a cross-sectional view of the support member (cross-sectional view taken along line F12b-F12b in FIG. 29A).

A support member 220 and rollers 230 of the fourth embodiment shown in FIGS. 29A and 29B are provided in the clutch 40 of the second embodiment in place of the support member 43 and the rollers 144 (refer to FIG. 20).

In the support member 220, an engaging protrusion (support member side engaging portion) 221 is provided at a distal end portion of the axial opposed portion 63 of each roller holding portion 62 (that is, axial end portion of axial opposed portion 63 opposite to ring 61, lower end portion in FIG. 29A). The engaging protrusion 221 is provided integrally with the axial opposed portion 63, and is a protrusion protruding in the rotation axis direction of the drive side rotating body 42 (same as direction of central axis L1) toward the distal end side of the roller supports 164a and 164b (downward in FIG. 29B). The engaging protrusions 221 of the fourth embodiment are formed such that the amount of protrusion toward the distal end side of the roller supports 164a and 164b gradually increases toward the radially inside of the ring 61. A distal end surface 221a of each engaging protrusion 221 is in a planar shape inclined with respect to an imaginary plane S1 orthogonal to the central axis L1. In the fourth embodiment, the distal end surface 221a is inclined such that an end portion of the distal end surface 221a on the radially inside of the ring 61 is located further away from the ring 61 in the central axis L1 direction than an end portion on the radially outside.

The two rollers 230 held by the above support member 220 are made of resin and substantially cylindrical. The rollers 230 are held by the support member 220 to be arranged such that their central axes L5 are parallel to the central axes L1 and L2 (rotation axis of drive side rotating body 42).

An engaging recess (roller side engaging portion) 231 is provided in one end portion of each roller 230 in the central axis L5 direction (upper end portion in FIG. 29B). In each roller 230, the engaging recess 231 is a recess provided in the central axis L5 direction, and its depth in the central axis L5 direction becomes deeper from one end to the other end of the roller 230 along a direction orthogonal to the central axis L5 (that is, from one end to other end of roller 230 in diametrical direction). The engaging recess 231 has an inclined bottom surface 231a of a planar shape inclined with respect to an imaginary plane S2 orthogonal to the central axis L5. In the fourth embodiment, the imaginary plane S1 is parallel to the imaginary plane S2, and the inclination angle of the inclined bottom surface 231a with respect to the imaginary plane S2 is equal to the inclination angle of the distal end surface 221a of the engaging protrusion 221 with respect to the imaginary plane S1. The other end face of each roller 230 in the central axis L5 direction (that is, end surface on distal end side of roller supports 164a and 164b) is in a planar shape orthogonal to the central axis L5. Further, the outer circumferential surface of each roller 230 is in a cylindrical shape.

The maximum length H1 of each roller 230 in the central axis L5 direction is shorter than an axial distance D7 between the proximal end of the engaging protrusion 221 of the roller holding portion 62 and the abutment holding surface 167b. The minimum length H2 of each roller 230 in the central axis L5 direction is shorter than an axial distance D8 between the distal end of the engaging protrusion 221 of the roller holding portion 62 and the abutment holding surface 167b. The maximum length H1 of each roller 230 is longer than the distance D8 at the roller holding portion 62.

Each roller 230 is arranged between the two roller supports 164a and 164b so that the end portion near the engaging recess 231 is located on the proximal end side of the roller supports 164a and 164b, and is held by the roller supports 164a and 164b from both sides in the rotational direction X1. Although the rotational direction X1 is not illustrated in FIGS. 29A and 29B, the rotational direction X1 is the direction about the rotation axis L1, and is the same direction as the circumferential direction of the ring 61. Further, the abutment holding surfaces 167b of the holding claws 167 abut on the axial end faces of the rollers 230 on the distal end side of the roller supports 164a and 164b from the central axis L1 direction. The rollers 230 are prevented from falling out of the roller holding portions 62 in the axial direction by the holding claws 167. Each roller 230 is arranged such that the depth of the engaging recess 231 in the central axis L5 direction becomes deeper toward the radially inside of the ring 61 along the diametrical direction of the ring 61. Each engaging protrusion 221 facing the roller 230 in the central axis L1 direction is inserted into the engaging recess 231 of the roller 230. That is, the engaging recess 231 is engaged with the engaging protrusion 221. Further, at the engaging recess 231 and the engaging protrusion 221 engaged with each other, the distal end surface 221a of the engaging protrusion 221 and the inclined bottom surface 231a face each other in the rotation axis direction (central axis L1 direction) of the drive side rotating body 42.

The two rollers 230 are held by the support member 220 of the above-described structure and spaced at equal angular intervals (at 180° intervals in fourth embodiment) in the rotational direction X1. Since the roller supports 164a and 164b holding the rollers 230 are inserted and arranged in the clutch housing 41, the rollers 230 radially face the clutch housing 41 inside the clutch housing 41. The outer circumferential surface of each roller 230 radially faces the cylindrical inner circumferential surface 41c of the clutch housing 41, and can contact the inner circumferential surface 41c from between the two roller supports 164a and 164b. Further, the outer circumferential surface of each roller 230 radially faces the control surface 83 of the driven side rotating body 45 and can contact the control surface 83. The support member 220 is relatively rotatable with respect to the clutch housing 41 in the rotational direction X1. In FIG. 29B, the clutch housing 41 is illustrated by the double-dashed lines.

Further, as described above, the maximum length H1 of each roller 230 is shorter than the distance D7 between the proximal end of the engaging protrusion 221 of the roller holding portion 62 and the abutment holding surface 167b, and the minimum length H2 of each roller 230 is shorter than the distance D8 between the distal end of the engaging protrusion 221 of the roller holding portion 62 and the abutment holding surface 167b. Further, the maximum length H1 of each roller 230 is longer than the distance D8 at the roller holding portion 62. Consequently, an allowance gap G5 that determines the rotational range of each roller 230 about the central axis L5 is provided between the inclined bottom surface 231a of the engaging recess 231 of the roller 230 held by the roller holding portion 62 and the distal end surface 221a of the engaging protrusion 221 inserted in the engaging recess 231. Therefore, the roller 230 can rotate about the central axis L5 by an amount allowed by the allowance gap G5. When the roller 230 rotates about its central axis L5 in either direction, the clockwise direction or the counterclockwise direction, between the two roller supports 164a and 164b, the engaging recess 231 of the roller 230 rotates about the central axis L5. At the time when the roller 230 has rotated by the amount allowed by the allowance gap G5, the inclined bottom surface 231a of the engaging recess 231 abuts on the distal end surface 221a of the engaging protrusion 221 from the rotational direction. Engagement of the engaging recess 231 and the engaging protrusion 221 hinders rotation of the roller 230 for a certain amount or more about the central axis L5. Further, by the rotation of the roller 230 about the central axis L5 being restricted to the range allowed by the allowance gap G5 between the inclined bottom surface 231a of the engaging recess 231 and the distal end surface 221a of the engaging protrusion 221, a sliding contact area (not shown) that can slide on the inner circumferential surface 41c of the clutch housing 41 is determined on the outer circumferential surface of the roller 230.

The operation of the fourth embodiment will now be described.

When the drive side rotating body 42 is rotationally driven, in the same manner as in the second embodiment, the rollers 230 are brought into an unlocked state in which the rollers 230 are not sandwiched between the control surfaces 83 and the clutch housing 41. In the unlocked state, the drive side rotating body 42 and the driven side rotating body 45 are connected in the rotational direction X1 in an integrally rotatable manner so that the rotational driving force of the drive side rotating body 42 (rotation shaft 24) is transmitted to the driven side rotating body 45 (worm shaft 34), and the rotation shaft 24 and the worm shaft 34 rotate integrally.

At this time, the first or second roller supports 164a or 164b and the axial opposed portions 63 are pressed by the roller release portions 57 in the rotational direction X1 so that the support member 220 and the rollers 230 rotate about the rotation axis (same as central axis L1) of the drive side rotating body 42 together with the drive side rotating body 42 and the driven side rotating body 45. Due to frictional force between each roller 230 and the inner circumferential surface 41c of the clutch housing 41, the roller 230 tends to rotate about its central axis L5 in a direction opposite to the rotational direction of the support member 220 between the two roller supports 164a and 164b. When each roller 230 rotates about its central axis L5 by the amount allowed by the allowance gap G5 between the inclined bottom surface 231a and the distal end surface 221a facing each other, the inclined bottom surface 231a of the engaging recess 231 rotating about the central axis L5 in the roller 230 comes into contact with the distal end surface 221a of the engaging protrusion 221 engaged with the engaging recess 231 from the rotational direction. Thus, each roller 230 is restricted in rotation about the central axis L5 by the engaging recess 231 and the engaging protrusion 221 engaged with each other. Consequently, even when each roller 230 rotates about the rotation axis of the drive side rotating body 42 together with the drive side rotating body 42 during the rotational driving of the drive side rotating body 42, the roller 230 rotates about the central axis L5 only within the range allowed by the engaging recess 231 and the engaging protrusion 221 engaged with each other.

In addition, when the driven side rotating body 45 tends to rotate while the drive side rotating body 42 is not rotationally driven, in the same manner as in the second embodiment, the rollers 230 are sandwiched between the control surfaces 83 and the inner circumferential surface 41c of the clutch housing 41 so that the rollers 230 serve as wedges to hinder rotation of the driven side rotating body 45.

According to the fourth embodiment, in addition to the same effects as (8), (9), (13), and (14) of the second embodiment and (16) of the third embodiment, the following advantages can be achieved.

(17) In each roller 230, the engaging recess 231 provided in the axial end portion on the proximal end side of the roller support 164a and 164b is restricted in rotation about the central axis L5 by the engaging protrusion 221 engaged with the engaging recess 231. That is, by the engaging recess 231 and the engaging protrusion 221 being engaged with each other, the roller 230 is restricted in rotation about the central axis L5 of the roller 230 by the engaging protrusion 221. Thus, the roller 230 rotates about the central axis L5 of the roller 230 only within the range allowed by the engaging protrusion 221. Consequently, the scattering of the grease GR caused by the rotation of the rollers 230 around the central axes L5 of the rollers 230 is prevented so that the grease GR between the inner circumferential surface 41c of the clutch housing 41 and the rollers 230 can be prevented from becoming insufficient.

In addition, by the simple structure of engagement between the engaging recesses 231 provided in the rollers 230 and the engaging protrusions 221 provided at the support member 220, the rotation of the rollers 230 about the central axes L5 can be restricted. As a result, the grease GR between the inner circumferential surface 41c of the clutch housing 41 and the rollers 230 can be easily prevented from becoming insufficient.

(18) The inclined bottom surface 231a of the engaging recess 231 is inclined with respect to the imaginary plane S2, and the distal end surface 221a of the engaging protrusion 221 engaged with the engaging recess 231 is inclined with respect to the imaginary plane S1. The inclined bottom surface 231a and the distal end surface 221a face each other in the central axis L1 direction. Thus, when the roller 230 rotates about its central axis L5, the inclined bottom surface 231a comes into contact with the distal end surface 221a of the engaging protrusion 221. The engaging protrusion 221 hinders further rotation of the roller 230 about the central axis L5. Thus, rotation of each roller 230 about the central axis L5 can be restricted by the engaging recess 231 and the engaging protrusion 221 of the simple structure. Consequently, the grease GR between the inner circumferential surface 41c of the clutch housing 41 and the rollers 230 can be easily prevented from becoming insufficient.

The above-described embodiments may be modified as follows.

Each roller 144 of the second embodiment may have a grease housing recess that is open in the sliding contact area A2 on the outer circumferential surface of the roller 144 and accommodates the grease GR. The grease housing recess is formed in such a manner as to leave the outer circumferential surface of the roller 144 in the sliding contact area A2, and is not formed over the entire sliding contact area A2.

For example, the roller 144 shown in FIGS. 30A and 30B has a grease housing recess 175 in one axial end portion of the roller 144 (that is, end portion on proximal end side of roller supports 164a and 164b). The grease housing recess 175 is open to one side of the roller 144 in the axial direction and to the outside of the roller 144 in the radial direction (that is, toward clutch housing 41). In FIG. 30B, the sliding contact area A2 is shaded.

Further, for example, the roller 144 shown in FIGS. 31A and 31B has a grease housing recess 176 in the other axial end portion of the roller 144 (that is, end portion on distal end side of roller supports 164a and 164b). The grease housing recess 176 is open to the other side of the roller 144 in the axial direction and to the outside of the roller 144 in the radial direction (that is, toward clutch housing 41).

As shown in FIGS. 32A and 32B, the roller 144 may have grease housing recesses 175 and 176 in both end portions in the axial direction.

Further, for example, the roller 144 shown in FIGS. 33A and 33B has a grease housing recess 177 in an axially central portion. The grease housing recess 177 is provided from a portion corresponding to the sliding contact area A2 on the outer circumferential surface of the roller 144 in the diametrical direction of the roller 144.

As shown in FIGS. 34A and 34B, the roller 144 may have grease housing recesses 175 and 176 in both end portions in the axial direction, and further have a grease housing recess 177 in an axially central portion.

In the examples shown in FIGS. 30 to 34, the grease housing recesses 175, 176, and 177 have a rectangular shape in the shape viewed from the radially outside, but are not limited to this, and may have a circular shape, a polygonal shape, or the like. Further, the roller 144 may have four or more grease housing recesses open in the sliding contact area A2.

In this way, the grease housing recesses 175, 176, and 177 provided in the roller 144 are open in the sliding contact area A2 that can slide on the inner circumferential surface 41c of the clutch housing 41. Consequently, the grease GR accommodated in the grease housing recesses 175, 176, and 177 is drawn out toward the inner circumferential surface 41c of the clutch housing 41 as the roller 144 rotates to be supplied to a space between the roller 144 and the inner circumferential surface 41c of the clutch housing (that is, space between sliding contact area A2 and inner circumferential surface 41c). Therefore, the grease GR between the inner circumferential surface 41c of the clutch housing 41 and the rollers 144 can be further prevented from becoming insufficient. As a result, when the rotational driving of the drive side rotating body 42 is stopped, the rollers 144 have no difficulty in serving as wedges between the inner circumferential surface 41c of the clutch housing 41 and the control surfaces 83 of the driven side rotating body 45.

Likewise, for the rollers 210 of the third embodiment and the rollers 230 of the fourth embodiment, by providing a grease housing recess that is open in the sliding contact area on the outer circumferential surface of each roller 210 or 230 and accommodates the grease GR, the same effects can be provided.

Each roller 144 of the second embodiment is restricted in rotation about the central axis L3 of the roller 144 by the first and second engaging recesses 171 and 172 and the holding claws 167 engaged with each other. Thus, on the outer circumferential surface of each roller 144, a portion that can contact the inner circumferential surface 41c of the clutch housing 41 can be separated from a portion that can contact the control surface 83 of the driven side rotating body 45. Consequently, on the outer circumferential surface of each roller 144, a portion that can contact the inner circumferential surface 41c of the clutch housing 41 can be different in curvature from a portion that can contact the control surface 83 of the driven side rotating body 45.

For example, in an example shown in FIG. 35, each roller 144 has two parallel surfaces 178a orthogonal to the central axis L3 direction and parallel to each other on both sides of the roller 144 in the rotational direction X1. On the outer circumferential surface of the roller 144, a portion located on the clutch housing 41 side of the two parallel surfaces 178a forms a first arcuate surface 178b that can contact the inner circumferential surface 41c of the clutch housing 41, and a portion located on the driven side rotating body 45 side of the two parallel surfaces 178a forms a second arcuate surface 178c that can contact the control surface 83 of the driven side rotating body 45. Further, when viewed from the central axis L3 direction, the second arcuate surface 178c in contact with the control surface 83 of the driven side rotating body 45 is in an arc shape smaller in curvature than that of the first arcuate surface 178b in contact with the inner circumferential surface 41c of the clutch housing 41.

This can reduce a wedge angle $\theta1$ when the inner circumferential surface 41c of the clutch housing 41 and the control surface 83 of the driven side rotating body 45 sandwich each roller 144 as a wedge, compared to the case where the entire outer circumferential surface of the roller 144 has the curvature of the first arcuate surface 178b (that is, forms cylindrical shape) as in the second embodiment. In that case, when the rotational driving of the drive side rotating body 42 is stopped, an idle running angle $\theta2$ that is an angle at which the driven side rotating body 45 rotates until the rollers 144 are sandwiched between the inner circumferential surface 41c of the clutch housing 41 and the control surfaces 83 is smaller than that when the entire outer circumferential surface of each roller 144 has the curvature of the first arcuate surface 178b. Consequently, when the driven side rotating body 45 tends to rotate while the drive side rotating body 42 is not rotationally driven, the rollers 144 can be sandwiched by the driven side rotating body 45 and the clutch housing 41 in a stage where the rotational speed of the driven side rotating body 45 is lower, compared to the case where the entire outer circumferential surface of each roller 144 has the curvature of the first arcuate surface 178b. Thus, when the rollers 144 tend to rotate through the driven side rotating body 45, the rollers 144 can be sandwiched by the driven side rotating body 45 and the clutch housing 41 in an earlier stage so that the rotation of the driven side rotating body 45 can be hindered quickly when the rotational driving of the drive side rotating body 42 is stopped.

Likewise, for the rollers 210 of the third embodiment and the rollers 230 of the fourth embodiment, on the outer circumferential surface of each roller 210 or 230, a portion that can contact the inner circumferential surface 41c of the clutch housing 41 may be different in curvature from a portion that can contact the control surface 83 of the driven side rotating body 45.

Figure 36A:
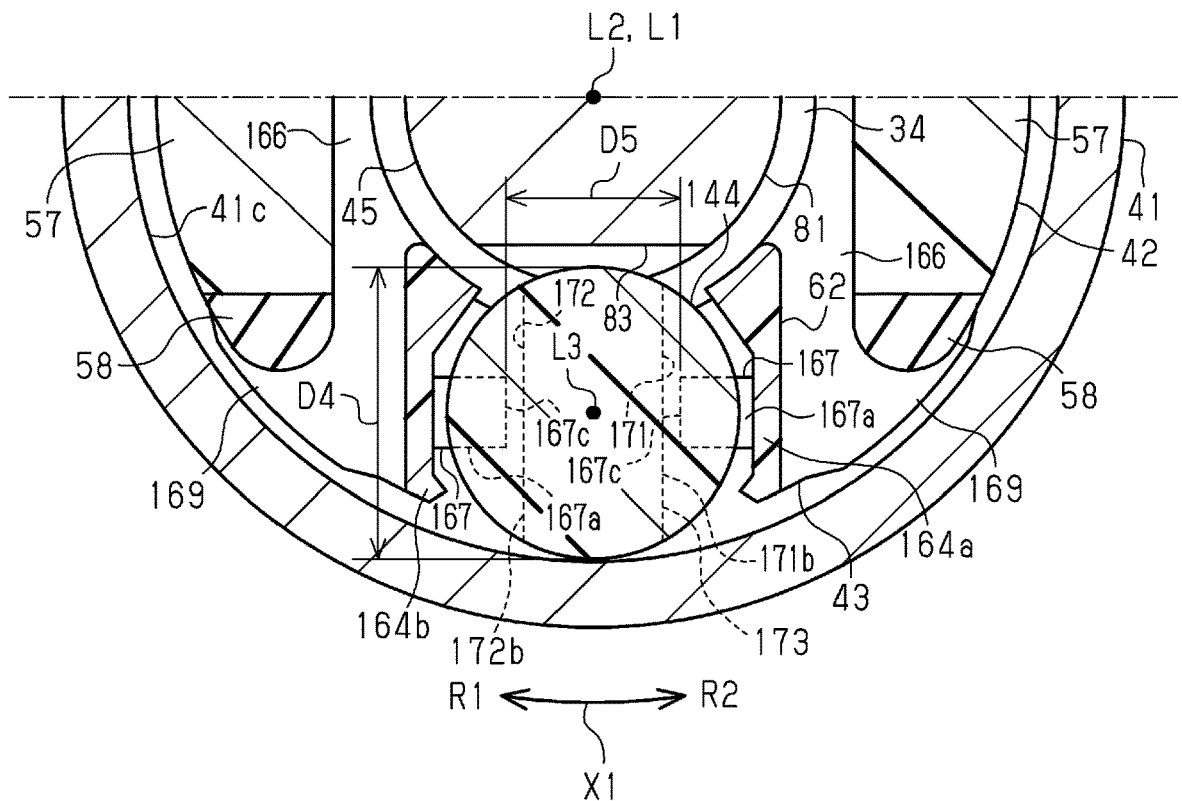
FIGS. 36A and 36B are partially enlarged cross-sectional views of a clutch in a different form.
Figure 36B:
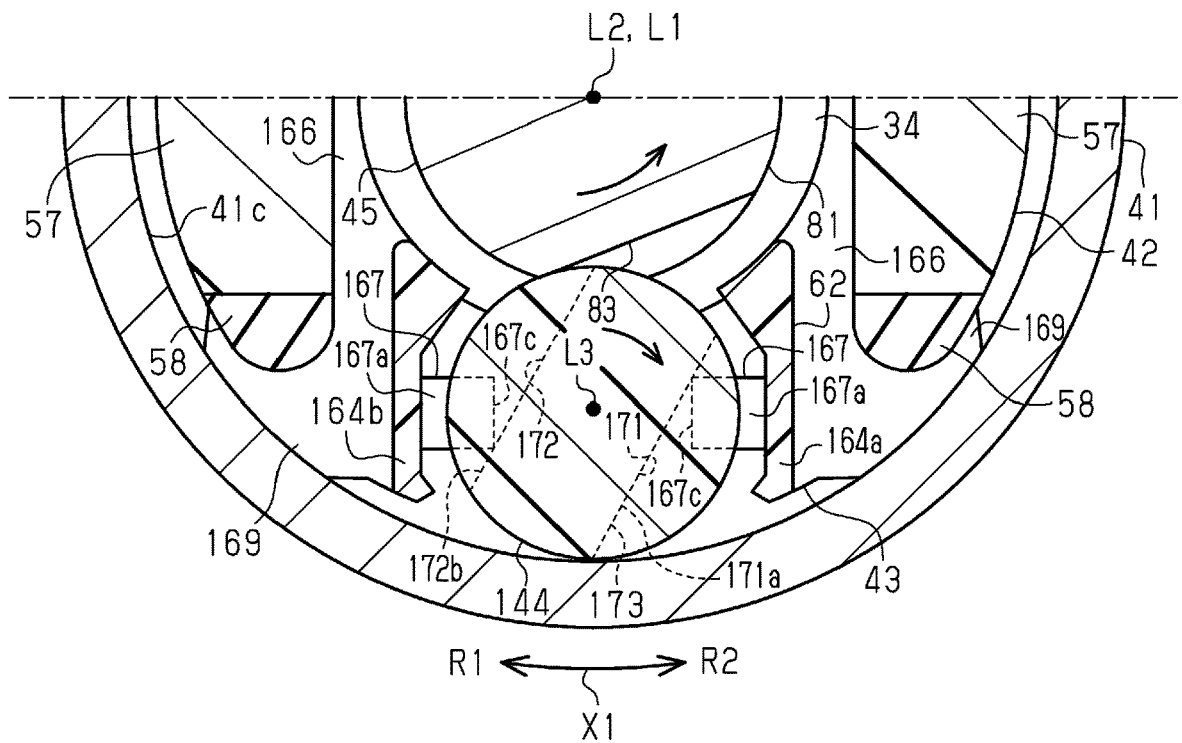

As shown in FIGS. 36A and 36B, the support member 43 may have abutting portions 169. When the drive side rotating body 42 is not rotationally driven, the abutting portions 169 are moved radially outward to abut on the inner circumferential surface 41c of the clutch housing 41 by the roller supports 164a and 164b being pressed by the rollers 144 tending to rotate about their central axes L3. In an example shown in FIGS. 36A and 36B, in the clutch 40 of the second embodiment, the abutting portions 169 are provided to the support member 43.

More specifically, at the support member 43, on both sides of each roller holding portion 62 in the circumferential direction (rotational direction X1), the abutting portions 169 protruding radially outward (that is, toward clutch housing 41) from radially outer side surfaces of the connecting portions 166 are provided. When the rollers 144 are not sandwiched by the inner circumferential surface 41c of the clutch housing 41 and the control surfaces 83 of the driven side rotating body 45 (for example, in state shown in FIG. 36A), the abutting portions 169 are located away from the inner circumferential surface 41c of the clutch housing 41. As shown in FIG. 36B, when the driven side rotating body 45 tends to rotate while the drive side rotating body 42 is not rotationally driven, the rollers 144 are rotated about their central axes L3 by frictional force between the rollers 144 and the driven side rotating body 45 until the rollers 144 are sandwiched by the driven side rotating body 45 and the clutch housing 41. FIG. 36B illustrates a state in which the driven side rotating body 45 tends to rotate in the second direction R2. Here, each roller 144 is formed such that the length between the first abutting surface 171b and the second abutting surface 172b (that is, longitudinal length D4 of inter-recess portion 173) is longer than the distance D5 between the restriction surfaces 167c of the holding claws 167 facing the first and second abutting surfaces 171b and 172b (refer to FIG. 36A). Consequently, each roller 144 rotates about the central axis L3, causing the first and second abutting surfaces 171b and 172b to come into contact with the restriction surfaces 167c facing the first and second abutting surfaces 171b and 172b from the rotational direction about the central axis L3, and then can further press these restriction surfaces 167c in directions to separate them from each other. That is, by the roller 144 rotating about the central axis L3, the inter-recess portion 173 can press the two holding claws 167 located on both sides of the inter-recess portion 173 in directions to separate them from each other. Then, the two roller supports 164a and 164b move in directions to separate from each other. As a result, the roller supports 164a and 164b move radially outward. That is, the roller supports 164a and 164b are moved radially outward when pressed by the roller 144 that has rotated about the central axis L3. Then, the support member 43 is elastically deformed, and the connecting portions 166 provided integrally with the roller supports 164a and 164b are moved radially outward. As a result, the abutting portions 169 are moved radially outward to abut on the inner circumferential surface 41c of the clutch housing 41. Thus, frictional force produced between the abutting portions 169 and the inner circumferential surface 41c of the clutch housing 41 hinders movement of the rollers 144 in the rotational direction X1 of the drive side rotating body 42. Consequently, it becomes easier to sandwich the rollers 144 between the driven side rotating body 45 and the inner circumferential surface 41c of the clutch housing 41 so that the rotation of the driven side rotating body 45 can be more easily hindered when the drive side rotating body 42 is not rotationally driven. Further, even when a load applied to the output shaft 38 becomes greater, in addition to the frictional force between the rollers 144 and the inner circumferential surface 41c of the clutch housing 41, the frictional force between the abutting portions 169 and the inner circumferential surface 41c of the clutch housing 41 acts to hinder rotation of the driven side rotating body 45 so that the rotation of the driven side rotating body 45 is easily hindered.

In the example shown in FIGS. 36A and 36B, in order to restrict the rotation of each roller 144 about the central axis L3, the support member 43 has the holding claws 167 forming support member side engaging portions to be engaged with the roller 144, provided at distal end portions of the roller supports 164a and 164b. Consequently, compared to a case where support member side engaging portions are provided at proximal end portions of the roller supports 164a and 164b or at the axial opposed portions 63, the roller supports 164a and 164b are more easily moved radially outward by the rollers 144 rotating about the central axes L3 when the drive side rotating body 42 is not rotationally driven. Thus, the abutting portions 169 are more easily brought into contact with the inner circumferential surface 41c of the clutch housing 41.

When the sandwiching of the rollers 144 by the inner circumferential surface 41c of the clutch housing 41 and the driven side rotating body 45 is released at the start of the rotational driving of the drive side rotating body 42, the support member 43 returns to its original shape so that the abutting portions 169 separate from the inner circumferential surface 41c of the clutch housing 41.

Although the abutting portions 169 have a shape protruding radially outward from the connecting portions 166 of the support member 43 in the example shown in FIGS. 36A and 36B, the shape of the abutting portions 169 is not limited to this. Abutting portions may be of any shape in which they are moved radially outward by the roller supports 164a and 164b being moved radially outward by the rollers 144 tending to rotate around their central axes L3, to abut on the inner circumferential surface 41c of the clutch housing 41 when the drive side rotating body 42 is not rotationally driven. For example, the outer circumferential surfaces of the connecting portions 166, radially outer side surfaces of the roller supports 164a and 164b, or the like may be configured to form abutting portions.

Further, the same abutting portions may be provided to the support member 200 of the third embodiment and the support member 220 of the fourth embodiment. In this case, the rollers 210 or 230 are formed in a shape in which they can directly or indirectly press the roller supports 164a and 164b in directions to separate them from each other by rotating about the central axes L4 or L5 when the drive side rotating body 42 is not rotationally driven. For example, the rollers 210 or 230 are formed in a shape in which a direction along the rotational direction X1 is the transverse direction, and a direction along a direction orthogonal to the rotational direction X1 is the longitudinal direction as viewed from the rotation axis direction of the drive side rotating body 42 (for example, shape between two planes in widthwise direction, an elliptical shape, or the like).

In the fourth embodiment, each engaging protrusion 221 of the support member 220 is formed such that the amount of protrusion toward the distal end side of the roller supports 164a and 164b gradually increases toward the radially inside of the ring 61 along the radial direction of the ring 61. The distal end surface 221a of each engaging protrusion 221 is inclined such that an end portion of the distal end surface 221a on the radially inside of the ring 61 is located further away from the ring 61 in the central axis L1 direction than an end portion on the radially outside. However, the shape of the engaging protrusions 221 is not limited to this. Each engaging protrusion 221 only needs to be a protrusion protruding to the inside of the engaging recess 231 of the roller 230 in the rotation axis direction of the drive side rotating body 42, with its distal end surface 221a inclined with respect to the imaginary plane S1. For example, each engaging protrusion 221 may be formed such that an end portion of its distal end surface 221a on the radially outside of the ring 61 is located further away from the ring 61 in the central axis L1 direction than an end portion on the radially inside. In this case, each roller 230 is arranged such that the depth of the engaging recess 231 in the central axis L5 direction becomes deeper toward the radially outside of the ring 61 along the diametrical direction of the ring 61.

Although the inclination angle of the inclined bottom surfaces 231a with respect to the imaginary plane S2 is equal to the inclination angle of the distal end surfaces 221a with respect to the imaginary plane S1 in the fourth embodiment, they do not necessarily need to be equal. It is only necessary that the inclined bottom surfaces 231a can come into contact with the engaging protrusions 221 from the rotational direction about the central axes L5 of the rollers 230 when the rollers 230 rotate about their central axes L5.

In the fourth embodiment, each engaging recess 231 is provided in the end portion on the proximal end side of the roller supports 164a and 164b of the two end portions of the roller 230 in the central axis L5 direction. However, the engaging recess 231 may be provided in the end portion on the distal end side of the roller supports 164a and 164b of the two end portions of the roller 230 in the central axis L5 direction. In this case, an engaging protrusion protruding to the inside of the engaging recess 231 in the rotation axis direction of the drive side rotating body 42 is provided on the distal end side of the roller supports 164a and 164b. A distal end surface of this engaging protrusion is inclined with respect to the imaginary plane S1 orthogonal to the rotation axis of the drive side rotating body 42 and faces the inclined bottom surface 231a in the rotation axis direction of the drive side rotating body 42. In this way, the same effects as (17) and (18) of the fourth embodiment can be provided.

In the second embodiment, in either end portion of each roller 144 in the central axis L3 direction, the two first and second engaging recesses 171 and 172 provided in the end portion are formed such that the inter-recess portion 173, which is a portion between the first engaging recess 171 and the second engaging recess 172, is in a shape between two planes in widthwise direction. However, the shape of engaging recesses provided in each roller 144 to limit the rotation of the roller 144 about the central axis L3 is not limited to this.

Figure 37:
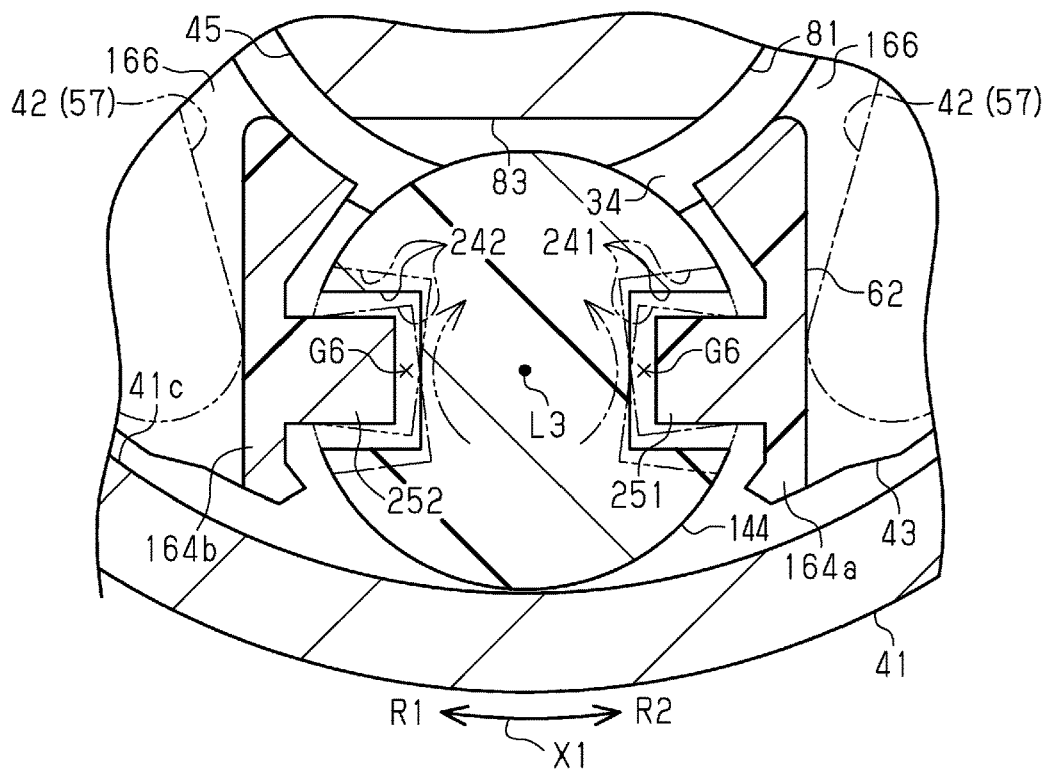
FIG. 37 is a partially enlarged cross-sectional view of a clutch in a different form.

For example, in an example shown in FIG. 37, each roller 144 is provided with first and second engaging recesses 241 and 242 of a rectangular shape in an axial view open to both sides in the rotational direction X1. The first and second engaging recesses 241 and 242 each serve as a roller side engaging portion. The first roller support 164a is provided with a first engaging protrusion 251 protruding to the inside of the first engaging recess 241 to be engaged with the first engaging recess 241 to restrict the rotation of the first engaging recess 241 about the central axis L3. The second roller support 164b is provided with a second engaging protrusion 252 protruding to the inside of the second engaging recess 242 to be engaged with the second engaging recess 242 to restrict the rotation of the second engaging recess 242 about the central axis L3. The first and second engaging protrusions 251 and 252 each serve as a support member side engaging portion. Further, an allowance gap G6 that determines the rotational range of each roller 144 about the central axis L3 is provided between the inner circumferential surface of the first engaging recess 241 and the outer circumferential surface of the first engaging protrusion 251 facing each other, and between the inner circumferential surface of the second engaging recess 242 and the outer circumferential surface of the second engaging protrusion 252 facing each other.

When the drive side rotating body 42 rotates in the first direction R1, the rollers 144 tend to rotate about the central axes L3 in a direction opposite to the rotational direction of the drive side rotating body 42 (counterclockwise direction in FIG. 37), as shown by the single-dashed lines in FIG. 37. When each roller 144 rotates about the central axis L3 by an amount allowed by the allowance gap G6, the inner circumferential surfaces of the first and second engaging recesses 241 and 242 rotating about the central axis L3 in the roller 144 come into contact with the first and second engaging protrusions 251 and 252 engaged with the first and second engaging recesses 241 and 242 from the rotational direction. When the drive side rotating body 42 rotates in the second direction R2, the rollers 144 tend to rotate about the central axes L3 in a direction opposite to the rotational direction of the drive side rotating body 42 (clockwise direction in FIG. 37), as shown by the double-dashed lines in FIG. 37. When each roller 144 rotates about the central axis L3 by an amount allowed by the allowance gap G6, the inner circumferential surfaces of the first and second engaging recesses 241 and 242 rotating about the central axis L3 in the roller 144 come into contact with the first and second engaging protrusions 251 and 252 engaged with the first and second engaging recesses 241 and 242 from the rotational direction. Consequently, when each roller 144 tends to rotate about its central axis L3 in either direction, the first and second engaging recesses 241 and 242 engaged with the first and second engaging protrusions 251 and 252 restrict the rotation of the roller 144 about the central axis L3. Also in this case, the scattering of the grease caused by the rotation of the rollers 144 about the central axes L3 is prevented so that the grease between the inner circumferential surface 41c of the clutch housing 41 and the rollers 144 can be prevented from becoming insufficient.

In the second embodiment, the support member 43 has the holding claws 167 as support member side engaging portions to be engaged with the first and second engaging recesses 171 and 172 of the rollers 144 only on the distal end side of the roller supports 164a and 164b. However, the support member 43 may be configured to have support member side engaging portions to be engaged with the first and second engaging recesses 171 and 172 of the rollers 144 also on the proximal end side of the roller supports 164a and 164b.

In the third embodiment, the support member 200 has the engaging protrusions 201 as support member side engaging portions to be engaged with the first engaging recesses 211 of the rollers 210 only at the axial opposed portions 63. However, the support member 200 may be configured to have engaging protrusions as support member side engaging portions to be engaged with the first engaging recesses 211 of the rollers 210, also on the distal end side of the roller supports 164a and 164b. In addition, the support member 200 may be configured to have engaging protrusions as support member side engaging portions that are engaged with the second engaging recesses 212 to restrict the rotation of the second engaging recesses 212 about the central axes L4.

In the second embodiment, in order to restrict the rotation of the rollers 144 about the central axes L3, the holding claws 167 of the support member 43 are inserted into and engaged with the first and second engaging recesses 171 and 172 of the rollers 144. However, the shapes of portions at which the support member 43 is engaged with the rollers 144 (that is, portions corresponding to support member side engaging portions and roller side engaging portions) to restrict the rotation of the rollers 144 about the central axes L3 are not limited to them.

Figure 38:
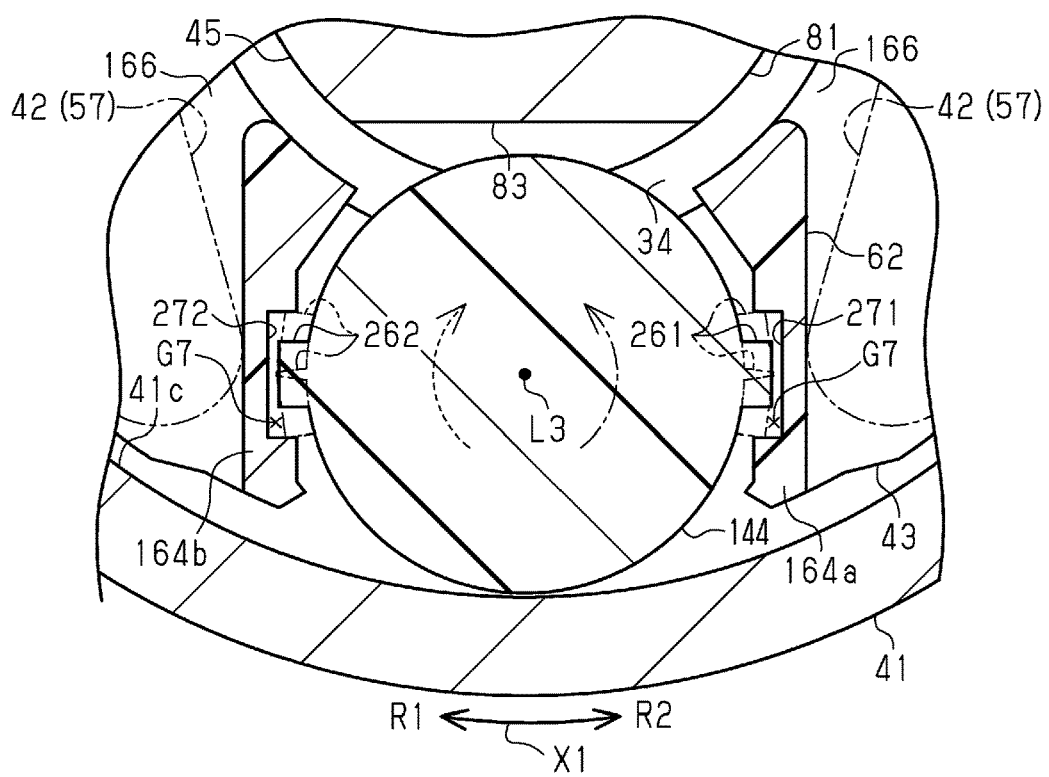
FIG. 38 is a partially enlarged cross-sectional view of a clutch in a different form.

For example, in an example shown in FIG. 38, each roller 144 has first and second engaging protrusions 261 and 262 protruding on both sides in its diametrical direction (both sides in rotational direction X1 in FIG. 38). The first and second engaging protrusions 261 and 262 each serve as a roller side engaging portion. The support member 43 has a first engaging recess 271 provided in the first roller support 164a in the rotational direction X1 to be engaged with the first engaging protrusion 261, and a second engaging recess 272 provided in the second roller support 164b in the rotational direction X1 to be engaged with the second engaging protrusion 262. The first and second engaging recesses 271 and 272 each serve as a support member side engaging portion. Further, an allowance gap G7 that determines the rotational range of each roller 144 about the central axis L3 is provided between the outer circumferential surface of the first engaging protrusion 261 and the inner circumferential surface of the first engaging recess 271 facing each other, and between the outer circumferential surface of the second engaging protrusion 262 and the inner circumferential surface of the second engaging recess 272 facing each other.

When the drive side rotating body 42 rotates in the first direction R1, the rollers 144 tend to rotate about the central axes L3 in a direction opposite to the rotational direction of the drive side rotating body 42 (counterclockwise direction in FIG. 38), as shown by the single-dashed lines in FIG. 38. When each roller 144 rotates about the central axis L3 by an amount allowed by the allowance gap G6, the first and second engaging protrusions 261 and 262 rotating about the central axis L3 at the roller 144 come into contact with the inner circumferential surfaces of the first and second engaging recesses 271 and 272 engaged with the first and second engaging protrusions 261 and 262 from the rotational direction. When the drive side rotating body 42 rotates in the second direction R2, the rollers 144 tend to rotate about the central axes L3 in a direction opposite to the rotational direction of the drive side rotating body 42 (clockwise direction in FIG. 38), as shown by a broken line in FIG. 38. When each roller 144 rotates about the central axis L3 by an amount allowed by the allowance gap G6, the first and second engaging protrusions 261 and 262 rotating about the central axis L3 at the roller 144 come into contact with the inner circumferential surfaces of the first and second engaging recesses 271 and 272 engaged with the first and second engaging protrusions 261 and 262 from the rotational direction. Consequently, when each roller 144 tends to rotate about its central axis L3 in either direction, the first and second engaging protrusions 261 and 262 engaged with the first and second engaging recesses 271 and 272 restrict the rotation of the roller 144 about the central axis L3. Also in this case, the scattering of the grease caused by the rotation of the rollers 144 about the central axes L3 is prevented so that the grease between the inner circumferential surface 41c of the clutch housing 41 and the rollers 144 can be prevented from becoming insufficient.

Also, in the third embodiment, the shapes of portions at which the support member 200 is engaged with the rollers 210 (that is, portions corresponding to support member side engaging portions and roller side engaging portions) to restrict the rotation of the rollers 210 about the central axes L4 may be changed. This also applies to the fourth embodiment.

In the second embodiment, the first and second engaging recesses 171 and 172 are provided in the end portions of each roller 144 in the central axis L3 direction, and the holding claws 167 provided at the distal end portions of the roller supports 164a and 164b in the support member 43 are engaged with the engaging recesses 171 and 172, thereby restricting the rotation of the roller 144 about the central axis L3. However, the positions of engaging recesses provided in each roller 144 and the positions of engaging protrusions provided at the support member 43 to restrict the rotation of the roller 144 about the central axis L3 are not limited to them. For example, an engaging recess may be provided in an end face of each roller 144 in the central axis L3 direction facing the axial opposed portion 63, and an engaging protrusion protruding to the inside of the engaging recess may be provided at the axial opposed portion 63 of the support member 43. Further, for example, an engaging recess provided in the radial direction of each roller 144 may be provided in the outer circumferential surface of the roller 144, and an engaging protrusion protruding to the inside of the engaging recess may be provided at the support member 43. The same applies to a case where an engaging protrusion is provided at each roller 144, and an engaging recess engaged with the engaging protrusion is provided in the support member 43. The third and fourth embodiments may be altered in the same manner.

In the second embodiment, the support member 43 is engaged with each roller 144 in two locations to restrict the rotation of the roller 144 about the central axis L3. However, the number of locations where the support member 43 is engaged with each roller 144 to restrict the rotation of the roller 144 about the central axis L3 is not limited to two, and may be one or three or more. This also applies to the support member 200 and the rollers 210 of the third embodiment, and the support member 220 and the rollers 230 of the fourth embodiment.

In the second embodiment, by the provision of the allowance gap G3 between the first and second abutting surfaces 171b and 172b of each roller 144 and the restriction surfaces 167c of the holding claws 167 facing the first and second abutting surfaces 171b and 172b, the rotational range of the roller 144 about the central axis L3 is restricted. However, as long as the rotation of each roller 144 about the central axis L3 is restricted, the allowance gap G3 does not necessarily need to be provided between the first and second abutting surfaces 171b and 172b and the restriction surfaces 167c facing each other. For example, the first abutting surface 171b and the restriction surface 167c facing each other may abut on each other at all times, and the second abutting surface 172b and the restriction surface 167c facing each other may abut on each other at all times. This causes each roller 144 to be restricted in rotation about its central axis L3 by the first and second engaging recesses 171 and 172 engaged with the holding claws 167 so as not to rotate about its central axis L3. Also in this case, the scattering of the grease GR caused by the rotation of the rollers 144 about their central axes L3 is prevented so that the grease GR between the inner circumferential surface 41c of the clutch housing 41 and the rollers 144 can be prevented from becoming insufficient. This also applies to the second and fourth embodiments.

The rollers 144, 210, and 230 of the above-described embodiments do not necessarily need to have the shapes in the above embodiments as long as they have a columnar shape extending in the axial direction (central axis direction of drive side rotating body 42). For example, the rollers 144, 210, and 230 may have an outer shape that is shape between two planes in the widthwise direction from the axial direction. Further, for example, the rollers 144, 210, and 230 may have an elliptical shape in outer shape when viewed from the axial direction.

In the above embodiments, the rollers 144, 210, or 230 are sandwiched between the control surfaces 83 of the driven side rotating body 45 and the inner circumferential surface 41c of the clutch housing 41 when the drive side rotating body 42 is not rotationally driven so that the rotation of the driven side rotating body 45 is hindered. However, a sandwiching member for sandwiching the rollers 144, 210, or 230 with the driven side rotating body 45 when the drive side rotating body 42 is not rotationally driven does not necessarily need to be the clutch housing 41. The sandwiching member may be any that faces the driven side rotating body 45 in the radial direction (that is, direction orthogonal to the central axis of drive side rotating body 42), and has an annular inner circumferential surface capable of sandwiching the rollers 144, 210, or 230 with the driven side rotating body 45 when the drive side rotating body 42 is not rotationally driven. For example, the clutch housing 41 may be eliminated, and the rollers 144, 210, or 230 may be sandwiched between the inner circumferential surface of the clutch housing recess 31c and the driven side rotating body 45 when the drive side rotating body 42 is not rotationally driven.

In the above embodiments, the grease GR is applied to the inner circumferential surface 41c of the clutch housing 41. However, as long as the grease GR is arranged at least between the inner circumferential surface 41c of the clutch housing 41 and the rollers 144, the location of the grease GR is not limited to that in the above embodiments.

In the second embodiment, the shapes of the clutch housing 41, the drive side rotating body 42, the support member 43, the rollers 144, and the driven side rotating body 45 forming the clutch 40 do not necessarily need to be the shapes in the above embodiments. For example, the drive side rotating body 42 may be formed integrally with the rotation shaft 24. Further, for example, the driven side rotating body 45 may be provided separately from the worm shaft 34 and fitted integrally rotatably with the worm shaft 34. Furthermore, the number of the rollers 144 is not limited to two. At least one roller 144 may be arranged between the inner circumferential surface 41c of the clutch housing 41 and the driven side rotating body 45. This also applies to the third and fourth embodiments.

In the above embodiments, the materials of the members forming the clutch 40 may be changed. For example, the rollers 144, 210, or 230 may be made of metal. Further, in the above embodiments, the materials of the members forming the motor 10 may be changed. For example, the gear housing 31 may be made of metal.

In the above embodiments, the speed reduction mechanism 32 included in the output unit 30 includes the worm shaft 34 and the worm wheel 37. The number of gears included in the speed reduction mechanism 32 may be appropriately changed. The speed reduction mechanism 32 does not necessarily need to be a worm speed reduction mechanism as long as it has a driven shaft connected to the rotation shaft 24 by the clutch 40. Further, the output unit 30 does not necessarily need to include the speed reduction mechanism 32 as long as it has a driven shaft connected to the rotation shaft 24 by the clutch 40 and is configured to be able to output rotation transmitted from the rotation shaft 24.

Although the motor 10 is used as the drive source of the power window device in the above embodiments, it may be used as a drive source of another device.

In the above embodiments, the clutch 40 is provided in the motor 10, and connects the rotation shaft 24 and the worm shaft 34 of the speed reduction mechanism 32. However, the clutch 40 may be provided in a device other than the motor 10 to connect a rotation shaft rotationally driven and a driven shaft to which the rotational driving force of the rotation shaft is transmitted.

The above embodiments and the above modifications may be implemented in combination.

The invention claimed is:

1. A clutch comprising:
an annular clutch housing;
a drive side rotating body that is rotationally driven;
a driven side rotating body to which rotational driving force is transmitted from the drive side rotating body, wherein the driven side rotating body includes a portion arranged inside the clutch housing;
a roller arranged between an inner circumferential surface of the clutch housing and the driven side rotating body, wherein the roller is rotated about a rotation axis of the drive side rotating body together with the drive side rotating body when the drive side rotating body is rotationally driven, the roller hinders rotation of the driven side rotating body by being sandwiched between the inner circumferential surface of the clutch housing and the driven side rotating body when the drive side rotating body is not rotationally driven;
a support member sandwiching the roller between the inner circumferential surface of the clutch housing and the driven side rotating body, wherein the support member rotates about the rotation axis of the drive side rotating body together with the drive side rotating body; and
grease arranged at least between the inner circumferential surface of the clutch housing and the roller, wherein:
the support member restricts rotation of the roller about a central axis of the roller;
the support member has first and second rotational direction opposed portions facing the roller in first and second rotational directions of the drive side rotating body, respectively;
first and second allowance gaps that determine a rotational range of the roller about the central axis of the roller are arranged between the first rotational direction opposed portion and the roller and between the second rotational direction opposed portion and the roller, respectively; and
when the roller is rotated about the central axis of the roller by an amount allowed by the first and second allowance gaps, the roller comes into contact with the first rotational direction opposed portion in the first rotational direction and contact with the second rotational direction opposed portion in the second rotational direction so that further rotation is hindered when the roller contacts both the first rotational direction opposed portion and the second rotational direction opposed portion.

2. The clutch according to claim 1, wherein:
the roller includes planar opposed surfaces on both sides of the roller in the first and second rotational directions of the drive side rotating body; and
the opposed surfaces face the first and second rotational direction opposed portions in the first and second rotational directions of the drive side rotating body.

3. The clutch according to claim 2, wherein:
the drive side rotating body includes a roller release portion that transmits the rotational driving force of the drive side rotating body to one of the first and second rotational direction opposed portions when the drive side rotating body is rotationally driven;
the roller is configured to be pressed in one of the first and second rotational directions of the drive side rotating body by the roller release portion through one of the first and second rotational direction opposed portions when rotational driving of the drive side rotating body starts;
the sandwiching of the roller by the inner circumferential surface of the clutch housing and the driven side rotating body is released when the roller is pressed;
the first and second rotational direction opposed portions each have a planar abutting surface; and
the abutting surfaces are configured to come into surface contact with the opposed surfaces in the first and second rotational directions of the drive side rotating body.

4. The clutch according to claim 1, wherein:
the support member also includes an abutting portion;
the first and second rotational direction opposed portions are configured to be pressed by the roller tending to rotate about the central axis of the roller when the drive side rotating body is not rotationally driven; and
the abutting portion is configured to be moved radially outward when at least one of the first and second rotational direction opposed portions is pressed to abut on the inner circumferential surface of the clutch housing.

5. The clutch according to claim 1,
wherein the roller includes a first arcuate surface and a second arcuate surface on an outer circumferential surface of the roller;
the first arcuate surface has an arc shape and is configured to contact the inner circumferential surface of the clutch housing;
the second arcuate surface has an arc shape, is smaller in curvature than the arc shape of the first arcuate surface as viewed from a central axis direction of the roller, and is configured to contact the driven side rotating body; and
when the drive side rotating body is not rotationally driven, the first arcuate surface contacts the inner circumferential surface of the clutch housing while the second arcuate surface contacts the driven side rotating body so that the roller is sandwiched between the inner circumferential surface of the clutch housing and the driven side rotating body.

6. The clutch according to claim 1, wherein:
the roller includes a sliding contact area and a grease housing recess on an outer circumferential surface of the roller;
the sliding contact area defines an area of the outer circumferential surface that slides on the inner circumferential surface of the clutch housing as the roller rotates about the central axis of the roller within the rotational range allowed by the support member; and
the grease housing recess opens in the sliding contact area and accommodates the grease.

7. The clutch according to claim 1, wherein:
the first and second rotational direction opposed portions each include a radially outer portion at which a protruding piece extends toward the roller; and
a distal end portion of the protruding piece includes a distal end surface extending in a direction intersecting with the first and second rotational directions of the drive side rotating body.

8. The clutch according to claim 1, wherein:
the roller includes a roller side engaging portion; and
the support member includes a support member side engaging portion that is engaged with the roller side engaging portion to restrict rotation of the roller side engaging portion about the central axis of the roller.

9. The clutch according to claim 8, wherein:
one of the first and second allowance gaps is arranged between the roller side engaging portion and the support member side engaging portion; and
when the roller is rotated about the central axis of the roller by the amount allowed by the one of the first and second allowance gaps, the roller side engaging portion comes into contact with the support member side engaging portion so that further rotation is hindered.

10. The clutch according to claim 8, wherein the roller side engaging portion is a recess into which the support member side engaging portion is inserted.

11. The clutch according to claim 8, wherein:
the first and second rotational direction opposed portions protrude in the rotation axis direction of the drive side rotating body on two sides of the roller in the first and second rotational directions of the drive side rotating body and hold the roller from two sides of the drive side rotating body in the rotational directions;
a holding claw protrudes from a distal end portion of each of the first and second rotational direction opposed portions to the roller and abuts on the roller from the rotation axis direction of the drive side rotating body;
the roller side engaging portion is recessed in an end portion of the roller on a distal end side of the first and second rotational direction opposed portions; and
the support member side engaging portion is one of the holding claws inserted into the roller side engaging portion.

12. The clutch according to claim 8, wherein:
the support member also includes an axial opposed portion;
the axial opposed portion faces the roller in the rotation axis direction of the drive side rotating body;
the first and second rotational direction opposed portions extend from the axial opposed portion to two sides of the roller in the first and second rotational directions of the drive side rotating body and hold the roller from two sides of the drive side rotating body in the rotational directions;
the support member rotates about the rotation axis of the drive side rotating body together with the drive side rotating body;
the drive side rotating body includes a roller release portion;
when the drive side rotating body is rotationally driven, the roller release portion abuts on the axial opposed portion in one of the rotational directions of the drive side rotating body and transmits the rotational driving force of the drive side rotating body to the axial opposed portion;
the roller is configured to be pressed in one of the rotational directions of the drive side rotating body by the first and second rotational direction opposed portions when rotational driving of the drive side rotating body starts;
the sandwiching of the roller by the inner circumferential surface of the clutch housing and the driven side rotating body is released when the roller is pressed;
the roller rotates about the rotation axis of the drive side rotating body together with the drive side rotating body while being held by the support member when the drive side rotating body is rotationally driven; and
the support member side engaging portion is provided to at least one of a proximal end portion of each of the first and second rotational direction opposed portions and the axial opposed portion.

13. The clutch according to claim 8, wherein:
the roller side engaging portion of the roller is one of two roller side engaging portions recessed in an end portion of the roller in a central axis direction on two sides in a direction orthogonal to the central axis of the roller; and
a portion between the two roller side engaging portions of the roller as viewed from the central axis direction of the roller is shaped between two planes in a widthwise direction so as to have two parallel surfaces that have planar shapes and are parallel to the central axis of the roller.

14. The clutch according to claim 8, wherein:
the roller is arranged such that the central axis of the roller is parallel to the rotation axis of the drive side rotating body;
the roller side engaging portion is arranged in an end portion of the roller in a central axis direction,
the roller side engaging portion is a recess having a depth in the central axis direction of the roller that increases from one end side to another end side of the roller in a direction orthogonal to the central axis of the roller;

the roller side engaging portion includes an inclined bottom surface inclined with respect to an imaginary plane orthogonal to the central axis of the roller;

the support member side engaging portion is a protrusion protruding toward an inside of the roller side engaging portion in the rotation axis direction of the drive side rotating body; and a distal end surface of the support member side engaging portion is inclined with respect to an imaginary plane orthogonal to the rotation axis of the drive side rotating body and faces the inclined bottom surface in the rotation axis direction of the drive side rotating body.

15. The clutch according to claim 8, wherein:

the support member also includes an abutting portion;

the first and second rotational direction opposed portions are arranged on two sides in the first and second rotational directions of the drive side rotating body with respect to the roller and face the roller in the rotational directions of the drive side rotating body;

the first and second rotational direction opposed portions are configured to be pressed by the roller acting to rotate about the central axis of the roller when the drive side rotating body is not rotationally driven; and the abutting portion is configured to be moved radially outward and to abut on the inner circumferential surface of the clutch housing when at least one of the first and second rotational direction opposed portion is pressed.

16. The clutch according to claim 8, wherein:

the roller includes a first arcuate surface and a second arcuate surface on an outer circumferential surface of the roller, the first arcuate surface has an arc shape and is configured to contact the inner circumferential surface of the clutch housing;

the second arcuate surface has an arc shape, is smaller in curvature than the arc shape of the first arcuate surface as viewed from a central axis direction of the roller, and is configured to contact the driven side rotating body; and when the drive side rotating body is not rotationally driven, the first arcuate surface contacts the inner circumferential surface of the clutch housing while the second arcuate surface contacts the driven side rotating body so that the roller is sandwiched between the inner circumferential surface of the clutch housing and the driven side rotating body.

17. The clutch according to claim 8, wherein:

the roller has a sliding contact area and a grease housing recess on an outer circumferential surface of the roller, the sliding contact area defines an area of the outer circumferential surface that slides on the inner circumferential surface of the clutch housing as the roller rotates about the central axis of the roller within the rotational range allowed by the roller side engaging portion and the support member side engaging portion; and the grease housing recess opens in the sliding contact area and accommodates the grease.

18. A motor comprising:

a motor unit including a rotationally driven rotation shaft;

the clutch according to claim 1 including the drive side rotating body rotated integrally with the rotation shaft; and an output unit including a driven shaft rotated integrally with the driven side rotating body and configured to output the rotational driving force transmitted to the driven shaft.

* * * * *